(12) United States Patent
Kito et al.

(10) Patent No.: US 11,346,518 B2
(45) Date of Patent: May 31, 2022

(54) HEADLIGHT FOR VEHICLE

(71) Applicant: KOITO MANUFACTURING CO., LTD., Tokyo (JP)

(72) Inventors: Masanori Kito, Shizuoka (JP); Kazuya Motohashi, Shizuoka (JP)

(73) Assignee: KOITO MANUFACIURING CO., LTD., Tokyo (JP)

( * ) Notice: Subject to any disclaimer, the term of this patent is extended or adjusted under 35 U.S.C. 154(b) by 0 days.

(21) Appl. No.: 17/263,375

(22) PCT Filed: Aug. 1, 2019

(86) PCT No.: PCT/JP2019/030375
§ 371 (c)(1),
(2) Date: Jan. 26, 2021

(87) PCT Pub. No.: WO2020/027301
PCT Pub. Date: Feb. 6, 2020

(65) Prior Publication Data
US 2021/0301996 A1 Sep. 30, 2021

(30) Foreign Application Priority Data

Aug. 3, 2018 (JP) .............................. JP2018-147126
Aug. 3, 2018 (JP) .............................. JP2018-147127
Aug. 3, 2018 (JP) .............................. JP2018-147128

(51) Int. Cl.
*F21S 41/63* (2018.01)
*F21S 41/16* (2018.01)
(Continued)

(52) U.S. Cl.
CPC .............. *F21S 41/635* (2018.01); *B60Q 1/14* (2013.01); *F21S 41/16* (2018.01); *F21S 41/285* (2018.01);
(Continued)

(58) Field of Classification Search
CPC . B60Q 1/14; F21S 41/16; F21S 41/285; F21S 41/321; F21S 41/635; F21S 41/645
See application file for complete search history.

(56) References Cited

U.S. PATENT DOCUMENTS 9,855,887 B1 * 1/2018 Potter .................... F21S 41/675
2007/0195270 A1 * 8/2007 Hull ........................ G03B 17/54
348/E5.142
(Continued)

FOREIGN PATENT DOCUMENTS

DE   10 2016 223 674 A1   5/2018
JP   2008-037240 A        2/2008
(Continued)

OTHER PUBLICATIONS

International Search Report for PCT/JP2019/030375 dated Sep. 10, 2019 [PCT/ISA/210].
(Continued)

*Primary Examiner* — Zheng Song
(74) *Attorney, Agent, or Firm* — Sughrue Mion, PLLC

(57) ABSTRACT

A headlight (1) includes a lamp unit (20) including: light sources (52R,52G,52B) that emit laser light; and phase modulation elements (54R,54G,54B) that diffract the laser light emitted from the light sources (52R,52G,52B) with a phase modulation pattern that is changeable, and emit light of a light distribution pattern based on the phase modulation pattern. The lamp unit (20) adjusts a total luminous flux amount of light emitted from the lamp unit (20) according to the light distribution pattern.

16 Claims, 33 Drawing Sheets

(51) Int. Cl.
*F21S 41/32* (2018.01)
*F21S 41/64* (2018.01)
*F21S 41/20* (2018.01)
*B60Q 1/14* (2006.01)
*F21V 9/14* (2006.01)
*F21W 102/165* (2018.01)
*F21W 102/20* (2018.01)

(52) U.S. Cl.
CPC ........... *F21S 41/321* (2018.01); *F21S 41/645* (2018.01); *F21V 9/14* (2013.01); *F21W 2102/165* (2018.01); *F21W 2102/20* (2018.01)

(56) References Cited

U.S. PATENT DOCUMENTS

| | | | | |
|---|---|---|---|---|
| 2015/0009695 | A1* | 1/2015 | Christmas | F21S 41/645 362/466 |
| 2015/0377445 | A1* | 12/2015 | Chuang | B60Q 1/143 362/465 |
| 2016/0195231 | A1 | 7/2016 | Grotsch | |
| 2016/0347236 | A1 | 12/2016 | Yatsuda et al. | |
| 2017/0038582 | A1* | 2/2017 | Chau | B60Q 1/085 |
| 2019/0360655 | A1* | 11/2019 | Toko | F21S 41/16 |
| 2019/0376657 | A1* | 12/2019 | Minami | G03B 21/00 |
| 2019/0390836 | A1* | 12/2019 | Hirata | F21S 41/141 |
| 2020/0063938 | A1* | 2/2020 | Kurashige | F21V 5/008 |

FOREIGN PATENT DOCUMENTS

| | | | | |
|---|---|---|---|---|
| JP | WO 2011129105 | * | 10/2011 | ........... F21S 41/148 |
| JP | 2012-146621 A | | 8/2012 | |
| JP | WO 2012144144 | * | 10/2012 | ........... F21S 41/148 |
| JP | 2015-153646 A | | 8/2015 | |
| JP | 2016-008043 A | | 1/2016 | |
| JP | 2016-528695 A | | 9/2016 | |

OTHER PUBLICATIONS

Written Opinion for PCT/JP2019/030375 dated Sep. 10, 2019 [PCT/ISA/237].

* cited by examiner

| LIGHT DISTRIBUTION PATTERN | HIGH BEAM PH | LIGHT DISTRIBUTION PATTERN P1 | LIGHT DISTRIBUTION PATTERN P2 | LIGHT DISTRIBUTION PATTERN P3 | LIGHT DISTRIBUTION PATTERN P4 | ... |
|---|---|---|---|---|---|---|
| PHASE MODULATION PATTERN OF PHASE MODULATION ELEMENT 54R | PATTERN RH | PATTERN R1 | PATTERN R2 | PATTERN R3 | PATTERN R4 | ... |
| PHASE MODULATION PATTERN OF PHASE MODULATION ELEMENT 54G | PATTERN GH | PATTERN G1 | PATTERN G2 | PATTERN G3 | PATTERN G4 | ... |
| PHASE MODULATION PATTERN OF PHASE MODULATION ELEMENT 54B | PATTERN BH | PATTERN B1 | PATTERN B2 | PATTERN B3 | PATTERN B4 | ... |
| INTENSITY OF LIGHT SOURCE 52R | INTENSITY RH | INTENSITY R1 | INTENSITY R2 | INTENSITY R3 | INTENSITY R4 | ... |
| INTENSITY OF LIGHT SOURCE 52G | INTENSITY GH | INTENSITY G1 | INTENSITY G2 | INTENSITY G3 | INTENSITY G4 | ... |
| INTENSITY OF LIGHT SOURCE 52B | INTENSITY BH | INTENSITY B1 | INTENSITY B2 | INTENSITY B3 | INTENSITY B4 | ... |

| LIGHT DISTRIBUTION PATTERN | HIGH BEAM PH | RIGHT STEERING LIGHT DISTRIBUTION PATTERN PSR1 | . . . | LEFT STEERING LIGHT DISTRIBUTION PATTERN PSL1 | . . . |
|---|---|---|---|---|---|
| PHASE MODULATION PATTERN OF PHASE MODULATION ELEMENT 54R | PATTERN RH | PATTERN RR1 | . . . | PATTERN RL1 | . . . |
| PHASE MODULATION PATTERN OF PHASE MODULATION ELEMENT 54G | PATTERN GH | PATTERN GR1 | . . . | PATTERN GL1 | . . . |
| PHASE MODULATION PATTERN OF PHASE MODULATION ELEMENT 54B | PATTERN BH | PATTERN BR1 | . . . | PATTERN BL1 | . . . |
| INTENSITY OF LIGHT SOURCE 52R | INTENSITY RH | INTENSITY RR1 | . . . | INTENSITY RL1 | . . . |
| INTENSITY OF LIGHT SOURCE 52G | INTENSITY GH | INTENSITY GR1 | . . . | INTENSITY GL1 | . . . |
| INTENSITY OF LIGHT SOURCE 52B | INTENSITY BH | INTENSITY BR1 | . . . | INTENSITY BL1 | . . . |
| STEERING ANGLE OF VEHICLE | ANGLE H | ANGLE R1 | . . . | ANGLE L1 | . . . |

| LIGHT DISTRIBUTION PATTERN | LOW BEAM PL | RIGHT TURN LIGHT DISTRIBUTION PATTERN PTR | LEFT TURN LIGHT DISTRIBUTION PATTERN PTL |
|---|---|---|---|
| PHASE MODULATION PATTERN OF PHASE MODULATION ELEMENT 54R | PATTERN RL | PATTERN RTR | PATTERN RTR |
| PHASE MODULATION PATTERN OF PHASE MODULATION ELEMENT 54G | PATTERN GL | PATTERN GTR | PATTERN GTL |
| PHASE MODULATION PATTERN OF PHASE MODULATION ELEMENT 54B | PATTERN BL | PATTERN BTR | PATTERN BTL |
| INTENSITY OF LIGHT SOURCE 52R | INTENSITY RL | INTENSITY RTR | INTENSITY RTL |
| INTENSITY OF LIGHT SOURCE 52G | INTENSITY GL | INTENSITY GTR | INTENSITY GTL |
| INTENSITY OF LIGHT SOURCE 52B | INTENSITY BL | INTENSITY BTR | INTENSITY BTL |
| SELECTION OF TURN LAMP STATE | TURNED OFF | RIGHT BLINKS | LEFT BLINKS |

| | |
|---|---|
| LIGHT DISTRIBUTION PATTERN | HIGH BEAM PH |
| PHASE MODULATION PATTERN OF PHASE MODULATION ELEMENT 54R | PATTERN RH |
| PHASE MODULATION PATTERN OF PHASE MODULATION ELEMENT 54G | PATTERN GH |
| PHASE MODULATION PATTERN OF PHASE MODULATION ELEMENT 54B | PATTERN H |
| INTENSITY OF LIGHT SOURCE 52R | INTENSITY RL |
| INTENSITY OF LIGHT SOURCE 52G | INTENSITY GL |
| INTENSITY OF LIGHT SOURCE 52B | INTENSITY BL |

| ADDRESS OF COMPARTMENT REGION | 1-1 | 1-2 | 1-1 | . . . . | 2-1 | . . . . |
|---|---|---|---|---|---|---|
| LIGHT INTENSITY | INTENSITY 1-1 | INTENSITY 1-1 | INTENSITY 1-1 | . . . . | INTENSITY 2-1 | . . . . |

FIG. 26

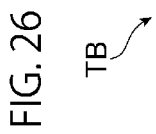

| LIGHT DISTRIBUTION PATTERN | HIGH BEAM PH | LIGHT DISTRIBUTION PATTERN P1 | LIGHT DISTRIBUTION PATTERN P2 | LIGHT DISTRIBUTION PATTERN P3 | LIGHT DISTRIBUTION PATTERN P4 | · · · |
|---|---|---|---|---|---|---|
| PHASE MODULATION PATTERN OF PHASE MODULATION ELEMENT 54R | PATTERN RH | PATTERN R1 | PATTERN R2 | PATTERN R3 | PATTERN R4 | · · · |
| PHASE MODULATION PATTERN OF PHASE MODULATION ELEMENT 54G | PATTERN GH | PATTERN G1 | PATTERN G2 | PATTERN G3 | PATTERN G4 | · · · |
| PHASE MODULATION PATTERN OF PHASE MODULATION ELEMENT 54B | PATTERN BH | PATTERN B1 | PATTERN B2 | PATTERN B3 | PATTERN B4 | · · · |

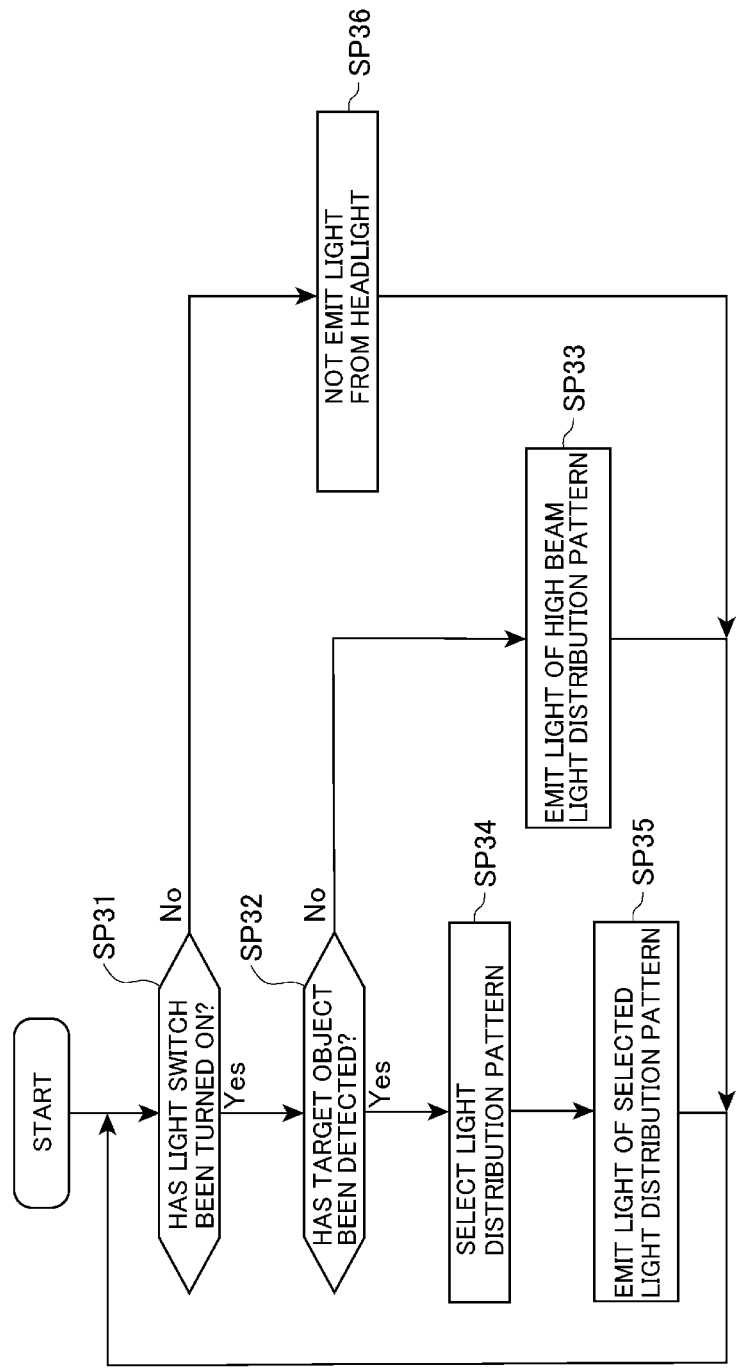

FIG. 32

| LIGHT DISTRIBUTION PATTERN | HIGH BEAM PH | LIGHT DISTRIBUTION PATTERN P1 | LIGHT DISTRIBUTION PATTERN P2 | LIGHT DISTRIBUTION PATTERN P3 | LIGHT DISTRIBUTION PATTERN P4 | ... |
|---|---|---|---|---|---|---|
| PHASE MODULATION PATTERN OF PHASE MODULATION ELEMENT 54R | PATTERN RH | PATTERN R1 | PATTERN R2 | PATTERN R3 | PATTERN R4 | ... |
| PHASE MODULATION PATTERN OF PHASE MODULATION ELEMENT 54G | PATTERN GH | PATTERN G1 | PATTERN G2 | PATTERN G3 | PATTERN G4 | ... |
| PHASE MODULATION PATTERN OF PHASE MODULATION ELEMENT 54B | PATTERN BH | PATTERN B1 | PATTERN B2 | PATTERN B3 | PATTERN B4 | ... |
| INTENSITY OF LIGHT SOURCE 52R | INTENSITY RH | INTENSITY R1 | INTENSITY R2 | INTENSITY R3 | INTENSITY R4 | ... |
| INTENSITY OF LIGHT SOURCE 52G | INTENSITY GH | INTENSITY G1 | INTENSITY G2 | INTENSITY G3 | INTENSITY G4 | ... |
| INTENSITY OF LIGHT SOURCE 52B | INTENSITY BH | INTENSITY B1 | INTENSITY B2 | INTENSITY B3 | INTENSITY B4 | ... |
| TARGET OBJECT | ╳ | PEDESTRIAN PE | ROAD SIGN RS | PEDESTRIAN PE | ROAD SIGN RS | ... |

TB

HEADLIGHT FOR VEHICLE

CROSS REFERENCE TO RELATED APPLICATIONS

This application is a National Stage of International Application No. PCT/JP2019/030375 filed Aug. 1, 2019, claiming priority based on Japanese Patent Application No. 2018-147127 filed August 3, 201; 2018-147126 filed Aug. 3, 2018; and 2018-147128 filed Aug. 3, 2018.

TECHNICAL FIELD

The present invention relates to a headlight for vehicle.

BACKGROUND ART

In headlights for vehicles represented by automobile headlights, various configurations have been studied in order to make the light distribution pattern of the emitted light a predetermined light distribution pattern. For example, Patent Literature 1 below discloses that a predetermined light distribution pattern is formed by using a hologram element which is a kind of diffraction grating.

The headlight for vehicle disclosed in Patent Literature 1 below includes: a light source that emits reference light; a plurality of hologram elements; and a liquid crystal prism that irradiates any one of the plurality of hologram elements with the reference light by changing a traveling direction of the reference light. These plurality of hologram elements include a hologram element calculated to form a low beam light distribution pattern, and another hologram element calculated to form an urban light distribution in which the width of the light distribution pattern in the left-right direction is wider than the width of the low beam light distribution pattern in the left-right direction. For this reason, in this headlight for vehicle, the light distribution pattern of the emitted light can be switched between a low beam light distribution pattern and an urban light distribution pattern by switching the hologram element that is irradiated with the reference light.

Further, as a headlight for vehicle, a headlight that changes a light distribution pattern of emitted light according to the situation in front of a vehicle is known. For example, Patent Literature 2 below discloses a headlight for vehicle including a plurality of high beam units, a detecting means, and a control means that controls the plurality of high beam units on the basis of information from the detecting means.

In the headlight for vehicle disclosed in Patent Literature 2 below, each of the plurality of high beam units irradiates with light a corresponding high beam irradiation area among a plurality of high beam irradiation areas arranged in front of a vehicle. The detecting means detects whether an irradiation prohibited target exists in any of the plurality of high beam irradiation areas. When the detecting means detects the existence of the irradiation prohibited target, the control means turns off the high beam unit for the high beam irradiation area in which the irradiation prohibited target exists. Therefore, it is disclosed that this headlight for vehicle can suppress the irradiation of high beams to other vehicles such as preceding vehicles and oncoming vehicles and pedestrians which are irradiation prohibited targets, and can prevent occupants of other vehicles and pedestrians from feeling dazzling due to the light emitted from the headlight for vehicle.

[Patent Literature 1] JP 2012-146621 A
[Patent Literature 2] JP 2008-37240 A

SUMMARY OF INVENTION

A headlight for vehicle according to a first aspect of the present invention includes a lamp unit including: a light source that emits laser light; and a phase modulation element that diffracts the laser light emitted from the light source with a phase modulation pattern that is changeable, and emits light of a light distribution pattern based on the phase modulation pattern, in which the lamp unit adjusts the total luminous flux amount of the light emitted from the lamp unit according to the light distribution pattern.

In such a headlight for vehicle, the phase modulation element diffracts the laser light emitted from the light source with the phase modulation pattern that is changeable, and emits light of the light distribution pattern based on the phase modulation pattern. Therefore, by changing the phase modulation pattern, the light distribution pattern of the light emitted from the lamp unit can be changed, and the light distribution pattern of the light emitted from the headlight for vehicle can be changed. In this headlight for vehicle, as described above, the total luminous flux amount of the light emitted from the lamp unit is adjusted according to the light distribution pattern of the light emitted from the phase modulation element. Therefore, in this headlight for vehicle, for example, the total luminous flux amount of the light emitted from the lamp unit can be adjusted according to the size of the region irradiated with the light emitted from the headlight for vehicle on a vertical surface at a predetermined distance from the vehicle. Accordingly, this headlight for vehicle can suppress an unintentional change as a whole in the brightness of the region irradiated with the light when the light distribution pattern of the emitted light is changed, and can prevent a driver from feeling uncomfortable. Note that the phase modulation pattern indicates a pattern of modulating the phase of light incident on the phase modulation element.

Changing the phase modulation pattern may cause the light distribution pattern of the light emitted from the lamp unit to be switched between a low beam light distribution pattern and a high beam light distribution pattern, the lamp unit may increase the total luminous flux amount of the light emitted from the lamp unit when the low beam light distribution pattern changes to the high beam light distribution pattern, and the lamp unit may reduce the total luminous flux amount of the light emitted from the lamp unit when the high beam light distribution pattern changes to the low beam light distribution pattern.

The region irradiated with the low beam on the vertical surface at a predetermined distance from the vehicle is smaller than the region irradiated with the light of the high beam light distribution pattern. In this headlight for vehicle, as described above, when the low beam light distribution pattern changes to the high beam light distribution pattern, the lamp unit increases the total luminous flux amount of the light emitted from the lamp unit, and when the high beam light distribution pattern changes to the low beam light distribution pattern, the lamp unit reduces the total luminous flux amount of the light emitted from the lamp unit. Therefore, this headlight for vehicle can suppress an unintentional change as a whole in the brightness of the region irradiated with the low beam or high beam when the light distribution pattern of the emitted light is changed between the low beam light distribution pattern and the high beam light distribution pattern, and can prevent a driver from feeling uncomfortable.

Alternatively, on the basis of information from a detection device that detects a predetermined target object located in front of the vehicle, the phase modulation element may use the phase modulation pattern in which light of a light distribution pattern in which a specific region overlapping at least a part of the target object is darkened is emitted, and the lamp unit may reduce the total luminous flux amount of the light emitted from the lamp unit according to the light distribution pattern in which the specific region is darkened.

In this headlight for vehicle, the light distribution pattern of the emitted light changes according to the situation in front of the vehicle. For example, when the target object detected by the detection device is a pedestrian, the total luminous flux amount of the light emitted to the pedestrian can be reduced, and it is possible to prevent the pedestrian from feeling dazzling due to the light emitted from the headlight for vehicle. Further, in this headlight for vehicle, the lamp unit reduces the total luminous flux amount of the light emitted from the lamp unit according to the light distribution pattern in which a specific region is darkened. Therefore, this headlight for vehicle can reduce the total luminous flux amount of the light emitted from the lamp unit by the amount of reducing the total luminous flux amount of the light emitted to the target object, and can prevent a region other than the specific region of the light distribution pattern in which a specific region is darkened from being unintentionally brightened as a whole. Accordingly, this headlight for vehicle can prevent a driver from feeling uncomfortable even if the light distribution pattern of the emitted light changes according to the situation in front of the vehicle.

When the phase modulation element emits light of a light distribution pattern in which a specific region overlapping at least a part of the target object is darkened, the lamp unit may reduce the total luminous flux amount of the light emitted from the lamp unit when the size of the specific region is larger than a predetermined size. Alternatively, the lamp unit may reduce the total luminous flux amount of the light emitted from the lamp unit when the total luminous flux amount of the light in the specific region before being darkened exceeds a predetermined amount.

In this headlight for vehicle, since the lamp unit reduces or does not reduce the total luminous flux amount of the light emitted from the lamp unit on the basis of a threshold, it is possible to suppress adjustment of the total luminous flux amount of the light emitted from the lamp unit becoming complicated.

When the phase modulation element emits light of a light distribution pattern in which a specific region overlapping with at least a part of the target object is darkened, the specific region may be darker at the center side than at the edge side.

With such a configuration, it is possible to suppress the difficulty in visually recognizing the target object while reducing the total luminous flux amount of the light emitted to the target object.

When the phase modulation element emits light of a light distribution pattern in which a specific region overlapping at least a part of the target object is darkened, in the light distribution pattern in which the specific region is darkened, the intensity distribution in a region other than the specific region may be the same as the intensity distribution in a region other than the specific region before being darkened.

With such a configuration, since the intensity distribution in a region other than the specific region to be darkened does not change according to the change in the light distribution pattern of the emitted light, it is possible to further prevent the driver from feeling uncomfortable.

Alternatively, according to steering of the vehicle, the phase modulation element may use the phase modulation pattern in which light of a light distribution pattern expanded in the left-right direction is emitted, and the lamp unit may increase the total luminous flux amount of the light emitted from the lamp unit according to the light distribution pattern expanded in the left-right direction.

In this headlight for vehicle, the light distribution pattern of the emitted light changes to a light distribution pattern expanded in the left-right direction according to the change in the traveling direction of the vehicle. For example, since this headlight for vehicle can irradiate a traveling destination with light on a curved road, the visibility in a curved road can be improved further than in a case where the light distribution pattern of the emitted light does not change according to the change in the traveling direction of the vehicle. Further, in this headlight for vehicle, the lamp unit increases the total luminous flux amount of the light emitted from the lamp unit according to the light distribution pattern expanded in the left-right direction. Therefore, it is possible to prevent a region other than the expanded region of the light distribution pattern expanded in the left-right direction from being unintentionally darkened as a whole. Accordingly, this headlight for vehicle can prevent a driver from feeling uncomfortable even if the light distribution pattern of the emitted light changes according to the change in the traveling direction of the vehicle.

When the phase modulation element emits light of a light distribution pattern expanded in the left-right direction, the width of the expanded region in the left-right direction in the light distribution pattern expanded in the left-right direction may be a width according to a steering angle of the vehicle.

In this headlight for vehicle, the light distribution pattern of the emitted light changes according to the degree of change in the traveling direction of the vehicle. Therefore, since this headlight for vehicle can change the irradiated region according to the degree of curve of a curved road, the visibility on a curved road can be further improved.

Alternatively, according to a signal from a turn switch of the vehicle, the phase modulation element may use the phase modulation pattern in which light of a light distribution pattern expanded in the left-right direction is emitted, and the lamp unit may increase the total luminous flux amount of the light emitted from the lamp unit according to the light distribution pattern expanded in the left-right direction.

In this headlight for vehicle, the light distribution pattern of the emitted light changes to a light distribution pattern expanded in the left-right direction according to the signal from the turn switch of the vehicle. Therefore, since this headlight for vehicle can irradiate a traveling destination with light on a crossroads and the like, the visibility in a crossroads and the like can be improved further than in a case where the light distribution pattern of the emitted light does not change according to the signal from a turn switch of the vehicle. Further, in this headlight for vehicle, the lamp unit increases the total luminous flux amount of the light emitted from the lamp unit according to the light distribution pattern expanded in the left-right direction. Therefore, it is possible to prevent a region other than the expanded region of the light distribution pattern expanded in the left-right direction from being unintentionally darkened as a whole. Accordingly, this headlight for vehicle can prevent a driver from feeling uncomfortable even if the light distribution pattern of the emitted light changes according to a signal from a turn switch of the vehicle.

The lamp unit may adjust the intensity of the laser light emitted from the light source according to the light distribution pattern to adjust the total luminous flux amount of the light emitted from the lamp unit.

With such a configuration, the total luminous flux amount of the light emitted from the lamp unit can be adjusted without providing a dimming filter or the like, and the headlight for vehicle can have a simple configuration.

Alternatively, the lamp unit may further include a polarizing filter arranged on an optical path of the laser light emitted from the light source or on an optical path of the light emitted from the phase modulation element, and the total luminous flux amount of the light emitted from the lamp unit may be adjusted by rotating the polarizing filter according to the light distribution pattern. Alternatively, the lamp unit may further include a dimming filter arranged on an optical path of the laser light emitted from the light source or on an optical path of the light emitted from the phase modulation element, the dimming filter may have a plurality of dimming regions in which the amount of light transmitted through the dimming filter is different from each other, and the lamp unit may move the dimming filter according to the light distribution pattern to change the dimming region into which light is incident to adjust the total luminous flux amount of the light emitted from the lamp unit.

With such a configuration, the total luminous flux amount of the light emitted from the lamp unit can be stably adjusted without adjusting the intensity of the laser light emitted from the light source.

A headlight for vehicle according to a second aspect of the present invention includes: a light source that emits laser light; and a phase modulation element that diffracts the laser light emitted from the light source with a phase modulation pattern that is changeable, and emits light of a light distribution pattern based on the phase modulation pattern, in which, on the basis of information from a detection device that detects a predetermined target object located in front of the vehicle, the phase modulation element sets the phase modulation pattern in which light of a light distribution pattern in which a specific region overlapping at least a part of the target object is darkened and a predetermined region that is different from the specific region is brightened is emitted.

In such a headlight for vehicle, the light distribution pattern of the emitted light changes according to the situation in front of the vehicle. For example, when the target object detected by the detection device is a pedestrian, the total luminous flux amount of the light emitted to the pedestrian can be reduced, and it is possible to prevent the pedestrian from feeling dazzling due to the light emitted from the headlight for vehicle. Further, in the headlight for vehicle, as described above, the light distribution pattern of the emitted light is a light distribution pattern in which a specific region overlapping at least a part of the target object is darkened and a predetermined region is brightened. Therefore, this headlight for vehicle can prevent a region other than the darkened region of the light distribution pattern from being unintentionally brightening as a whole. Further, in this headlight for vehicle, by setting a predetermined region to be brightened to a specific position, the predetermined region can be made inconspicuous to prevent the driver from feeling uncomfortable, or the predetermined region can be made conspicuous to increase the alerting ability. Accordingly, this headlight for vehicle can make drive easy.

Further, in the headlight for vehicle according to the second aspect, the predetermined region may overlap at least a part of a hot zone in the light distribution pattern.

Since the hot zone is brighter than the region other than the hot zone in the light distribution pattern, it is possible to prevent a predetermined region from becoming remarkably bright in the light distribution pattern. Therefore, this headlight for vehicle can prevent the driver from feeling uncomfortable.

Alternatively, the predetermined region may be in contact with at least a part of an edge of the specific region.

With such a configuration, existence of a target object can be emphasized while reducing the total luminous flux amount of the light emitted to the target object such as a pedestrian. Therefore, this headlight for vehicle can increase the alerting ability to a target object located in front of the vehicle, as compared to a case where a predetermined region to be brightened is separated from a specific region.

Alternatively, the target object may be a human, the specific region may be a region overlapping at least a part of a head of the human, and the predetermined region may be a region overlapping at least a part of a torso of the human.

With such a configuration, it is possible to prevent a person located in front of the vehicle from feeling dazzling due to the light emitted from the headlight for the vehicle, and it is possible to emphasize the human torso. Accordingly, this headlight for vehicle can increase the alerting ability to a person located in front of the vehicle, as compared to a case where a predetermined region is not a region overlapping at least a part of the human torso.

Further, in the headlight for vehicle according to the second aspect, the specific region may be darker on a central side than on an edge side.

With such a configuration, it is possible to suppress the difficulty in visually recognizing the target object while reducing the total luminous flux amount of the light emitted to the target object.

Further, in the headlight for vehicle according to the second aspect, the total luminous flux amount of the light reduced in the specific region and the total luminous flux amount of the light increased in the predetermined region may be the same.

With such a configuration, the specific region can be darkened and the predetermined region can be brightened without changing the intensity of the laser light emitted from the light source. Therefore, the headlight for vehicle can be operated by simple control as compared to the case where the intensity of the laser light emitted from the light source is changed.

A headlight for vehicle according to a third aspect of the present invention includes a plurality of light emitting optical systems each having a light source and a phase modulation element, in which the light source in each of the light emitting optical systems emits laser light having different wavelengths, the phase modulation element in each of the light emitting optical systems diffracts the laser light emitted from the light source in each of the light emitting optical systems with a phase modulation pattern that is changeable, and emits light of a light distribution pattern based on the phase modulation pattern, a predetermined light distribution pattern is formed by light obtained by synthesizing the light emitted from each of the light emitting optical systems, and, on the basis of information from a detection device that detects a predetermined target object located in front of the vehicle, the phase modulation element in each of the light emitting optical systems sets the phase modulation pattern in which the light distribution pattern is formed in which a color of a specific region overlapping at least a part of the target object is different from a color of a region other than the specific region by the light obtained by synthesizing the light emitted from each of the light emitting optical systems.

In such a headlight for vehicle, the light distribution pattern of the emitted light changes according to the situation in front of the vehicle, and the color of the light emitted to at least a part of the target object is different from the color emitted to other regions. For example, when the target object detected by the detection device is a pedestrian, the color of the light emitted to the pedestrian is different from the color of the light emitted to other regions. The light feeling sense of the human eye is wavelength-dependent. The sense of feeling light in the human eye tends to decrease as the wavelength of light increases or decreases from the wavelength of yellow-green light. That is, the human eye tends to perceive yellow-green light most brightly, and tends to perceive blue or red light darker than yellow-green light. Therefore, when the color of the light emitted to the pedestrian is a color that is less sensitive for the light feeling sense of the human eye, for example, blue, the headlight for vehicle can prevent a pedestrian from feeling dazzling due to the light emitted from the headlight for vehicle. Further, in this headlight for vehicle, the color of the light emitted to the target object such as a pedestrian is different from the color of the light emitted to other regions, but the target object is irradiated with light. Therefore, this headlight for vehicle can suppress the difficulty in visually recognizing the target object as compared to the case where the target object is not irradiated with light. Further, for example, when the target object detected by the detection device is a road sign, the color of the light emitted to the road sign is different from the color of the light emitted to other regions. For example, when the color of the light emitted to the road sign is a color that is highly sensitive for the light feeling sense of the human eye, for example, a color in which yellow is strong, the headlight for vehicle can improve visibility of the road sign. Therefore, the headlight 1 of the present embodiment can make drive easy.

Further, in the headlight for vehicle according to the third aspect, each of the light emitting optical systems may adjust the total luminous flux amount of the emitted light on the basis of the information from the detection device.

This headlight for vehicle can adjust the total luminous flux amount of the light emitted from each of the light emitting optical systems according to the color of the specific region overlapping at least a part of the target object in the light distribution pattern of the emitted light. Therefore, this headlight for vehicle can suppress unintentional change of the color and brightness of regions other than the specific region in the light distribution pattern in which the color of the specific region is the color of the region other than the specific region. Accordingly, this headlight for vehicle can prevent a driver from feeling uncomfortable even if the light distribution pattern of the emitted light changes according to the situation in front of the vehicle.

Further, in the headlight for vehicle according to the third aspect, the total luminous flux amount of the light in the specific region, of which color is different from the color of regions other than the specific region, may be smaller than the total luminous flux amount of the light in the specific region in the predetermined light distribution pattern.

In this headlight for vehicle, for example, when the target object detected by the detection device is a pedestrian, the total luminous flux amount of the light emitted to the pedestrian can be further reduced, and it is possible to prevent the pedestrian from feeling dazzling due to the light emitted from the headlight for vehicle.

Alternatively, the total luminous flux amount of the light in the specific region, of which color is different from the color of regions other than the specific region, may be larger than the total luminous flux amount of the light in the specific region in the predetermined light distribution pattern.

In this headlight for vehicle, for example, when the target object detected by the detection device is a road sign, the total luminous flux amount of the light emitted to the road sign can be increased, and the visibility of the road sign can be improved.

Further, in the headlight for vehicle according to the third aspect, the detection device may detect a plurality of types of the target object, and the color of the specific region may be a predetermined color corresponding to the type of the target object.

With such a configuration, the driver can assume the type of the target object according to the color of a specific region even in a situation where the target object cannot be clearly viewed, for example, a situation where the target object is far away. Accordingly, this headlight for vehicle can make drive easier than in a case where the color of a specific region is not a predetermined color corresponding to the type of the target object.

Further, in the headlight for vehicle according to the third aspect, the specific region may have a ring shape along an outer edge of the target object.

With such a configuration, existence of the target object can be emphasized.

Further, in the headlight for vehicle according to the third aspect, the target object may be a road sign, the specific region may overlap a region with a predetermined color in the road sign, and the color of the specific region may be a color similar to the predetermined color in the road sign.

With such a configuration, the visibility of the road sign, which is the target object, can be improved.

Further, in the headlight for vehicle according to the third aspect, at least two of the light emitting optical systems may share the phase modulation element, and in the light emitting optical systems sharing the phase modulation element, the laser light may be emitted alternately for each light source of each of the light emitting optical systems, and the phase modulation element may change the phase modulation pattern in synchronization with switching of emission of the laser light for each light source of each of the light emitting optical systems.

In this headlight for vehicle, as described above, at least two light emitting optical systems share the phase modulation element, so that the number of parts can be reduced. Note that, in this headlight for vehicle, light having different wavelengths is sequentially emitted from the light emitting optical systems sharing the phase modulation element. By the way, when pieces of light having different wavelengths, that is, pieces of light of different colors are repeatedly applied in a cycle shorter than the time resolution of human vision, a human may recognize that light obtained by synthesizing the pieces of light of different colors is applied by the afterimage phenomenon. Therefore, when light having different wavelengths is emitted from the light emitting optical systems sharing the phase modulation element with a period shorter than the time resolution of human vision, the light emitted from these light emitting optical systems can be synthesized visually for human, and a predetermined light distribution pattern can be formed by the light emitted from each of the light emitting optical systems including these light emitting optical systems.

BRIEF DESCRIPTION OF DRAWINGS

FIG. 6 is a diagram showing a table in the first embodiment as the first aspect of the present invention.

FIG. 13 is a diagram showing a table in the third embodiment as the first aspect of the present invention.

FIG. 17 is a diagram showing a table in the fourth embodiment as the first aspect of the present invention.

FIG. 25A and FIG. 25B are diagrams showing tables in another modification as the first aspect of the present invention.

FIG. 26 is a diagram showing a table in a seventh embodiment as a second aspect of the present invention.

FIG. 28 is a diagram showing a control flowchart of a control unit in the seventh embodiment as the second aspect of the present invention.

FIG. 32 is a diagram showing a table in an eighth embodiment as a third aspect of the present invention.

DESCRIPTION OF EMBODIMENTS

Hereinafter, embodiments for implementing a headlight for vehicle according to the present invention will be exemplified with reference to the accompanying drawings. The embodiments exemplified below are for the purpose of facilitating the understanding of the present invention, and are not intended to limit the present invention. The present invention can be modified and improved from the following embodiments without departing from the gist thereof.

First Embodiment

Figure 1:
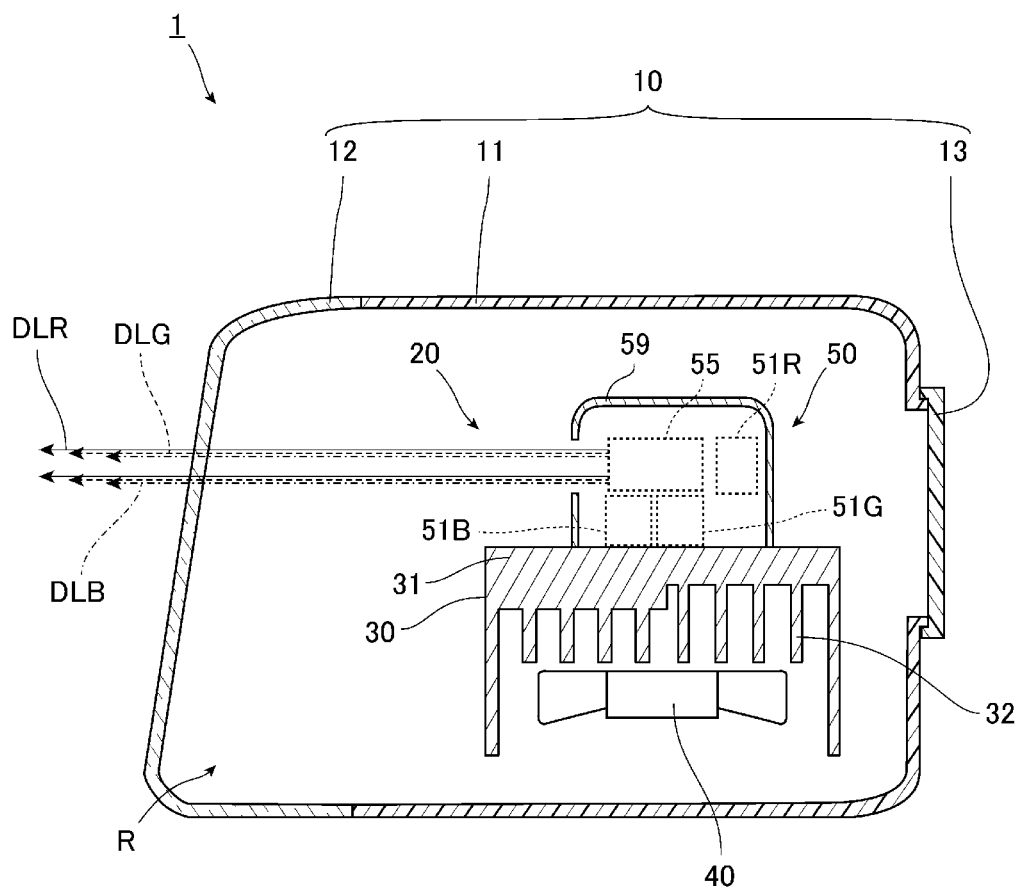
FIG. 1 is a diagram schematically showing a headlight for vehicle according to a first embodiment as the first aspect of the present invention.

FIG. 1 is a diagram showing a headlight for vehicle in a first embodiment as a first aspect, and is a diagram schematically showing a cross section of the headlight for vehicle in a vertical direction. The headlight for vehicle of the present embodiment is a headlight 1 for an automobile. A headlight for an automobile is generally provided in each sides of the left-right direction in front of the vehicle, and the right and left headlights are configured to be substantially symmetrical in the left-right direction. Accordingly, in the present embodiment, one of the headlights will be described. As shown in FIG. 1, the headlight 1 of the present embodiment mainly includes a housing 10, and a lamp unit 20.

The housing 10 mainly includes a lamp housing 11, a front cover 12, and a back cover 13. The front of the lamp housing 11 is open, and the front cover 12 is fixed to the lamp housing 11 so as to close the opening. An opening smaller than that in the front is formed in the rear of the lamp housing 11, and the back cover 13 is fixed to the lamp housing 11 so as to close the opening.

A space formed by the lamp housing 11, the front cover 12 closing the front opening of the lamp housing 11, and a back cover 13 closing the rear opening of the lamp housing 11 is a lamp room R. The lamp unit 20 is housed in the lamp room R.

The lamp unit 20 of the present embodiment mainly includes a heat sink 30, a cooling fan 40, and an optical system unit 50, and is fixed to the housing 10 by a configuration (not shown).

The heat sink 30 has a metal base plate 31 extending in a substantially horizontal direction, and a plurality of heat radiation fins 32 are provided integrally with the base plate 31 on the lower surface side of the base plate 31. The cooling fan 40 is arranged with a gap from the heat radiation fin 32 and is fixed to the heat sink 30. The heat sink 30 is cooled by the air flow generated by the rotation of the cooling fan 40.

The optical system unit 50 is arranged on the upper surface of the base plate 31 of the heat sink 30. The optical system unit 50 includes a first light emitting optical system 51R, a second light emitting optical system 51G, a third light emitting optical system 51B, a synthesizing optical system 55, and a cover 59.

Figure 2:
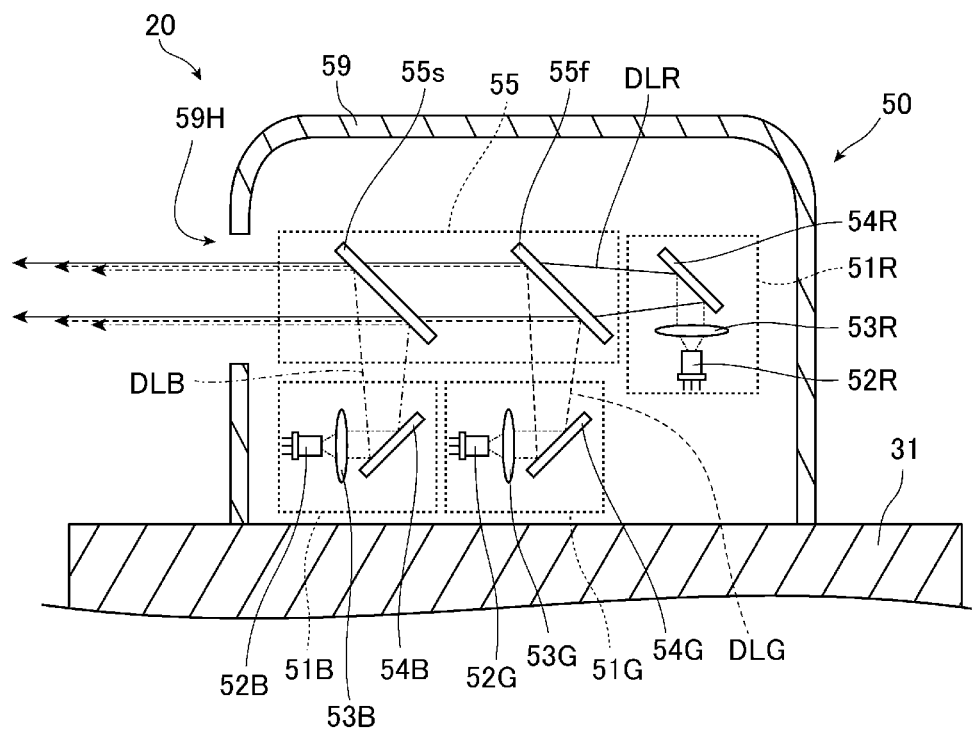
FIG. 2 is an enlarged view of an optical system unit shown in FIG. 1.

FIG. 2 is an enlarged view of an optical system unit shown in FIG. 1. As shown in FIG. 2, the first light emitting optical system 51R includes a light source 52R, a collimator lens 53R, and a phase modulation element 54R. The light source 52R is a laser element that emits laser light having a predetermined wavelength, and, in the present embodiment, emits red laser light having a power peak wavelength of 638 nm, for example. Note that the optical system unit 50 has a circuit board (not shown), and the light source 52R is mounted on the circuit board.

The collimator lens 53R is a lens that collimates the fast axis direction and the slow axis direction of the laser light emitted from the light source 52R. Instead of the collimator lens 53R, a collimator lens that collimates the fast axis direction of the laser light and a collimator lens that collimates the slow axis direction of the laser light may be separately provided.

The phase modulation element 54R is configured to diffract the incident light and emits the light, and change a light distribution pattern of the emitted light and a region irradiated with the emitted light. The phase modulation element 54R of the present embodiment is a reflection type phase modulation element that diffracts and emits incident light while reflecting the incident light, and is, for example, a liquid crystal on silicon (LCOS) which is a reflection type liquid crystal panel. Red laser light emitted from the collimator lens 53R is incident on the phase modulation element 54R, and the phase modulation element 54R diffracts and emits the red laser light. In this way, red first light DLR is emitted from the phase modulation element 54R, and this light DLR is emitted from the first light emitting optical system 51R.

The second light emitting optical system 51G includes a light source 52G, a collimator lens 53G, and a phase modulation element 54G, and the third light emitting optical system 51B includes a light source 52B, a collimator lens 53B, and a phase modulation element 54B. The light sources 52G, 52B are laser elements that each emit laser light having a predetermined wavelength. In the present embodiment, the light source 52G emits green laser light having a power peak wavelength of 515 nm, for example, and, the light source 52B emits blue laser light having a power peak wavelength of 445 nm, for example. Each of the light sources 52G, 52B is mounted on the above-mentioned circuit board as similar to the above-mentioned light source 52R.

The collimator lens 53G is a lens that collimates the fast axis direction and the slow axis direction of the laser light emitted from the light source 52G, and the collimator lens 53B is a lens that collimates the fast axis direction and the slow axis direction of the laser light emitted from the light source 52B. Note that, instead of the collimator lenses 53G, 53B, a collimator lens that collimates the fast axis direction of the laser light and a collimator lens that collimates the slow axis direction of the laser light may be separately provided.

As similar to the phase modulation element 54R, the phase modulation element 54G and the phase modulation element 54B are configured to diffract the incident light and emit the light, and change a light distribution pattern of the emitted light and a region irradiated with the emitted light. These phase modulation elements 54G, 54B are, for example, an LCOS which is a reflective liquid crystal panel. Green laser light emitted from the collimator lens 53G is incident on the phase modulation element 54G, and the phase modulation element 54G diffracts and emits the green laser light. Blue laser light emitted from the collimator lens 53B is incident on the phase modulation element 54B, and the phase modulation element 54B diffracts and emits the blue laser light. In this way, green second light DLG is emitted from the phase modulation element 54G, and this light DLG is emitted from the second light emitting optical system 51G. Further, blue third light DLB is emitted from the phase modulation element 54B, and this light DLB is emitted from the third light emitting optical system 51B. In such a lamp unit 20 of the present embodiment, the light source 52R and the phase modulation element 54R, the light source 52G and the phase modulation element 54G, and the light source 52B and the phase modulation element 54B each have a one-to-one correspondence.

The synthesizing optical system 55 has a first optical element 55$f$ and a second optical element 55$s$. The first optical element 55$f$ is an optical element that synthesizes the first light DLR emitted from the first light emitting optical system 51R and the second light DLG emitted from the second light emitting optical system 51G. In the present embodiment, the first optical element 55$f$ transmits the first light DLR and reflects the second light DLG to synthesize the first light DLR and the second light DLG. The second optical element 55$s$ is an optical element that synthesizes the first light DLR and the second light DLG synthesized by the first optical element 55$f$, and the third light DLB emitted from the third light emitting optical system 51B. In the present embodiment, the second optical element 55$s$ transmits the first light DLR and the second light DLG synthesized by the first optical element 55$f$ and reflects the third light DLB to synthesize the first light DLR, the second light DLG, and the third light DLB. Examples of the first optical element 55f and the second optical element 55s include a wavelength selection filter in which an oxide film is laminated on a glass substrate. By controlling the type and thickness of this oxide film, a configuration can be achieved in which light having a wavelength longer than a predetermined wavelength is transmitted and light having a wavelength shorter than this wavelength is reflected.

In this way, the light obtained by synthesizing the first light DLR, the second light DLG, and the third light DLB in the synthesizing optical system 55 becomes white light, and this white light is emitted from the synthesizing optical system 55. Note that, in FIGS. 1 and 2, the first light DLR is indicated by a solid line, the second light DLG is indicated by a broken line, and the third light DLB is indicated by a dashed line, and these pieces of light DLR, DLG, DLB are shown in a manner of being shifted.

The cover 59 is fixed on the base plate 31 of the heat sink 30. The cover 59 has a substantially rectangular shape and is made of a metal such as aluminum. In the space inside the cover 59, the first light emitting optical system 51R, the second light emitting optical system 51G, the third light emitting optical system 51B, and the synthesizing optical system 55 are arranged. Further, an opening 59H through which the light emitted from the synthesizing optical system 55 can be transmitted is formed in front of the cover 59. Note that the inner walls of the cover 59 are preferably made light-absorbing by black alumite processing or the like. By making the inner walls of the cover 59 light-absorbing, it is possible to prevent light applied to the inner wall of the cover 59 due to unintended reflection or refraction from reflecting and being emitted from the opening 59H in an unintended direction.

Next, the configurations of the phase modulation element 54R, the phase modulation element 54G, and the phase modulation element 54B will be described in detail.

In the present embodiment, the phase modulation element 54R, the phase modulation element 54G, and the phase modulation element 54B have the similar configurations. Therefore, the phase modulation element 54R will be described below, and the description of the phase modulation element 54G and the phase modulation element 54B will be omitted as appropriate.

Figure 3:
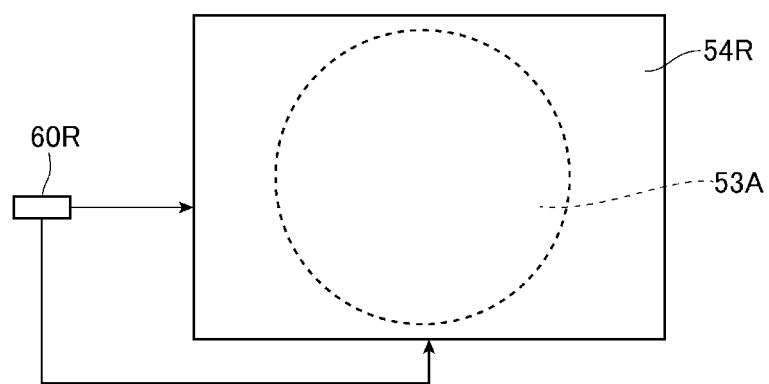
FIG. 3 is a front view of a phase modulation element shown in FIG. 2.

FIG. 3 is a front view of a phase modulation element shown in FIG. 2. Note that, in FIG. 3, a region 53A on which the laser light emitted from the collimator lens 53R is incident is shown by a broken line. The phase modulation element 54R has a rectangular outer shape, and has a plurality of modulation units arranged in a matrix in the rectangle, and each modulation unit diffracts light incident on the modulation unit. Each modulation unit includes a plurality of dots arranged in a matrix. One or more of the modulation units are formed so as to be located in the region 53A in which the laser light emitted from the collimator lens 53R is incident. Further, as shown in FIG. 3, a drive circuit 60R is electrically connected to the phase modulation element 54R, and the drive circuit 60R has a scanning line drive circuit connected to the side of the phase modulation element 54R, and a data line drive circuit connected to one side in the vertical direction of the phase modulation element 54R.

Figure 4:
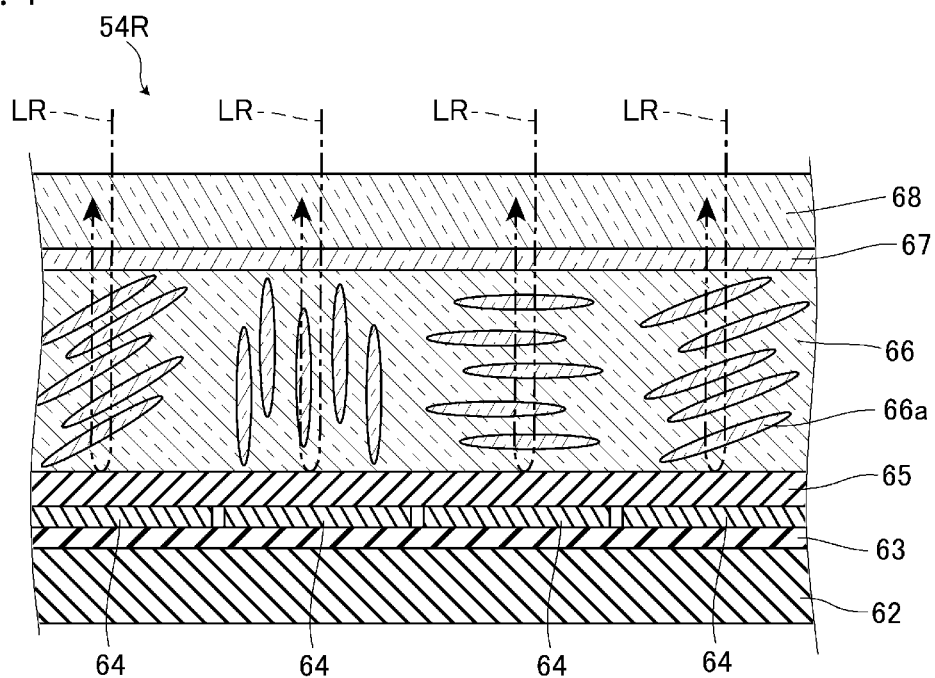
FIG. 4 is a diagram schematically showing a cross section of a part of the phase modulation element shown in FIG. 3 in a thickness direction.

FIG. 4 is a diagram schematically showing a cross section of a part of the phase modulation element shown in FIG. 3 in a thickness direction. As shown in FIG. 4, the phase modulation element 54R of the present embodiment mainly includes a silicon substrate 62, a drive circuit layer 63, a plurality of electrodes 64, a reflective film 65, a liquid crystal layer 66, a transparent electrode 67, and a translucent substrate 68.

The plurality of electrodes 64 are arranged in a matrix corresponding to each dot of the above-mentioned modulation unit on one surface side of the silicon substrate 62, and each dot includes the electrode 64. The drive circuit layer 63 is a layer on which circuits connected to the scanning line drive circuit and the data line drive circuit of the drive circuit 60R shown in FIG. 3 are arranged, and is arranged between the silicon substrate and the plurality of electrodes 64. The translucent substrate 68 is arranged so as to face the silicon substrate 62 on one side of the silicon substrate 62, and is, for example, a glass substrate. The transparent electrode 67 is arranged on the surface of the translucent substrate 68 on the silicon substrate 62 side. The liquid crystal layer 66 has liquid crystal molecules 66a and is arranged between the plurality of electrodes 64 and the transparent electrodes 67. The reflective film 65 is arranged between the plurality of electrodes 64 and the liquid crystal layer 66, and is, for example, a dielectric multilayer film. The laser light emitted from the collimator lens 53R is incident on the surface of the translucent substrate 68 opposite to the silicon substrate 62 side.

As shown in FIG. 4, the light LR incident from the surface of the translucent substrate 68 opposite to the silicon substrate 62 side transmits through the transparent electrode 67 and the liquid crystal layer 66, is reflected by the reflective film 65, is reflected by the liquid crystal layer 66, and is emitted from the translucent substrate 68 through the transparent electrode 67. Here, when a voltage is applied between the specific electrode 64 and the transparent electrode 67, the orientation of the liquid crystal molecules 66a of the liquid crystal layer 66 located between the electrode 64 and the transparent electrode 67 changes, and the refractive index of the liquid crystal layer 66 located between that electrode 64 and the transparent electrode 67 changes. Since the orientation of the liquid crystal molecules 66a changes according to the applied voltage, the refractive index also changes according to this voltage. When the refractive index of the liquid crystal layer 66 changes, the optical path length of the light LR that transmits through the liquid crystal layer 66 changes as described above, and therefore, the phase of the light that transmits through the liquid crystal layer 66 and is emitted from the phase modulation element 54R can be changed. As described above, since the plurality of electrodes 64 are arranged corresponding to dots of the modulation unit, when the voltage applied between the electrode 64 corresponding to each dot and the transparent electrode 67 is controlled, the amount of change in the phase of the light emitted from each dot is adjusted. By adjusting the refractive index of the liquid crystal layer 66 at each dot in this way, the phase modulation element 54R can diffract and emit the incident light and make the light distribution pattern of the emitted light have a desired light distribution pattern. Further, the phase modulation element 54R can change the refractive index of the liquid crystal layer 66 in each dot to change the light distribution pattern of the emitted light or change the direction of the emitted light to change the region irradiated with the light.

In the present embodiment, the phase modulation element 54R forms the same phase modulation pattern in each modulation unit in the phase modulation element 54R. Further, the phase modulation element 54G forms the same phase modulation pattern in each modulation unit in the phase modulation element 54G, and the phase modulation element 54B forms the same phase modulation pattern in each modulation unit in the phase modulation element 54B. Note that, in this specification, the phase modulation pattern indicates a pattern that modulates the phase of incident light. In the present embodiment, the phase modulation pattern is the pattern of the refractive index of the liquid crystal layer 66 at each dot. By adjusting this phase modulation pattern, the light distribution pattern of the emitted light can be made into a desired light distribution pattern. That is, each of the phase modulation elements 54R, 54G, 54B emits light of a light distribution pattern based on the phase modulation pattern of the phase modulation elements 54R, 54G, 54B.

Figure 5:
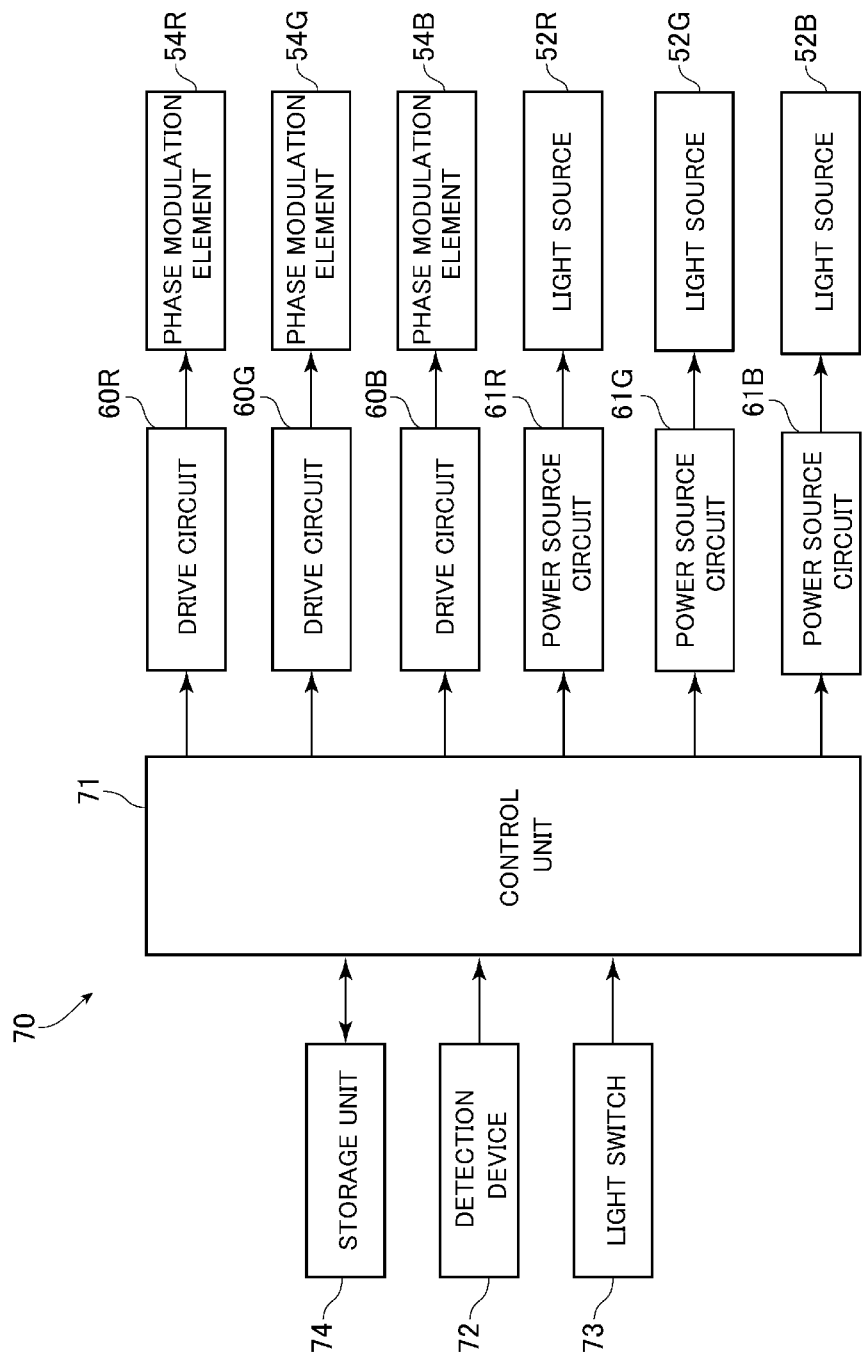
FIG. 5 is a block diagram including a part of the headlight for vehicle and a lamp control system according to the first embodiment as a first aspect of the present invention.

FIG. 5 is a block diagram including a part of the headlight for vehicle and a lamp control system according to the present embodiment as a first aspect. As shown in FIG. 5, in the lamp control system 70 of the present embodiment, drive circuits 60R, 60G, 60B, power supply circuits 61R, 61G, 61B, a detection device 72, a light switch 73, a storage unit 74, and the like are electrically connected to the control unit 71. The control unit 71 may be provided in the lamp unit 20, or may be a part of an electronic control device of the vehicle. For example, the control unit 71 can use an integrated circuit such as a microcontroller, an integrated circuit (IC), a large-scale integrated circuit (LSI), or an application specific integrated circuit (ASIC), or a numerical control (NC) device. Further, when the NC device is used, the control unit 71 may use a machine learning device or may not use a machine learning device. As will be described below, some configurations of the headlight 1 are controlled by the control unit 71. Further, examples of the storage unit 74 include a semiconductor memory such as a ROM, a magnetic disk, and the like.

The drive circuit 60G is electrically connected to the phase modulation element 54G, and the drive circuit 60B is electrically connected to the phase modulation element 54B. As similar to the drive circuit 60R, the drive circuits 60G, 60B have scanning line drive circuits connected to the side of the phase modulation elements 54G, 54B, respectively, and data line drive circuits connected to sides in the vertical direction of the phase modulation elements 54R, 54B, respectively. The drive circuits 60R, 60G, 60B adjust the voltage applied to the phase modulation elements 54R, 54G, 54B on the basis of the signal input from the control unit 71. The phase modulation elements 54R, 54G, 54B form a phase modulation pattern according to the voltage applied by the drive circuits 60R, 60G, 60B.

In the present embodiment, each phase modulation pattern in the phase modulation elements 54R, 54G, 54B is a phase modulation pattern in which a desired light distribution pattern is formed by white light obtained by synthesizing by the synthesizing optical system 55 the first light DLR emitted from the phase modulation element 54R, the second light DLG emitted from the phase modulation element 54G, and the third light DLB emitted from the phase modulation element 54B. The intensity distribution is also included in the desired light distribution patterns. Therefore, in the present embodiment, when a specific light distribution pattern is formed by the white light obtained by synthesizing the light DLR, DLG, DLB emitted from the phase modulation elements 54R, 54G, 54B, each piece of the light DLR, DLG, DLB overlaps with this specific light distribution pattern and has intensity distribution based on the intensity distribution of this specific light distribution pattern. Further, the intensities of the light DLR, DLG, DLB emitted from the phase modulation elements 54R, 54G, 54B are also high in the high intensity portion of the light distribution pattern formed by the white light in which the light DLR, DLG, DLB are synthesized. Note that, since the phase modulation elements 54R, 54G, 54B have wavelength dependence, in the present embodiment, the phase modulation patterns of the phase modulation elements 54R, 54G, 54B are different from each other. Note that, as a result of forming a light distribution pattern by the white light obtained by synthesizing the light DLR, DLG, DLB emitted from the phase modulation elements 54R, 54G, 54B, the phase modulation patterns in these phase modulation elements 54R, 54G, 54B may be the same phase modulation pattern.

As shown in FIGS. 1 and 2, the light DLR, DLG, DLB emitted from the phase modulation elements 54R, 54G, 54B is synthesized by the synthesizing optical system 55, and the synthesized light is emitted from the opening 59H of the cover 59, and is emitted from the headlight 1 through the front cover 12. Since this light is light of a light distribution pattern based on the phase modulation pattern in the phase modulation elements 54R, 54G, 54B, by adjusting the phase modulation pattern in the phase modulation elements 54R, 54G, 54B, the light distribution pattern of the light emitted from the headlight 1 can be a desired light distribution pattern.

The power supply circuit 61R is electrically connected to the light source 52R, the power supply circuit 61G is electrically connected to the light source 52G, and the power supply circuit 61B is electrically connected to the light source 52B. A power supply (not shown) is connected to these power supply circuits 61R, 61G, 61B. Each of the power supply circuits 61R, 61G, 61B adjusts the power supplied from the power supply to the light sources 52R, 52G, 52B on the basis of the signal input from the control unit 71, and adjusts the intensity of the laser light emitted from the light sources 52R, 52G, 52B. Note that the power supply circuits 61R, 61G, 61B may adjust the power supplied to the light sources 52R, 52G, 52B by pulse width modulation (PWM) control. In this case, by adjusting the duty cycle, the intensity of the laser light emitted from these light sources 52R, 52G, 52B is adjusted.

The detection device 72 detects a predetermined target object located in front of the vehicle. Examples of the target object detected by the detection device 72 include vehicles such as a preceding vehicle and an oncoming vehicle, a pedestrian, and a sign. Further, examples of the configuration of the detection device 72 include a configuration including a camera, an image processing unit, a detection unit, and the like (not shown). The camera photographs the front of the vehicle, and the image captured by the camera includes at least a part of the region irradiated with the light emitted from the headlight 1. The image processing unit performs image processing on the image captured by the camera. The detection unit detects the existence of the target object and the existence position of the target object from the information obtained by the image processing by the image processing unit. When the detection device 72 detects a predetermined target object located in front of the vehicle, the detection device 72 transmits information on the existence of the target object and the existence position of the target object to the control unit 71. The existence position of the target object is, for example, the relative position of the target object with respect to the light distribution pattern of the light emitted from the headlight 1 on the vertical surface at a predetermined distance from the vehicle, and includes the region where the target object is located on the vertical surface. Note that the target object detected by the detection device 72, the number of types of the target object, and the configuration of the detection device 72 are not particularly limited. For example, the detection device 72 may detect the existence and the existence position of the target object without contact with the target object by using, for example, a millimeter wave radar or an infrared radar instead of the camera, and may detect the existence and the existence position of the target object without contact with the target object using a combination of the camera and the millimeter wave radar or an infrared radar.

The light switch 73 is a switch with which the driver instructs the headlight 1 to emit or not emit light. For example, when the light switch 73 is turned on, the light switch 73 outputs a signal instructing the emission of light from the headlight 1.

The storage unit 74 stores information on the light distribution pattern formed by the light obtained by synthesizing the light DLR, DLG, DLB emitted from the phase modulation elements 54R, 54G, 54B. The number of the light distribution patterns is plural, and information on each light distribution pattern is stored in the storage unit 74. Specifically, as shown in FIG. 6, a table TB is stored in the storage unit 74. In the table, for each light distribution pattern, the phase modulation pattern in the phase modulation elements 54R, 54G, 54B when forming the light distribution pattern and the intensity of the laser light emitted from the light sources 52R, 52G, 52B when forming the light distribution pattern are associated.

Figure 7A:
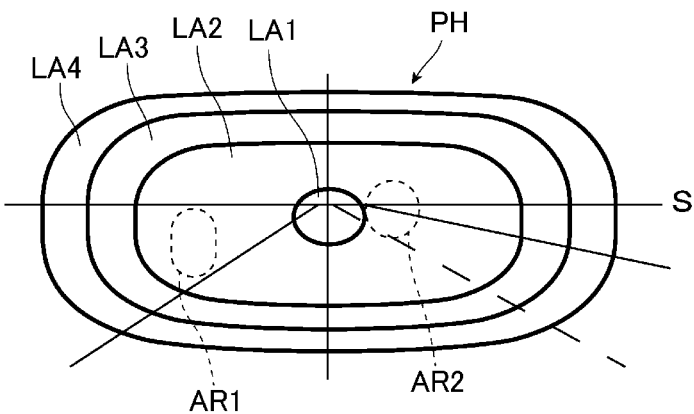
FIG. 7A, FIG. 7B, and FIG. 7C are diagrams showing examples of a light distribution pattern in the first embodiment as the first aspect of the present invention.
Figure 7B:
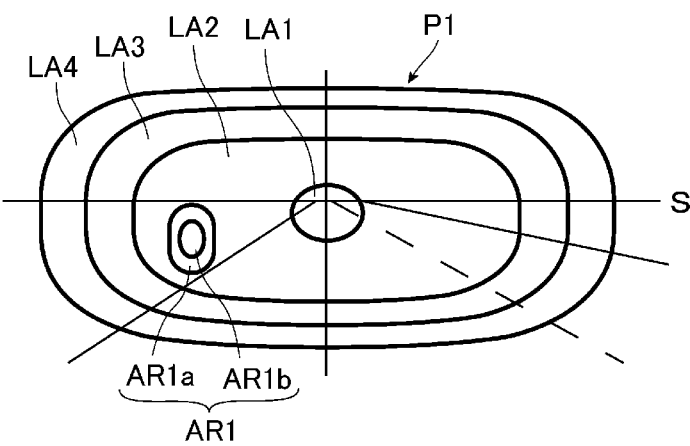
Figure 7C:
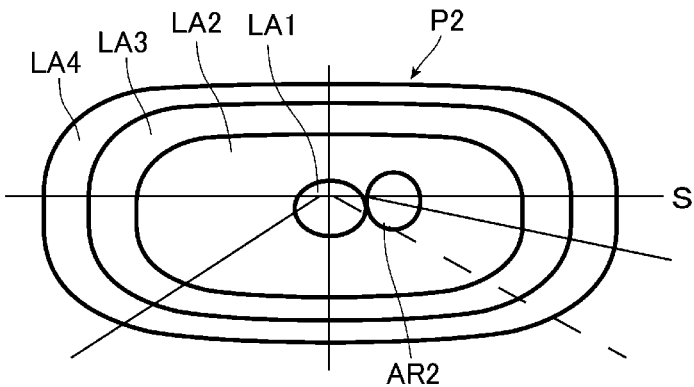

FIG. 7A, FIG. 7B and FIG. 7C are diagrams showing examples of a light distribution pattern in the present embodiment as the first aspect. Specifically, FIG. 7A is a diagram showing a high beam light distribution pattern, FIG. 7B is a diagram showing a light distribution pattern in which a specific region in the high beam light distribution pattern is darkened, and FIG. 7C is a diagram showing a light distribution pattern in which another specific region in the high beam light distribution pattern is darkened. In FIGS. 7A, 7B, and 7C, S indicates a horizontal line, the light distribution pattern is indicated by a thick line, and this light distribution pattern is a light distribution pattern formed on a vertical plane 25 m away from the vehicle.

In the high beam light distribution pattern PH shown in FIG. 7A, a region LA1 is the region having the highest intensity, and regions LA2, LA3, and LA4 have lower intensities in this order. That is, the phase modulation pattern in each of the phase modulation elements 54R, 54G, 54B is a phase modulation pattern in which the synthesized light forms a light distribution pattern including the intensity distribution of the high beam.

The light distribution pattern P1 shown in FIG. 7B is a light distribution pattern in which a specific region AR1 in the high beam light distribution pattern PH is darkened. That is, the light intensity of the specific region AR1 in the light distribution pattern P1 is lower than the light intensity of the specific region AR1 in the high beam light distribution pattern PH, and the total luminous flux amount of the light in the specific region AR1 in the light distribution pattern P1 is smaller than the total luminous flux amount of the light in the specific region AR1 in the high beam light distribution pattern PH. Further, the intensity distribution in the light distribution pattern P1 other than the specific region AR1 is the same as the intensity distribution in the high beam light distribution pattern PH other than the specific region AR1. Note that, in FIG. 7A, the specific region AR1 in the high beam light distribution pattern PH is indicated by a broken line. In the present embodiment, the specific region AR1 of the light distribution pattern P1 is located in the region LA2, and a central region AR1a in this specific region AR1 is darker than an edge side region AR1b. Further, the light intensity of the central region AR1a and the edge side region AR1b of the specific region AR1 in the light distribution pattern P1 is lower than the intensity of the region LA3.

The light distribution pattern P2 shown in FIG. 7C is a light distribution pattern in which another a specific region AR2 different from the specific region AR1 in the high beam light distribution pattern PH is darkened. That is, the light intensity of the specific region AR2 in the light distribution pattern P2 is lower than the light intensity of the specific region AR2 in the high beam light distribution pattern PH, and the total luminous flux amount of the light in the specific region AR2 in the light distribution pattern P2 is smaller than the total luminous flux amount of the light in the specific region AR2 in the high beam light distribution pattern PH. Further, the intensity distribution in the light distribution pattern P2 other than the specific region AR2 is the same as the intensity distribution in the high beam light distribution pattern PH other than the specific region AR2. Note that, in FIG. 7A, the specific region AR2 in the high beam light distribution pattern PH is indicated by a broken line. In the present embodiment, the specific region AR2 of the light distribution pattern P2 is located in the region LA2, and the light intensity of the specific region AR2 is lower than the intensity of the region LA2.

As described above, the light distribution pattern of the light emitted from the headlight 1 in the present embodiment is the high beam light distribution pattern PH or the light distribution patterns P1, P2 in which the specific regions AR1, AR2 in the high beam light distribution pattern PH are darkened. Note that the positions, shapes, numbers, and sizes of the specific regions AR1, AR2 in the light distribution patterns P1, P2 are not particularly limited. Further, the number of light distribution patterns P1, P2 in which the specific regions AR1, AR2 in the high beam light distribution pattern PH are darkened is not limited. Further, the light intensity of the specific regions AR1, AR2 in the light distribution patterns P1, P2 is not particularly limited, and the light intensity of the specific regions AR1, AR2 may be zero, that is, light may not be emitted to the specific regions AR1, AR2. Further, the degree of darkness in the specific regions AR1, AR2 may be substantially constant throughout the specific regions AR1, AR2, and the degree of darkness in the specific regions AR1, AR2 may change according to the position in the specific regions AR1, AR2. Further, the intensity distribution in the light distribution patterns P1, P2 other than the specific regions AR1, AR2 may be different from the intensity distribution in the high beam light distribution pattern PH other than the specific regions AR1, AR2. Further, the outer shape of the light distribution patterns P1, P2 may be different from the outer shape of the high beam light distribution pattern PH.

Figure 8:
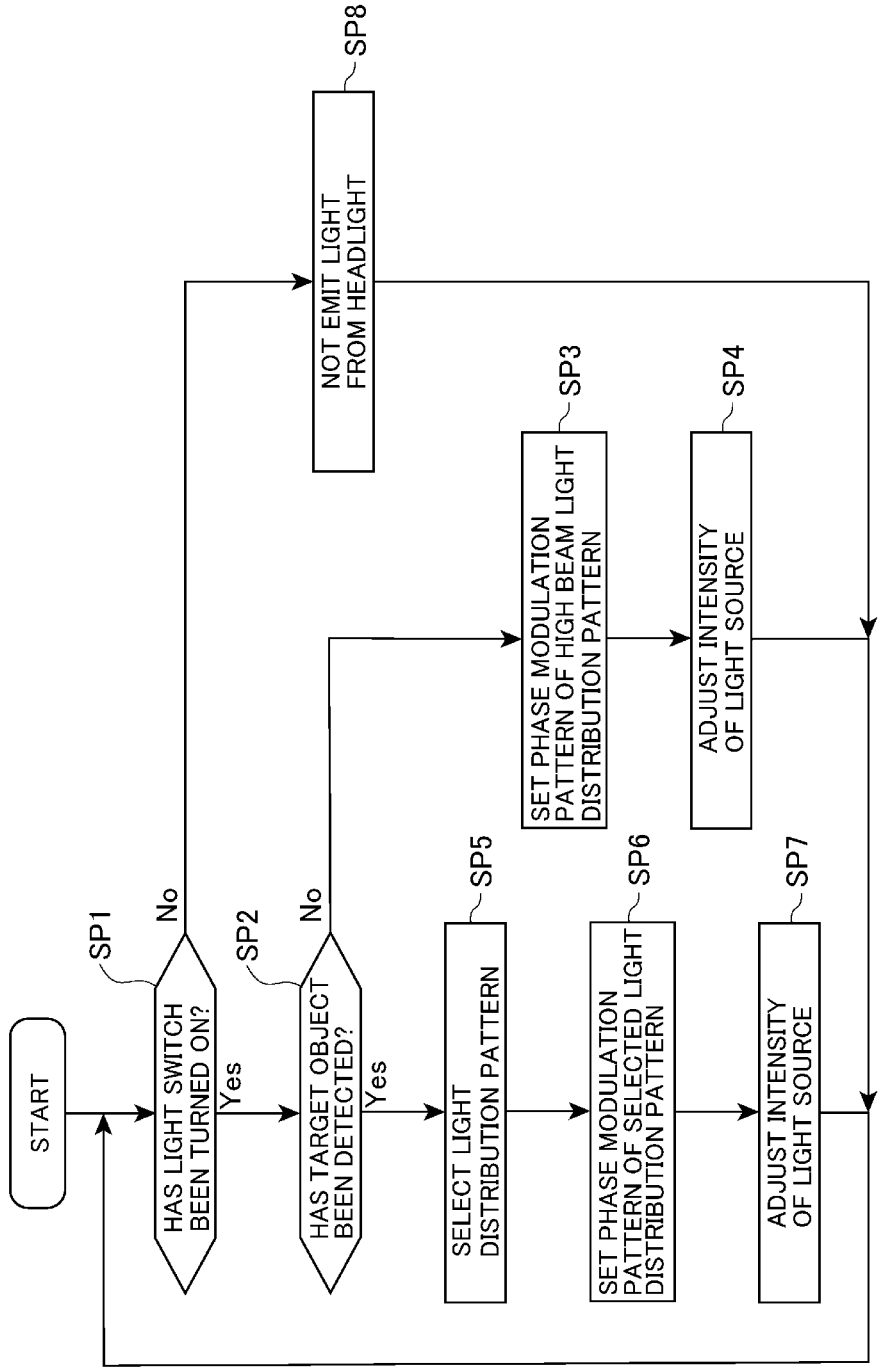
FIG. 8 is a diagram showing a control flowchart of a control unit in the first embodiment as the first aspect of the present invention.

Next, the operation of the headlight 1 of the present embodiment will be described. Specifically, operation of changing the light distribution pattern of the light emitted according to the situation in front of the vehicle from the high beam light distribution pattern PH to another light distribution pattern will be described. FIG. 8 is a diagram showing a control flowchart of the control unit 71.

First, in step SP1, when the light switch 73 is turned on and a signal instructing the emission of light from the light switch 73 is input to the control unit 71, the control flow of the control unit 71 proceeds to step SP2. On the other hand, in step SP1, when this signal is not input to the control unit 71, the control flow of the control unit 71 proceeds to step SP8.

In step SP2, when the detection device 72 does not detect a predetermined target object located in front of the vehicle and the detection device 72 does not input the information on the existence of the target object and the existence position of the target object to the control unit 71, the control flow of the control unit 71 proceeds to step SP3. On the other hand, in step SP2, when this information is input to the control unit 71, the control flow of the control unit 71 proceeds to step SP5.

In step SP3, the control unit 71 controls the phase modulation elements 54R, 54G, 54B on the basis of the information associated with the high beam light distribution pattern PH in the table TB stored in the storage unit 74. Specifically, the control unit 71 outputs a signal based on this information to the drive circuits 60R, 60G, 60B, and the drive circuits 60R, 60G, 60B adjust the voltage applied to the phase modulation elements 54R, 54G, 54B on the basis of the signal input from the control unit 71. This voltage is a voltage that forms a phase modulation pattern in which the light distribution pattern formed by the phase modulation elements 54R, 54G, 54B with the light obtained by synthesizing the light DLR, DLG, DLB is the high beam light distribution pattern PH. Therefore, each of the phase modulation elements 54R, 54G, 54B set a phase modulation pattern in which the light distribution pattern formed by the light obtained by synthesizing the light DLR, DLG, DLB is the high beam light distribution pattern PH. That is, in step SP3, it is understood that each of the phase modulation elements 54R, 54G, 54B sets a phase modulation pattern in which the light distribution pattern formed by the light obtained by synthesizing the light DLR, DLG, DLB is the high beam light distribution pattern PH on the basis of the information associated with the high beam light distribution pattern PH in the table TB.

Next, in step SP4, the control unit 71 controls the light sources 52R, 52G, 52B on the basis of the information associated with the high beam light distribution pattern PH in the table TB. Specifically, the control unit 71 outputs a signal based on this information to the power supply circuits 61R, 61G, 61B, and the power supply circuits 61R, 61G, 61B adjust the power supplied from the power supply to the light sources 52R, 52G, 52B on the basis of the signal input from the control unit 71. This power is defined as the power at which the intensity of the laser light emitted from the light sources 52R, 52G, 52B is the intensity associated with the high beam light distribution pattern PH in the table TB. Therefore, in step SP4, the light sources 52R, 52G, 52B emit the laser light of the intensity associated with the high beam light distribution pattern PH in the table TB. The laser light emitted from the light sources 52R, 52G, 52B whose intensity is adjusted as described above is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized white light is emitted from the headlight 1. Since the light distribution pattern of the light obtained by synthesizing the light DLR, DLG, DLB is the high beam light distribution pattern PH, the light of the high beam light distribution pattern PH is emitted from the headlight 1.

By the way, as described above, the intensity of the laser light emitted from the light sources 52R, 52G, 52B is the intensity associated with the high beam light distribution pattern PH. Therefore, the total luminous flux amount of each laser light emitted from the light sources 52R, 52G, 52B is the total luminous flux amount according to the high beam light distribution pattern PH, and the light DLR, DLG, DLB caused by the laser light is emitted from the lamp unit 20. Accordingly, the total luminous flux amount of the light DLR, DLG, DLB emitted from the lamp unit 20 is adjusted to the total luminous flux amount according to the high beam light distribution pattern PH.

Note that, in step SP2, when the detection device 72 does not input the information on the existence of the target object and the existence position of the target object to the control unit 71, the control unit 71 may perform control in step SP3 and step SP4 at the same time. Further, the control flow of the control unit 71 may proceed in the order of step SP4 and step SP3, and may return to step SP1.

In step SP2, when the detection device 72 inputs the information on the existence of the target object and the existence position of the target object to the control unit 71, the control flow of the control unit 71 proceeds to step SP5 as described above. In step SP5, the control unit 71 selects one light distribution pattern from the light distribution patterns in the table TB on the basis of this information input from the detection device 72. Specifically, the control unit 71 selects one light distribution pattern in which at least a part of the target object detected by the detection device 72 and a specific region in the light distribution pattern overlap from the light distribution patterns in the table TB.

Next, in step SP6, the control unit 71 controls the phase modulation elements 54R, 54G, 54B on the basis of the information associated with the light distribution pattern selected in step SP5 in the table TB. In this case, as similar to step SP3 described above, the phase modulation elements 54R, 54G, 54B set a phase modulation pattern in which the light distribution pattern formed by the light obtained by synthesizing the light DLR, DLG, DLB is the light distribution pattern selected in step SP5. Here, as described above, the light distribution pattern selected in step SP5 is selected on the basis of the information from the detection device 72, and is the light distribution pattern in which a specific region to be darkened overlaps at least a part of the target object. Accordingly, it is understood that each of the phase modulation elements 54R, 54G, 54B sets a phase modulation pattern in which the light distribution pattern formed by the light obtained by synthesizing the light DLR, DLG, DLB is the light distribution pattern in which a specific region overlapping at least a part of the target object is darkened on the basis of the information from the detection device 72.

Next, in step SP7, the control unit 71 controls the light sources 52R, 52G, 52B on the basis of the information associated with the light distribution pattern selected in step SP5 in the table TB. In this case, as similar to step SP4 described above, the light sources 52R, 52G, 52B emit laser light of the intensity associated with the light distribution pattern selected in step SP5 in the table TB. The laser light emitted from the light sources 52R, 52G, 52B whose intensity is adjusted as described above is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized white light is emitted from the headlight 1. Since the light distribution pattern of the light obtained by synthesizing the light DLR, DLG, DLB is the light distribution pattern selected in step SP5, the light of the light distribution pattern selected in step SP5 is emitted from the headlight 1.

By the way, as described above, the intensity of the laser light emitted from the light sources 52R, 52G, 52B is the intensity associated with the light distribution pattern selected in step SP5 in the table TB. Therefore, the total luminous flux amount of each laser light emitted from the light sources 52R, 52G, 52B is the total luminous flux amount according to the light distribution pattern selected in step SP5, and the light DLR, DLG, DLB caused by the laser light is emitted from the lamp unit 20. Accordingly, the total luminous flux amount of the light DLR, DLG, DLB emitted from the lamp unit 20 is adjusted to the total luminous flux amount according to the light distribution pattern selected in step SP5.

In the present embodiment, the intensity of the laser light associated with the light distribution pattern in the table TB is the intensity reduced according to the amount of decrease in the total luminous flux amount in a specific region to be darkened in each light distribution pattern with reference to the intensity when the light of the high beam light distribution pattern PH is emitted. That is, when the amount of decrease in the total luminous flux amount in the specific region to be darkened is large, the degree of decrease in the intensity of the laser light emitted from the light sources 52R, 52G, 52B is large. On the other hand, when the amount of decrease in the total luminous flux amount in the specific region to be darkened is small, the degree of decrease in the intensity of the laser light emitted from the light sources 52R, 52G, 52B is small.

Figure 9A:
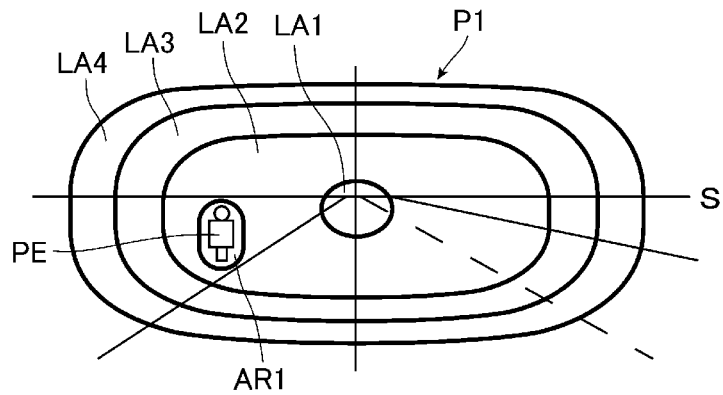
FIG. 9A and FIG. 9B are diagrams showing examples of a state of emitting light of a light distribution pattern in which a target object detected by a detection device and a specific region to be darkened overlap, from a headlight for vehicle.
Figure 9B:
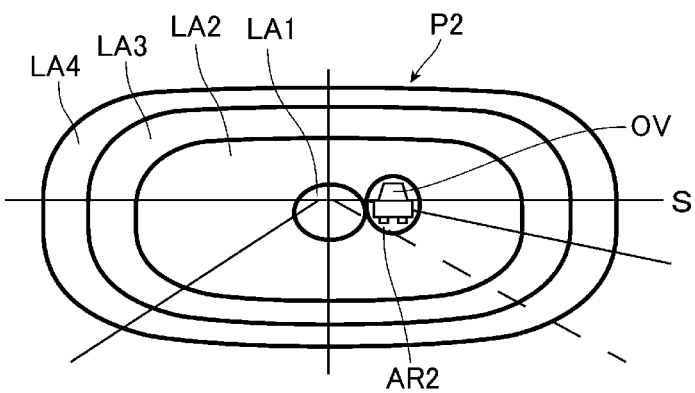

FIG. 9A, FIG. 9B, and FIG. 9C are diagrams showing examples of a state of emitting light of a light distribution pattern in which a target object detected by a detection device and a specific region to be darkened overlap, from a headlight. Specifically, FIG. 9A is a diagram showing an example of a state in which the light of the light distribution pattern when a pedestrian PE is detected as a target object by the detection device 72 is emitted from the headlight 1. FIG. 9B is a diagram showing an example of a state in which the light of the light distribution pattern when an oncoming vehicle OV is detected as a target object by the detection device 72 is emitted from the headlight 1. The light distribution pattern shown in FIG. 9A is the light distribution pattern P1 shown in FIG. 7B, and, as described above, is a light distribution pattern in which a specific region AR1 in the high beam light distribution pattern PH is darkened. Note that, in FIG. 9A, the description of the central region AR1*a* and the edge side region AR1*b* in the specific region AR1 is omitted. This specific region AR1 overlaps the entire pedestrian PE. Therefore, the total luminous flux amount of the light emitted to the pedestrian PE is reduced as compared to the case where the high beam is emitted from the headlight 1. The light distribution pattern shown in FIG. 9B is the light distribution pattern P2 shown in FIG. 7C, and, as described above, is a light distribution pattern in which a specific region AR2 in the high beam light distribution pattern PH is darkened. This specific region AR2 overlaps the entire oncoming vehicle OV. Therefore, the total luminous flux amount of the light emitted to the oncoming vehicle OV is reduced as compared to the case where the high beam is emitted from the headlight 1.

As described above, FIG. 9A shows a state in which the light of the light distribution pattern P1 in which the entire pedestrian PE overlaps the specific region AR1 is emitted from the headlight 1, and FIG. 9B shows a state in which the light of the light distribution pattern P2 in which the entire oncoming vehicle OV overlaps the specific region AR2 is emitted from the headlight 1. However, the light emitted from the headlight 1 as the first aspect is only required to be light of a light distribution pattern in which at least a part of the target object detected by the detection device 72 overlaps a specific region to be darkened. For example, the light emitted from the headlight 1 may be light in which the entire head of the pedestrian PE, which is the target object, overlaps with a specific region to be darkened, and the torso of the pedestrian PE overlaps a region other than the specific region to be darkened. Further, the light emitted from the headlight 1 may be light in which the entire windshield of the oncoming vehicle OV, which is the target object, overlaps with a specific region to be darkened, and the lower side portion from of the oncoming vehicle OV from the windshield overlaps a region other than the specific region to be darkened. That is, in step SP5, the control unit 71 may select such a light distribution pattern.

Further, in step SP2 described above, when the detection device 72 inputs the information on the existence of the target object and the existence position of the target object to the control unit 71, the control unit 71 may perform control in step SP6 and step SP7 at the same time. Further, the control flow of the control unit 71 may proceed in the order of step SP5, step SP7, and step SP6, and may return to step SP1.

As described above, in step SP1, when the control flow of the control unit 71 proceeds to step SP8 to the control unit 71 without inputting of the signal instructing the light emission from the light switch 73, the control unit 71 controls the light sources 52R, 52G, 52B to not to emit the laser light from the light sources 52R, 52G, 52B. In this case, the power supply circuits 61R, 61G, 61B stop the supply of electric power from the power supply to the light sources 52R, 52G, 52B on the basis of the signal input from the control unit 71. Therefore, the light sources 52R, 52G, 52B do not emit the laser light, and the headlight 1 does not emit the light.

As described above, when the detection device 72 does not detect a predetermined target object located in front of the vehicle, the headlight 1 of the present embodiment emits the light of the high beam light distribution pattern PH. On the other hand, when the detection device 72 detects a predetermined target object located in front of the vehicle, the headlight 1 emits light of the light distribution patterns P1, P2 in which at least a part of the target object overlaps a specific region to be darkened.

By the way, in the headlight for vehicle disclosed in Patent Literature 1, the size of the region irradiated with the low beam in the vertical surface predetermined distance away from the vehicle and the size of the region irradiated with the light of the urban light distribution pattern are different from each other. Therefore, in this headlight for vehicle, an unintentional change as a whole in the brightness of the region irradiated with the light tends to occur when the light distribution pattern of the emitted light is changed, and a driver feels uncomfortable in some cases.

Therefore, the headlight 1 of the present embodiment as the first aspect includes the lamp unit 20 having the light sources 52R, 52G, 52B that emit laser light and the phase modulation elements 54R, 54G, 54B. The phase modulation element 54R diffracts the laser light emitted from the light source 52R with the phase modulation pattern that is changeable, and emits light of the light distribution pattern based on the phase modulation pattern. The phase modulation element 54G diffracts the laser light emitted from the light source 52G with the phase modulation pattern that is changeable, and emits light of the light distribution pattern based on the phase modulation pattern. The phase modulation element 54B diffracts the laser light emitted from the light source 52B with the phase modulation pattern that is changeable, and emits light of the light distribution pattern based on the phase modulation pattern. In the lamp unit 20, a light distribution pattern is formed by the light obtained by synthesizing the first light DLR emitted from the phase modulation element 54R, the second light DLG emitted from the phase modulation element 54G, and the third light DLB emitted from the phase modulation element 54B. The light of this light distribution pattern is emitted from the lamp unit 20.

Therefore, in the headlight 1 of the present embodiment as the first aspect, by changing each phase modulation pattern in the phase modulation elements 54R, 54G, 54B, the light distribution pattern of the light emitted from the lamp unit 20 can be changed, and the light distribution pattern of the light emitted from the headlight 1 can be changed.

Further, in the headlight 1 of the present embodiment as the first aspect, each of the phase modulation elements 54R, 54G, 54B sets a phase modulation pattern in which the light distribution pattern formed by the light obtained by synthesizing the light DLR, DLG, DLB emitted from the phase modulation elements 54R, 54G, 54B is the light distribution patterns P1, P2 in which specific regions AR1, AR2 overlapping at least a part of the target object is darkened on the basis of the information from the detection device 72. Therefore, in the headlight 1 of the present embodiment as the first aspect, the light distribution pattern of the emitted light changes according to the situation in front of the vehicle. For example, as shown in FIG. 9A, when the target object detected by the detection device 72 is the pedestrian PE, the total luminous flux amount of the light emitted to the pedestrian PE can be reduced, and it is possible to prevent the pedestrian PE from feeling dazzling due to the light emitted from the headlight 1. Further, as shown in FIG. 9B, when the target object detected by the detection device 72 is the oncoming vehicle OV, the total luminous flux amount of the light emitted to the oncoming vehicle OV can be reduced, and it is possible to prevent the driver of the oncoming vehicle OV from feeling dazzling due to the light emitted from the headlight 1.

Further, in the headlight 1 of the present embodiment as the first aspect, the lamp unit 20 reduces the total luminous flux amount of the light emitted from the lamp unit 20 according to the light distribution patterns P1, P2 in which the specific regions AR1, AR2 are darkened. Therefore, the headlight 1 of the present embodiment as the first aspect can reduce the total luminous flux amount of the light emitted from the lamp unit 20 by the amount of reducing the total luminous flux amount of the light emitted to the target object, and can prevent a region other than the specific regions AR1, AR2 of the light distribution patterns P1, P2 in which the specific regions AR1, AR2 are darkened from being unintentionally brightened as a whole. Accordingly, the headlight 1 of the present embodiment as the first aspect can prevent a driver from feeling uncomfortable even if the light distribution pattern of the emitted light changes according to the situation in front of the vehicle.

Further, in the headlight 1 of the present embodiment as the first aspect, the intensity distribution in the light distribution patterns P1, P2 other than the specific regions AR1, AR2 is the same as the intensity distribution in the high beam light distribution pattern PH other than the specific regions AR1, AR2. Therefore, since, in the headlight 1 of the present embodiment, the intensity distribution in a region other than the specific regions AR1, AR2 to be darkened does not change according to the change in the light distribution pattern of the emitted light, it is possible to further prevent the driver from feeling uncomfortable. Note that if the intensity of light at a plurality of reference points is the same, it can be estimated that the intensity distribution is also the same, and for example, if the brightness or illuminance at a plurality of reference points is the same, it can be estimated that the intensity distribution is also the same. The plurality of reference points preferably include the point having the maximum intensity.

Further, in the headlight 1 of the present embodiment as the first aspect, the lamp unit 20 reduces the intensity of the laser light emitted from the light sources 52R, 52G, 52B, and reduces the total luminous flux amount of the light emitted from the lamp unit 20. Therefore, the lamp unit 20 can adjust the total luminous flux amount of the light emitted from the lamp unit 20 without providing a dimming filter or the like, and the headlight 1 can have a simple configuration.

Further, in the present embodiment as the first aspect, in the light distribution pattern P1 in which the specific region AR1 in the high beam light distribution pattern PH is darkened, the central region AR1a of the specific region AR1 is darker than the edge side region AR1b. Therefore, while reducing the total luminous flux amount of the light emitted to the pedestrian PE, which is the target object, it is possible to prevent the pedestrian PE from becoming difficult to view.

Further, in the present embodiment as the first aspect, as described above, the intensity of the laser light associated with the light distribution pattern in the table TB is the intensity reduced according to the amount of decrease in the total luminous flux amount in a specific region to be darkened in each light distribution pattern with reference to the intensity when the light of the high beam light distribution pattern PH is emitted. However, from the viewpoint of suppressing the complicated adjustment of the total luminous flux amount of the light emitted from the lamp unit 20, when the size of the specific regions AR1, AR2 exceeds a predetermined size, the intensity of the laser light associated with the light distribution pattern in the table TB may be the intensity reduced according to the amount of decrease in the total luminous flux amount in a specific region to be darkened in each light distribution pattern with reference to the intensity when the light of the high beam light distribution pattern PH is emitted. That is, the lamp unit 20 may reduce the total luminous flux amount of the light emitted from the lamp unit 20 when the size of the specific regions AR1, AR2 exceeds a predetermined size. This is the same as reducing the total luminous flux amount of the light emitted by the lamp unit 20 when the size of the light distribution pattern of the light emitted from the headlight 1 is equal to or smaller than the predetermined size of the lamp unit 20. With such a configuration, since the lamp unit 20 reduces or does not reduce the total luminous flux amount of the light emitted from the lamp unit 20 on the basis of a threshold, it is possible to suppress adjustment of the total luminous flux amount of the light emitted from the lamp unit 20 becoming complicated. Note that the size here is defined as the size when the light distribution pattern is formed on the vertical surface at a predetermined distance from the vehicle. Further, from the viewpoint of further preventing the driver from feeling uncomfortable, it is preferable that the reducing amount of the total luminous flux amount of the light in the specific regions AR1, AR2 and the reducing amount of the total luminous flux amount of the light emitted from the lamp unit 20 are substantially the same.

Further, when the total luminous flux amount of the light of the specific regions AR1, AR2 in the high beam light distribution pattern PH exceeds a predetermined amount, the intensity of the laser light associated with the light distribution pattern in the table TB may be the intensity reduced according to the amount of decrease in the total luminous flux amount in the specific regions AR1, AR2 to be darkened in each light distribution pattern with reference to the intensity when the light of the high beam light distribution pattern PH is emitted. That is, the lamp unit 20 may reduce the total luminous flux amount of the light emitted from the lamp unit 20 when the total luminous flux amount of the light of the specific regions AR1, AR2 before being darkened, that is, the total luminous flux amount of the light of the specific regions AR1, AR2 in the high beam light distribution pattern PH exceeds a predetermined amount. With such a configuration, since the lamp unit 20 reduces or does not reduce the total luminous flux amount of the light emitted from the lamp unit 20 on the basis of a threshold, it is possible to suppress adjustment of the total luminous flux amount of the light emitted from the lamp unit 20 becoming complicated.

Second Embodiment

Next, a second embodiment as the first aspect of the present invention will be described in detail. Note that the same or equivalent constituent elements as those of the first embodiment are denoted by the same reference numerals, and redundant explanation will be omitted except when particularly described.

The vehicle lamp of the present embodiment is the headlight 1 for an automobile as similar to the first embodiment. Further, since the configuration of the headlight 1 of the present embodiment is the same as that of the headlight 1 of the first embodiment, the headlight 1 of the present embodiment will be described with reference to FIGS. 1 and 2.

The table TB stored in the storage unit 74 of the present embodiment is different from the table TB of the first embodiment, and the light distribution pattern of the light emitted from the headlight 1 of the present embodiment is different from the light distribution pattern of the light emitted from the headlight 1 of the first embodiment.

Specifically, in the table TB of the present embodiment, for each of the high beam light distribution pattern PH and the low beam light distribution pattern shown in FIG. 7A, the phase modulation pattern in the phase modulation elements 54R, 54G, 54B when forming the light distribution pattern and the intensity of the laser light of the light sources 52R, 52G, 52B when forming the light distribution pattern are associated. This table TB is stored in the storage unit 74.

Figure 10:
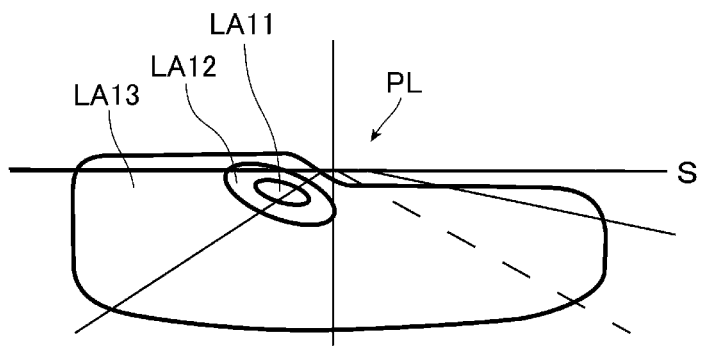
FIG. 10 is a diagram showing a low beam light distribution pattern in a second embodiment as the first aspect of the present invention.

FIG. 10 is a diagram showing a low beam light distribution pattern in the present embodiment. In FIG. 10, S indicates a horizontal line, the light distribution pattern is indicated by a thick line, and this light distribution pattern is a light distribution pattern formed on a vertical plane 25 m away from the vehicle. In the low beam light distribution pattern PL shown in FIG. 10, a region LA11 is the region having the highest intensity, and regions LA12 and LA13 have lower intensities in this order. That is, the phase modulation pattern in each of the phase modulation elements 54R, 54G, 54B is a phase modulation pattern in which the synthesized light forms a light distribution pattern including the intensity distribution of the low beam. Further, the size of the low beam light distribution pattern PL is smaller than the size of the high beam light distribution pattern PH. Note that the size here is defined as the size when the light distribution pattern is formed on the vertical surface at a predetermined distance from the vehicle.

The intensity of the laser light associated with the low beam light distribution pattern PL in the table TB is lower than the intensity when emitting the light of the high beam light distribution pattern PH.

Figure 11:
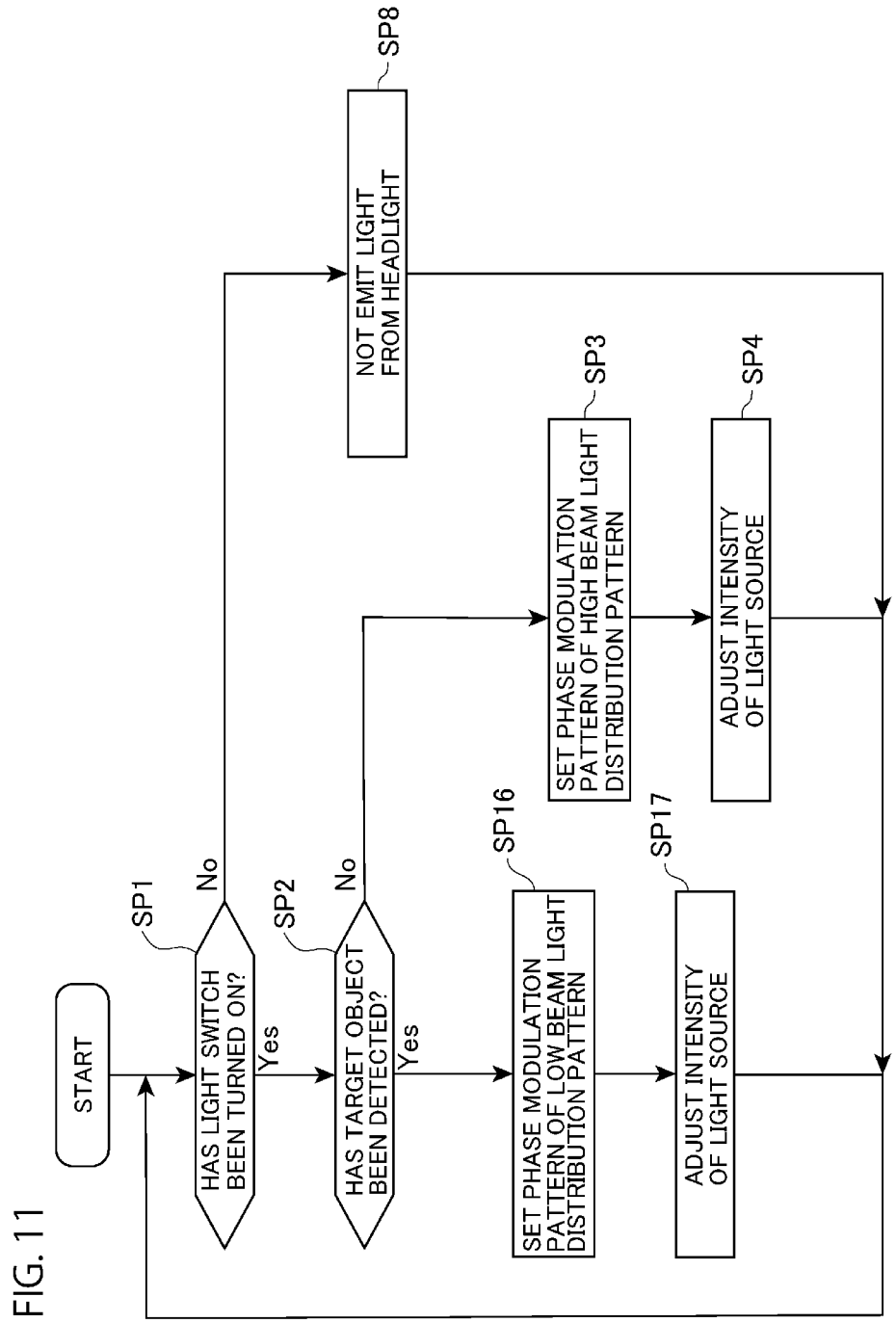
FIG. 11 is a diagram showing a control flowchart of a control unit in the second embodiment as the first aspect of the present invention.

Next, the operation of the headlight 1 of the present embodiment will be described. Specifically, operation of changing the light distribution pattern of the light emitted according to the situation in front of the vehicle from the high beam light distribution pattern PH and the low beam light distribution pattern PL will be described. FIG. 11 is a diagram showing a control flowchart of a control unit in the present embodiment.

The control flow in the present embodiment is different from the control flow in the first embodiment in that it has steps SP16 and SP17 in place of steps SP5, SP6, and SP7 in the control flow in the first embodiment.

In the present embodiment, in step SP2, when the detection device 72 detects a predetermined target object located in front of the vehicle and the detection device 72 inputs the information on the existence of the target object and the existence position of the target object to the control unit 71, the control flow of the control unit proceeds to step SP16. Note that, in the present embodiment, the information transmitted from the detection device 72 to the control unit 71 does not have to include the information on the existence position of the target object. That is, the detection device 72 may transmit only a signal notifying that a predetermined target object located in front of the vehicle has been detected to the control unit 71. In such a case, in step SP2, when a signal notifying the existence of the target object is input from the detection device 72 to the control unit 71, the control flow of the control unit 71 may proceed to step SP16.

In step SP16, the control unit 71 controls the phase modulation elements 54R, 54G, 54B on the basis of the information associated with the low beam light distribution pattern PL in the table TB. In this case, as similar to step SP6 of the first embodiment, the phase modulation elements 54R, 54G, 54B set a phase modulation pattern in which the light distribution pattern formed by the light obtained by synthesizing the light DLR, DLG, DLB is the low beam light distribution pattern PL. That is, it is understood that each of the phase modulation elements 54R, 54G, 54B sets a phase modulation pattern in which the light distribution pattern formed by the light obtained by synthesizing the light DLR, DLG, DLB is the low beam light distribution pattern PL on the basis of the information from the detection device 72.

Next, in step SP17, the control unit 71 controls the light sources 52R, 52G, 52B on the basis of the information associated with the low beam light distribution pattern PL in the table TB. In this case, as similar to step SP7 of the first embodiment, the light sources 52R, 52G, 52B emit laser light of the intensity associated with the low beam light distribution pattern PL in the table TB. The laser light emitted from the light sources 52R, 52G, 52B whose intensity is adjusted as described above is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized white light is emitted from the headlight 1. Since the light distribution pattern of the light obtained by synthesizing the light DLR, DLG, DLB is the low beam light distribution pattern PL, the light of the low beam light distribution pattern PL is emitted from the headlight 1.

As described above, the intensity of the laser light emitted from the light sources 52R, 52G, 52B is the intensity associated with the low beam light distribution pattern PL. Therefore, the total luminous flux amount of each laser light emitted from the light sources 52R, 52G, 52B is the total luminous flux amount according to the low beam light distribution pattern PL, and the light DLR, DLG, DLB caused by the laser light is emitted from the lamp unit 20. Accordingly, the total luminous flux amount of the light DLR, DLG, DLB emitted from the lamp unit 20 is adjusted to the total luminous flux amount according to the low beam light distribution pattern PL.

As described above, when the detection device 72 detects a predetermined target object located in front of the vehicle, the headlight 1 of the present embodiment emits the light of the low beam light distribution pattern PL. On the other hand, when the detection device 72 does not detect a predetermined target object located in front of the vehicle, the headlight 1 of the present embodiment emits the light of the high beam light distribution pattern PH.

When the light distribution pattern of the emitted light changes as described above, each modulation patterns of the phase modulation elements 54R, 54G, 54B changes. That is, in the headlight 1 of the present embodiment, when each modulation pattern in the phase modulation elements 54R, 54G, 54B changes, the light distribution pattern of the light emitted from the lamp unit 20 is switched between the low beam light distribution pattern PL and the high beam light distribution pattern PH. In the headlight 1 of the present embodiment, as described above, the intensity of the laser light associated with the low beam light distribution pattern PL in the table TB is lower than the intensity when emitting the light of the high beam light distribution pattern PH. Therefore, the total luminous flux amount of the light emitted from the lamp unit 20 when the light of the low beam light distribution pattern PL is emitted is smaller than the total luminous flux amount of the light emitted from the lamp unit 20 when the light of the high beam light distribution pattern PH is emitted. That is, when the high beam light distribution pattern PH changes to the low beam light distribution pattern PL, the lamp unit 20 reduces the total luminous flux amount of the light emitted from the lamp unit 20. On the other hand, when the low beam light distribution pattern PL changes to the high beam light distribution pattern PH, the lamp unit 20 increases the total luminous flux amount of the light emitted from the lamp unit 20.

By the way, the region irradiated with the low beam on the vertical surface at a predetermined distance from the vehicle is smaller than the region irradiated with the light of the high beam light distribution pattern. In the headlight 1 of the present embodiment, as described above, when the low beam light distribution pattern PL changes to the high beam light distribution pattern PH, the lamp unit 20 increases the total luminous flux amount of the light emitted from the lamp unit 20, and when the high beam light distribution pattern PH changes to the low beam light distribution pattern PL, the lamp unit 20 reduces the total luminous flux amount of the light emitted from the lamp unit 20. Therefore, the headlight 1 of the present embodiment can suppress an unintentional change in the brightness of the region irradiated with the light when the light distribution pattern of the emitted light is changed between the low beam light distribution pattern PL and the high beam light distribution pattern PH, and can prevent a driver from feeling uncomfortable.

Note that, in step SP2 described above, when the detection device 72 inputs the information on the existence of the target object and the existence position of the target object to the control unit 71, the control unit 71 may perform control in step SP16 and step SP17 at the same time. Further, the control flow of the control unit 71 may proceed in the order of step SP17 and step SP16, and may return to step SP1. Further, the switching of the light distribution pattern of the emitted light is not limited to the one that responds to the detection of a predetermined target object located in front of the vehicle by the detection device 72. For example, the light switch 73 may be a switch that gives an instruction to emit or not emit light from the headlight 1 and an instruction of a light distribution pattern of the emitted light, and the light distribution pattern of the emitted light may be switched according to operation of the light switch 73 by the driver.

Third Embodiment

Next, a third embodiment as the first aspect of the present invention will be described in detail. Note that the same or equivalent constituent elements as those of the first embodiment are denoted by the same reference numerals, and redundant explanation will be omitted except when particularly described.

The vehicle lamp of the present embodiment is the headlight 1 for an automobile as similar to the first embodiment. Further, since the configuration of the headlight 1 of the present embodiment is the same as that of the headlight 1 of the first embodiment, the headlight 1 of the present embodiment will be described with reference to FIGS. 1 and 2.

The table TB stored in the storage unit 74 of the present embodiment is different from the table TB of the first embodiment, the information input to the control unit 71 is different from the information input to the control unit 71 of the first embodiment, and the light distribution pattern of the light emitted from the headlight 1 of the present embodiment is different from the light distribution pattern of the light emitted from the headlight 1 of the first embodiment.

Figure 12:
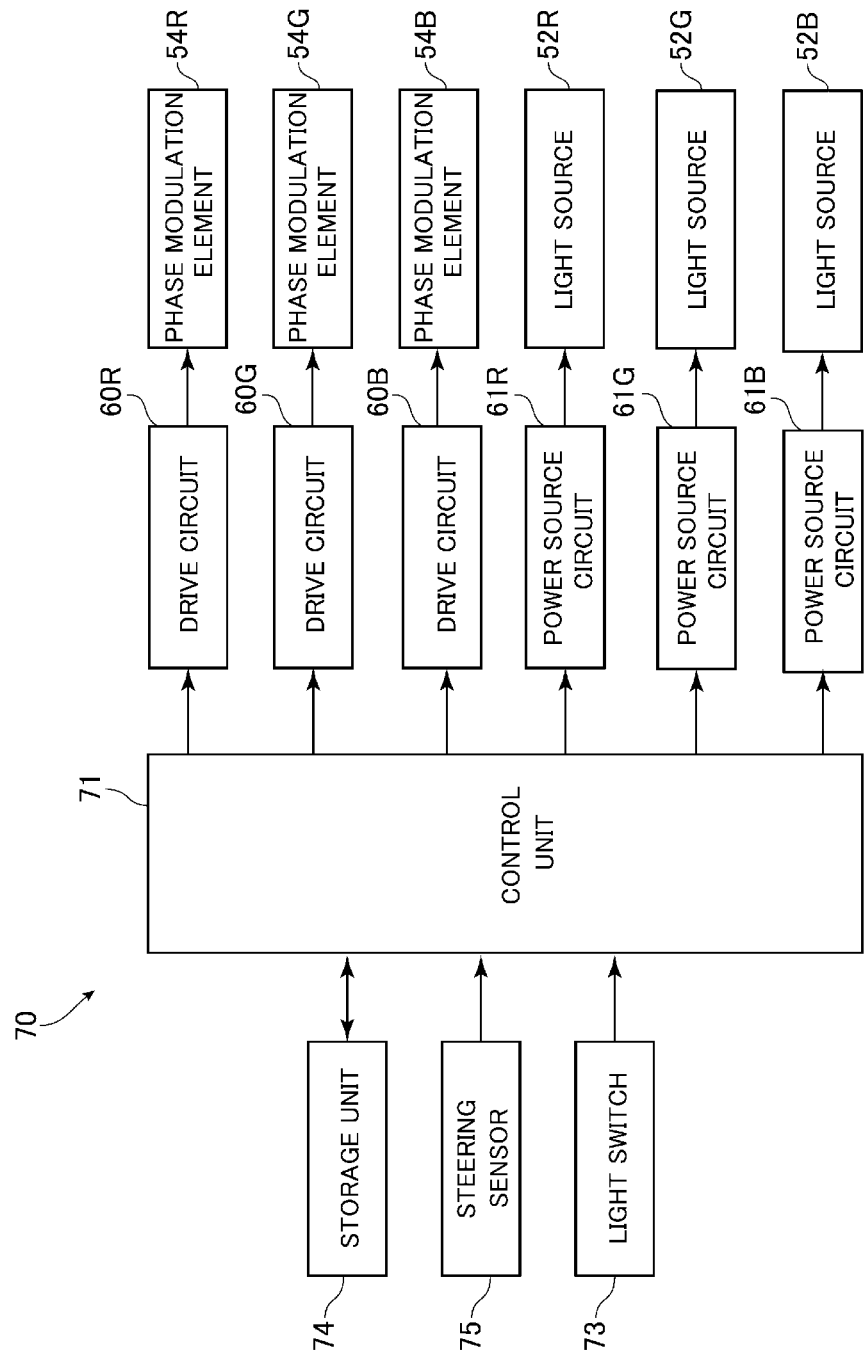
FIG. 12 is a block diagram including a part of the headlight for vehicle and a lamp control system according to the third embodiment as a first aspect of the present invention.

FIG. 12 is a block diagram including a part of the headlight for vehicle and a lamp control system according to the present embodiment as the first aspect. As shown in FIG. 12, a steering sensor 75 is electrically connected to the control unit 71 of the present embodiment in place of the detection device 72. The steering sensor 75 detects the rotation angle of the steering wheel of the vehicle, that is, the steering angle of the vehicle, and transmits a signal of the detected steering angle to the control unit 71. The steering sensor 75 detects the right steering angle and the left steering angle while distinguishing them from different steering angles.

FIG. 13 is a diagram showing a table in the present embodiment as the first aspect. As shown in FIG. 13, in the table TB of the present embodiment, information is associated with each of the high beam light distribution pattern PH shown in FIG. 7A, a right steering light distribution pattern in which the high beam light distribution pattern PH is expanded to the right, and a left steering light distribution pattern in which the high beam light distribution pattern PH is expanded to the left. Examples of the information associated with each light distribution pattern include the phase modulation pattern in the phase modulation elements 54R, 54G, 54B when forming the light distribution pattern, the intensity of the laser light of the light sources 52R, 52G, 52B when forming the light distribution pattern, and the steering angle of the vehicle. In the present embodiment, each of the right steering light distribution pattern and the left steering light distribution pattern includes a plurality of light distribution patterns having different widths of the expanded region in the left-right direction. This table TB is stored in the storage unit 74.

Figure 14A:
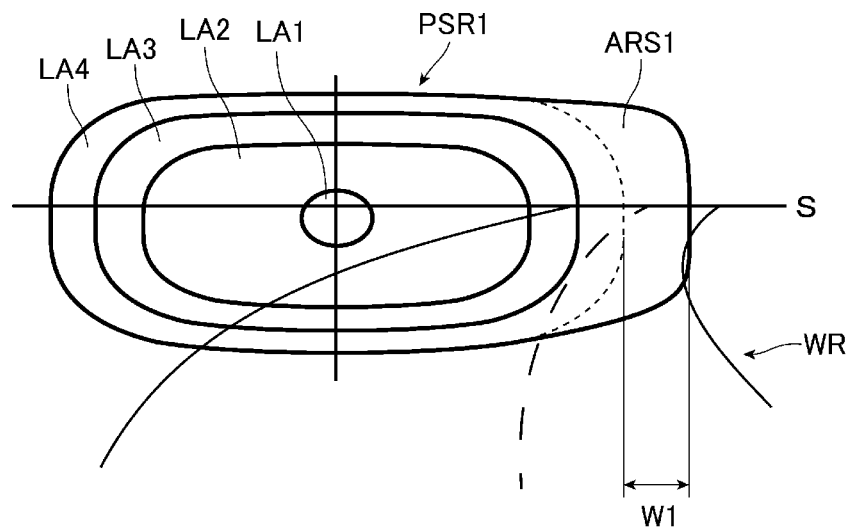
FIG. 14A and FIG. 14B are diagrams showing examples of a light distribution pattern in the third embodiment as the first aspect of the present invention.
Figure 14B:
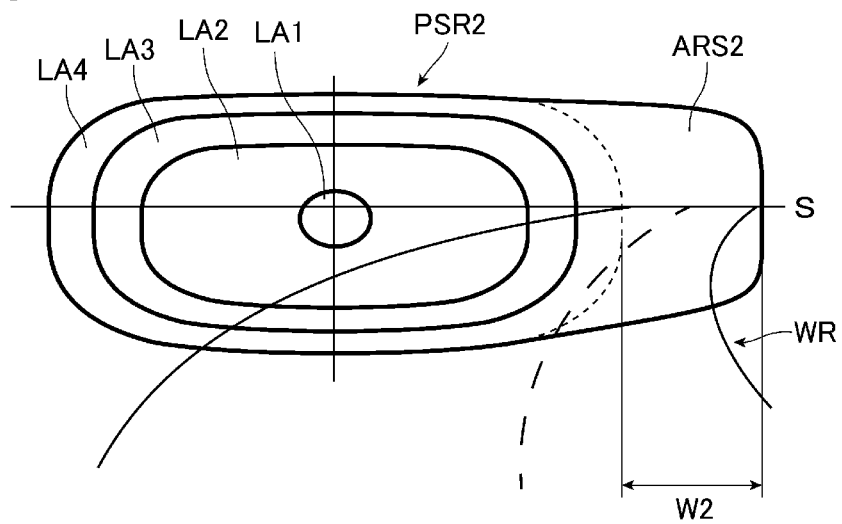

FIG. 14A and FIG. 14B are diagrams showing examples of a light distribution pattern in the present embodiment as the first aspect. Specifically, FIG. 14A is a diagram showing a right steering light distribution pattern PSR1 obtained by expanding the high beam light distribution pattern PH to the right, and FIG. 14B is a diagram showing another right steering light distribution pattern PSR2 obtained by expanding the high beam light distribution pattern PH to the right. In FIGS. 14A and 14B, S indicates a horizontal line, the light distribution pattern is indicated by a thick line, and this light distribution pattern is a light distribution pattern formed on a vertical plane 25 m away from the vehicle. Further, in FIGS. 14A and 14B, the boundary between the high beam light distribution pattern PH and the expanded regions ARS1, ARS2 is shown by a broken line. The width W2 of the expanded region ARS2 in the left-right direction in the right steering light distribution pattern PSR2 is larger than the width W1 of the expanded region ARS1 in the left-right direction in the right steering light distribution pattern PSR1. Note that the width W1 of the region ARS1 in the left-right direction is the width in the left-right direction from the right end of the high beam light distribution pattern PH to the right end of the region ARS1. The width W2 of the region ARS2 in the left-right direction is the width in the left-right direction from the right end of the high beam light distribution pattern PH to the right end of the region ARS2. Further, the expanded region ARS2 in the right steering light distribution pattern PSR2 is larger than the expanded region ARS1 in the right steering light distribution pattern PSR1. The term "larger" here means larger when the light distribution pattern formed on the vertical surface at a predetermined distance from the vehicle is compared. Further, the intensity distribution in the right steering light distribution patterns PSR1, PSR2 other than the expanded regions ARS1, ARS2 is the same as the intensity distribution in the high beam light distribution pattern PH.

In the present embodiment, the light intensity in the expanded regions ARS1, ARS2 is substantially the same as the light intensity in the region LA4, which is the outer peripheral region of the high beam light distribution pattern PH. Note that the light intensity in the expanded regions ARS1, ARS2 is not particularly limited, and may be higher than the light intensity in the region LA3 in the high beam light distribution pattern PH. Further, the intensity distribution of the regions other than the expanded regions ARS1, ARS2 in the right steering light distribution patterns PSR1, PSR2, that is, the regions corresponding to the high beam light distribution pattern PH may be different from the intensity distribution in the high beam light distribution pattern PH.

Figure 15:
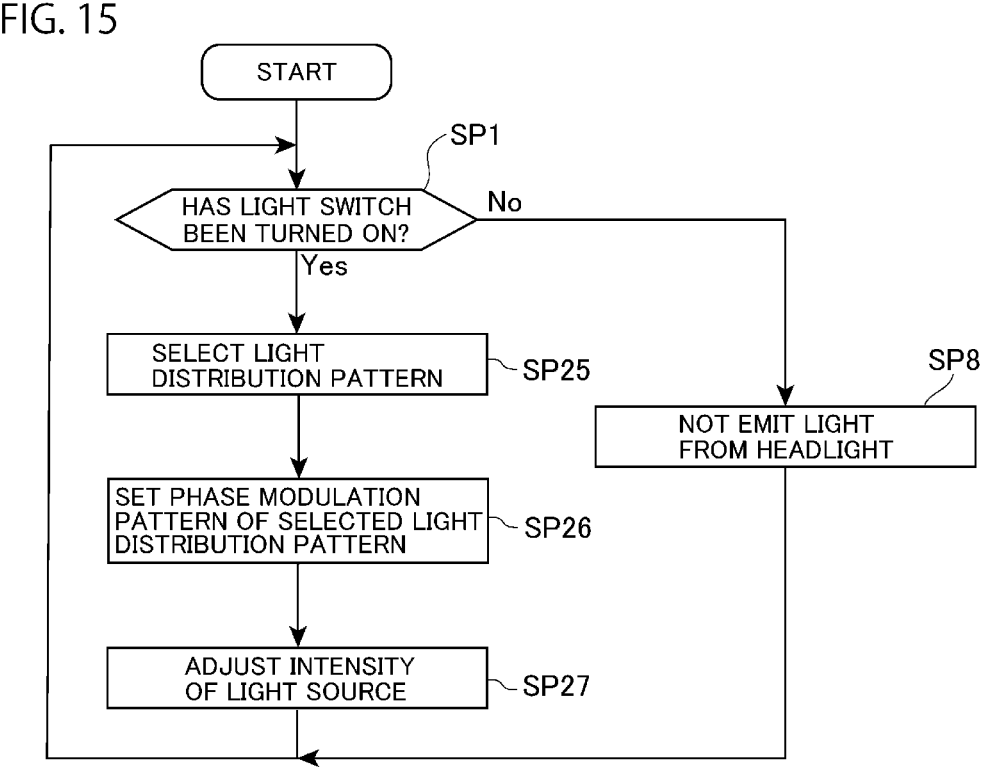
FIG. 15 is a diagram showing a control flowchart of a control unit in the third embodiment as the first aspect of the present invention.

Next, the operation of the headlight 1 of the present embodiment will be described. Specifically, the operation of changing the light distribution pattern of the light emitted according to the steering angle of the vehicle from the high beam light distribution pattern PH to the light distribution pattern obtained by expanding the high beam light distribution pattern PH in the left-right direction will be described. FIG. 15 is a diagram showing a control flowchart of a control unit in the present embodiment as the first aspect.

The control flow in the present embodiment is different from the control flow in the first embodiment in that it has steps SP25, SP26, and SP27 in place of steps SP2, SP3, SP4, SP5, SP6, and SP7 in the control flow in the first embodiment.

In the present embodiment, in step SP1, when the light switch 73 is turned on and a signal instructing the emission of light from the light switch 73 is input to the control unit 71, the control flow of the control unit 71 proceeds to step SP25. On the other hand, in step SP1, when this signal is not input to the control unit 71, the control flow of the control unit 71 proceeds to step SP8.

In step SP25, the control unit 71 selects one light distribution pattern from the light distribution patterns on the table TB on the basis of the signal of the steering angle of the vehicle output from the steering sensor 75. Here, in the table TB of the present embodiment, a predetermined range of steering angles is associated with each light distribution pattern. The predetermined range of steering angles associated with each light distribution pattern is different from the predetermined range of steering angles associated with other light distribution patterns. In the present embodiment, the range of the steering angle associated with the high beam light distribution pattern PH is a continuous range including zero. Further, the steering angle associated with the plurality of right steering light distribution patterns is the right steering angle, and the lower limit of the range of the right steering angles associated with the right steering light distribution pattern having the smallest width of the expanded region among the plurality of right steering light distribution patterns is greater than the upper limit of the right steering angle in the steering angle range associated with the high beam light distribution pattern PH. Further, the upper limit of the range of the right steering angle associated with the right steering light distribution pattern with the smallest expanded region is the less than the lower limit of the range of the steering angle associated with the right steering light distribution pattern with the second smallest expanded region. Further, the upper limit of the range of the right steering angle associated with the right steering light distribution pattern with the second smallest expanded region is the less than the lower limit of the range of the steering angle associated with the right steering light distribution pattern with the third smallest expanded region. As described above, the upper limit and the lower limit of the range of the right steering angle associated with the plurality of right steering light distribution patterns are determined so as to be larger in ascending order of width of the expanded region. That is, a small right steering angle is associated with the right steering light distribution pattern with a small width of expanded region, and a large right steering angle is associated with a right steering light distribution pattern with a large width of expanded region. Further, the steering angle associated with the plurality of left steering light distribution patterns is the left steering angle. The upper and lower limits of the range of the left steering angle associated with the plurality of left steering light distribution patterns are determined so as to be larger in ascending order of width of the expanded region in the similar manner to that of the plurality of right steering light distribution patterns. For this reason, a small left steering angle is associated with the left steering light distribution pattern with a small width of expanded region, and a large left steering angle is associated with a left steering light distribution pattern with a large width of expanded region. Then, the control unit 71 of the present embodiment selects the light distribution pattern corresponding to the range of the steering angles including the steering angle detected by the steering sensor 75 from among the light distribution patterns in the table TB in which a predetermined range of the steering angle is associated with each light distribution pattern. Accordingly, the control unit 71 selects a light distribution pattern expanded in the left-right direction according to the steering angle, and the width of the expanded region in the left-right direction in the selected light distribution pattern is a width corresponding to the steering angle. Specifically, when the right steering angle is large, the control unit 71 selects a right steering light distribution pattern having a large width in the left-right direction, and when the right steering angle is small, the control unit 71 selects a right steering light distribution pattern with a small width in the left-right direction. Further, when the left steering angle is large, the control unit 71 selects a left steering light distribution pattern having a large width in the left-right direction, and when the left steering angle is small, the control unit 71 selects a left steering light distribution pattern with a small width in the left-right direction. Further, the control unit 71 selects the high beam light distribution pattern PH when the steering is hardly performed.

Next, in step SP26, the control unit 71 controls the phase modulation elements 54R, 54G, 54B on the basis of the information associated with the light distribution pattern selected in step SP25 in the table TB. In this case, as similar to step SP6 of the first embodiment, the phase modulation elements 54R, 54G, 54B set a phase modulation pattern in which the light distribution pattern formed by the light obtained by synthesizing the light DLR, DLG, DLB is the light distribution pattern selected in step SP25. The light distribution pattern selected in step SP25 is a light distribution pattern according to the steering angle as described above. Therefore, it is understood that each of the phase modulation elements 54R, 54G, 54B sets a phase modulation pattern in which the light distribution pattern formed by the light obtained by synthesizing the light DLR, DLG, DLB is the light distribution pattern expanded in the left-right direction according to the steering angle.

Next, in step SP27, the control unit 71 controls the light sources 52R, 52G, 52B on the basis of the information associated with the light distribution pattern selected in step SP25 in the table TB. In this case, as similar to step SP7 of the first embodiment, the light sources 52R, 52G, 52B emit laser light of the intensity associated with the light distribution pattern selected in step SP25 in the table TB. The laser light emitted from the light sources 52R, 52G, 52B whose intensity is adjusted as described above is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized white light is emitted from the headlight 1. Since the light distribution pattern of the light obtained by synthesizing the light DLR, DLG, DLB is the light distribution pattern selected in step SP25, the light of the light distribution pattern selected in step SP25 is emitted from the headlight 1.

As described above, since the control unit 71 selects the light distribution pattern according to the steering angle, the headlight 1 emits the light of the light distribution pattern obtained by expanding the high beam light distribution pattern PH in the left-right direction. Therefore, in this headlight 1, the light distribution pattern of the emitted light changes to a light distribution pattern expanded in the left-right direction according to the change in the traveling direction of the vehicle. For example, as shown in FIGS. 14A and 14B, this headlight 1 can also irradiate the traveling destination with light in a curved road WR. Therefore, in the headlight 1, the visibility in the curved road WR can be improved further than in a case where the light distribution pattern of the emitted light does not change according to the change in the traveling direction of the vehicle.

Further, as described above, the width of the expanded region in the left-right direction in the light distribution pattern selected by the control unit 71 is set to the width according to the steering angle. Accordingly, the width of the expanded region in the left-right direction in the light distribution pattern of the light emitted by the headlight 1 of the present embodiment is a width corresponding to the steering angle. Therefore, In the headlight 1 of the present embodiment, the light distribution pattern of the emitted light changes according to the degree of change in the traveling direction of the vehicle. Accordingly, since this headlight 1 can change the irradiated region according to the degree of curve of the curved road WR, the visibility on the curved road WR can be further improved.

Note that the control unit 71 may perform control in step SP26 and step SP27 at the same time. Further, the control flow of the control unit 71 may proceed in the order of step SP27 and step SP26, and may return to step SP1. Further, the width of the expanded region in the left-right direction in the light distribution pattern of the light emitted by the headlight 1 of the present embodiment may be substantially constant. That is, the table TB may be a table in which information is associated with each of the high beam light distribution pattern PH, one right steering light distribution pattern in which the high beam light distribution pattern PH is expanded to the right, and one left steering light distribution pattern in which the high beam light distribution pattern PH is expanded to the left. Examples of the information associated with each light distribution pattern include the phase modulation pattern in the phase modulation elements 54R, 54G, 54B when forming the light distribution pattern, the intensity of the laser light of the light sources 52R, 52G, 52B when forming the light distribution pattern, and the steering angle of the vehicle. Even with such a configuration, the light distribution pattern of the emitted light changes to a light distribution pattern expanded in the left-right direction according to the change in the traveling direction of the vehicle, and the visibility in the curved road WR can be improved.

By the way, as described above, the intensity of the laser light emitted from the light sources 52R, 52G, 52B is the intensity associated with the light distribution pattern selected in step SP25 in the table TB. Therefore, the total luminous flux amount of each laser light emitted from the light sources 52R, 52G, 52B is the total luminous flux amount according to the light distribution pattern selected in step SP25, and the light DLR, DLG, DLB caused by the laser light is emitted from the lamp unit 20. Accordingly, the total luminous flux amount of the light emitted from the lamp unit 20 is adjusted to the total luminous flux amount according to the light distribution pattern selected in step SP25.

In the present embodiment, the intensity of the laser light associated with the right steering light distribution pattern and the left steering light distribution pattern in the table TB is the intensity increased according to the size of the region expanded in the left-right direction in each light distribution pattern with reference to the intensity when the light of the high beam light distribution pattern PH is emitted. That is, when the expanded region is large, the degree of increase in the intensity of the laser light emitted from the light sources 52R, 52G, 52B is large. On the other hand, when the expanded region is small, the degree of increase in the intensity of the laser light emitted from the light sources 52R, 52G, 52B made small. Therefore, the lamp unit 20 increases the total luminous flux amount of the light emitted from the lamp unit 20 according to the light distribution pattern expanded in the left-right direction. Therefore, the headlight 1 of the present embodiment can prevent a region other than the expanded region of the light distribution pattern expanded in the left-right direction from being unintentionally darkened as a whole. Therefore, in the headlight 1 of the present embodiment can prevent a driver from feeling uncomfortable even if the light distribution pattern of the emitted light changes according to the change in the traveling direction of the vehicle.

In the present embodiment, the amount of increase in the total luminous flux amount is an amount corresponding to the size of the region expanded in the left-right direction. That is, when the size of the region expanded in the left-right direction is large, the amount of increase in the total luminous flux amount is large, and when the size of the region expanded in the left-right direction is small, the amount of increase in the total luminous flux amount is small. Therefore, the headlight 1 of the present embodiment can prevent a region other than the expanded region of the light distribution pattern expanded in the left-right direction from being unintentionally brightened as a whole. Therefore, in the headlight 1 of the present embodiment can further prevent a driver from feeling uncomfortable even if the light distribution pattern of the emitted light changes according to the change in the traveling direction of the vehicle. Note that, from the viewpoint of further preventing the driver from feeling uncomfortable, it is preferable that the total luminous flux amount of the light in the expanded region and the amount of increase in the total luminous flux amount of the light emitted from the lamp unit 20 are substantially the same.

In the present embodiment, the intensity distribution in the right steering light distribution patterns PSR1, PSR2 expanded in the left-right direction other than the expanded regions ARS1, ARS2 is the same as the intensity distribution in the high beam light distribution pattern PH. Therefore, since, in the headlight 1 of the present embodiment, the intensity distribution in a region other than the regions ARS1, ARS2 expanded in the left-right direction does not change according to the change in the light distribution pattern of the emitted light, it is possible to further prevent the driver from feeling uncomfortable.

Fourth Embodiment

Next, a fourth embodiment as the first aspect of the present invention will be described in detail. Note that the same or equivalent constituent elements as those of the first embodiment are denoted by the same reference numerals, and redundant explanation will be omitted except when particularly described.

The vehicle lamp of the present embodiment is the headlight 1 for an automobile as similar to the first embodiment. Further, since the configuration of the headlight 1 of the present embodiment is the same as that of the headlight 1 of the first embodiment, the headlight 1 of the present embodiment will be described with reference to FIGS. 1 and 2.

The table TB stored in the storage unit 74 of the present embodiment is different from the table TB of the first embodiment, the information input to the control unit 71 is different from the information input to the control unit 71 of the first embodiment, and the light distribution pattern of the light emitted from the headlight 1 of the present embodiment is different from the light distribution pattern of the light emitted from the headlight 1 of the first embodiment.

Figure 16:
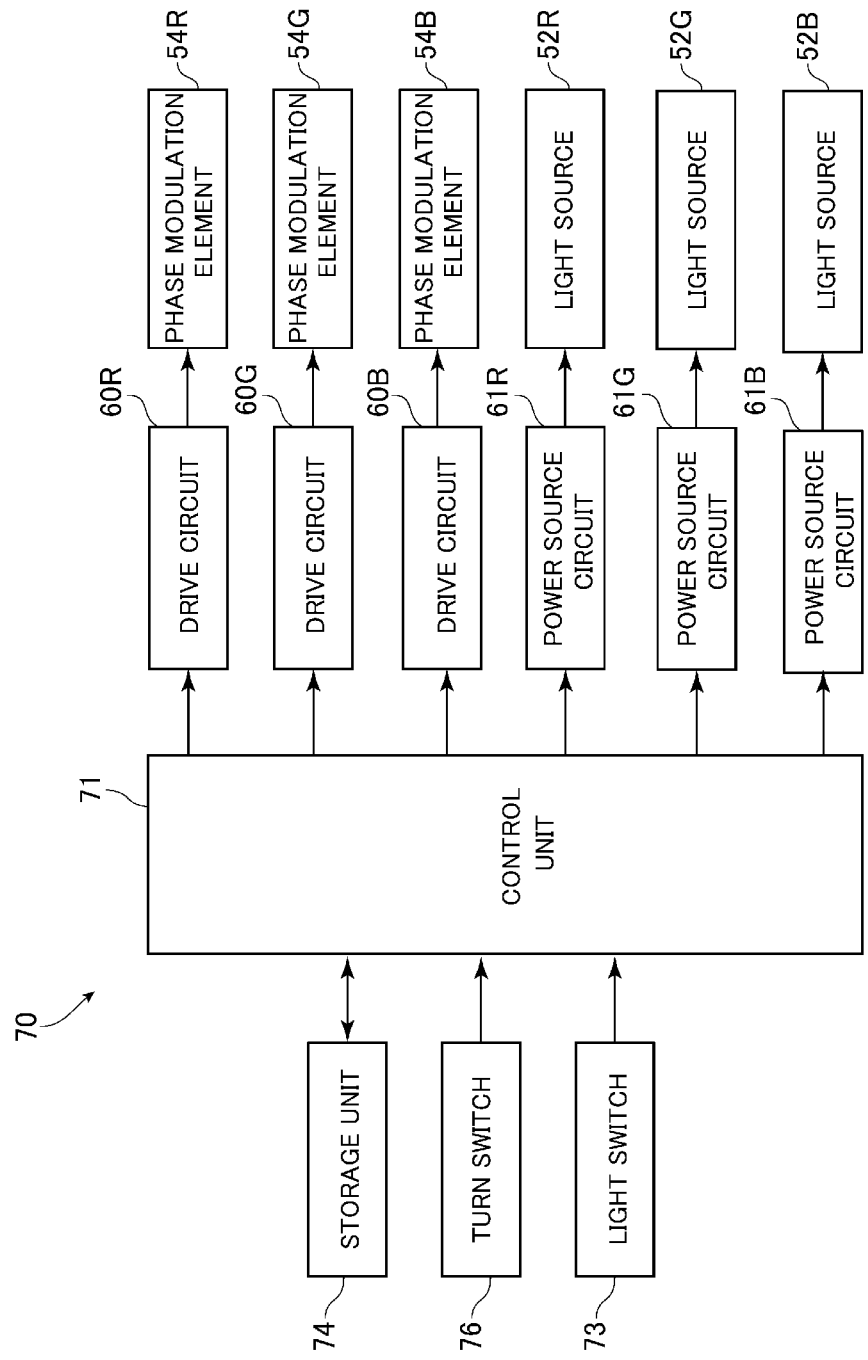
FIG. 16 is a block diagram including a part of the headlight for vehicle and a lamp control system according to the fourth embodiment as a first aspect of the present invention.

FIG. 16 is a block diagram including a part of the headlight for vehicle and a lamp control system according to the present embodiment as the first aspect. As shown in FIG. 16, a turn switch 76 is electrically connected to the control unit 71 of the present embodiment in place of the detection device 72. The turn switch 76 is a switch that allows the driver to select the state of the turn lamp of the vehicle. For example, when the state in which the left turn lamp blinks is selected, the turn switch 76 outputs a signal indicating this state. When the state in which the right turn lamp blinks is selected, the turn switch 76 outputs a signal indicating this state. When the state in which the left and right turn lamps are turned off, the turn switch 76 outputs no signal.

FIG. 17 is a diagram showing a table in the present embodiment as the first aspect. As shown in FIG. 17, the table TB of the present embodiment is a table in which information is associated with each of the low beam light distribution pattern PL shown in FIG. 10, a right turn light distribution pattern in which the low beam light distribution pattern PL is expanded to the right, and a left turn light distribution pattern in which the low beam light distribution pattern PL is expanded to the left. In the table, as the information associated with each light distribution pattern, the phase modulation pattern in the phase modulation elements 54R, 54G, 54B when forming the light distribution pattern, the intensity of the laser light of the light sources 52R, 52G, 52B when forming the light distribution pattern, and selection of the state of the turn lamp are associated. This table TB is stored in the storage unit 74.

Figure 18A:
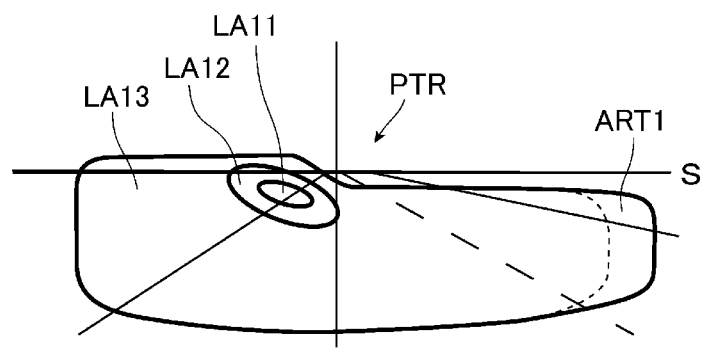
FIG. 18A and FIG. 18B are diagrams showing examples of a light distribution pattern in the fourth embodiment as the first aspect of the present invention.
Figure 18B:
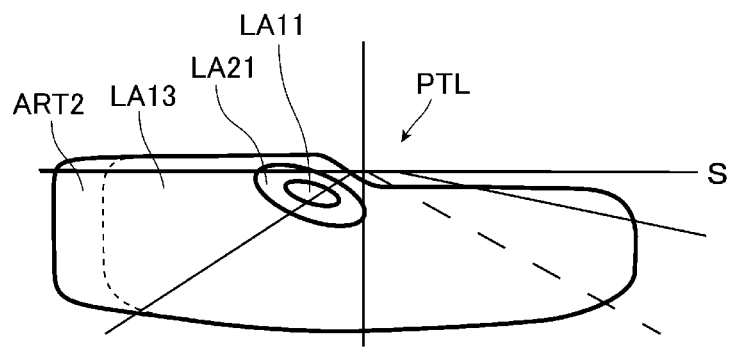

FIG. 18A and FIG. 18B are diagrams showing examples of a light distribution pattern in the present embodiment as the first aspect. Specifically, FIG. 18A is a diagram showing a right turn light distribution pattern PTR in which the low beam light distribution pattern PL is expanded to the right, and FIG. 18B is a diagram showing left turn light distribution pattern PTL in which the low beam light distribution pattern PL is expanded to the left. In FIGS. 18A and 18B, S indicates a horizontal line, the light distribution pattern is indicated by a thick line, and this light distribution pattern is a light distribution pattern formed on a vertical plane 25 m away from the vehicle. Further, in FIGS. 18A and 18B, the boundary between the low beam light distribution pattern PL and the expanded regions ART1, ART2 is shown by a broken line. The size of the expanded region ART1 in the right turn light distribution pattern PTR is different from the size of the expanded region ART2 in the left turn light distribution pattern PTL. Note that the size here is defined as the size when the light distribution pattern is formed on the vertical surface at a predetermined distance from the vehicle. Further, the intensity distribution in the right turn light distribution pattern PTR and the left turn light distribution pattern PTL other than the expanded regions ART1, ART2 is the same as the intensity distribution in the low beam light distribution pattern PL.

In the present embodiment, the light intensity in the expanded regions ART1, ART2 is substantially the same as the light intensity in the region LA13, which is the outer peripheral region of the low beam light distribution pattern PL. Note that the light intensity in the expanded regions ART1, ART2 is not particularly limited, and may be higher than the light intensity in the region LA13 in the low beam light distribution pattern PL. Further, the intensity distribution of the regions other than the expanded regions ART1, ART2 in the right turn light distribution pattern PTR and the left turn light distribution pattern PTL, that is, the regions corresponding to the low beam light distribution pattern PL may be different from the intensity distribution in the low beam light distribution pattern PL.

Next, the operation of the headlight 1 of the present embodiment will be described. Specifically, the operation of changing the light distribution pattern of the light emitted according to the operation of the turn switch 76 from the low beam light distribution pattern PL to the light distribution pattern obtained by expanding the low beam light distribution pattern PL in the left-right direction will be described. In the present embodiment, the control flowchart of the control unit is similar to the control flowchart of the control unit in the third embodiment, and thus will be described with reference to FIG. 15.

In the present embodiment, the control by the control unit 71 in steps SP25, SP26, and SP27 is different from the control by the control unit 71 in steps SP25, SP26, and SP27 in the third embodiment.

In the present embodiment, in step SP25, the control unit 71 selects one light distribution pattern from the light distribution patterns in the table TB on the basis of the signal output from the turn switch 76. Here, in the table TB of the present embodiment, as described above, the selection of the state of the turn lamp by the turn switch is associated with each light distribution pattern. Specifically, as shown in FIG. 17, the low beam light distribution pattern PL is associated with the selection of the state in which the left and right turn lamps are turned off. Further, the right turn light distribution pattern PTR is associated with the selection of the state in which the right turn lamp is blinking, and the left turn light distribution pattern PTL is associated with the selection of the state in which the left turn lamp is blinking. Then, the control unit 71 of the present embodiment selects the light distribution pattern on the basis of the signal output from the turn switch 76 from the light distribution patterns in the table TB in which the selection of the turn lamp state is associated with each light distribution pattern as described above. Accordingly, the selected light distribution pattern is a light distribution pattern according to the selection of the state of the turn lamp by the turn switch 76. Note that, in the present embodiment, the turn switch 76 outputs no signal when the state in which the left and right turn lamps are turned off is selected. Therefore, the control unit 71 selects the low beam light distribution pattern PL when there is no signal input from the turn switch 76.

Next, in the present embodiment, in step SP26, the control unit 71 controls the phase modulation elements 54R, 54G, 54B on the basis of the information associated with the light distribution pattern selected in step SP25 in the table TB. In this case, as similar to step SP26 of the third embodiment, the phase modulation elements 54R, 54G, 54B set a phase modulation pattern in which the light distribution pattern formed by the light obtained by synthesizing the light DLR, DLG, DLB is the light distribution pattern selected in step SP25. The light distribution pattern selected in step SP25 is a light distribution pattern corresponding to the signal from the turn switch 76 as described above. Therefore, it is understood that each of the phase modulation elements 54R, 54G, 54B sets a phase modulation pattern in which the light distribution pattern formed by the light obtained by synthesizing the light DLR, DLG, DLB is the light distribution pattern expanded in the left-right direction according to the signal from the turn switch 76.

Next, in the present embodiment, in step SP27, the control unit 71 controls the light sources 52R, 52G, 52B on the basis of the information associated with the light distribution pattern selected in step SP25 in the table TB. In this case, as similar to step SP27 of the third embodiment, the light sources 52R, 52G, 52B emit laser light of the intensity associated with the light distribution pattern selected in step SP25 in the table TB. The laser light emitted from the light sources 52R, 52G, 52B whose intensity is adjusted as described above is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized white light is emitted from the headlight 1. Since the light distribution pattern of the light obtained by synthesizing the light DLR, DLG, DLB is the light distribution pattern selected in step SP25, the light of the light distribution pattern selected in step SP25 is emitted from the headlight 1.

As described above, the control unit 71 selects the light distribution pattern on the basis of the signal output from the turn switch 76. Therefore, the headlight 1 emits the right turn light distribution pattern PTR or the left turn light distribution pattern PTL on the basis of the signal output from the turn switch 76. Therefore, in this headlight 1, the light distribution pattern of the emitted light changes to a light distribution pattern expanded in the left-right direction according to the signal from the turn switch 76 of the vehicle. Therefore, since this headlight 1 can irradiate a traveling destination with light on a crossroads and the like, the visibility in a crossroads and the like can be improved further than in a case where the light distribution pattern of the emitted light does not change according to the signal from the turn switch 76 of the vehicle.

Note that the control unit 71 may perform control in step SP26 and step SP27 at the same time. Further, the control flow of the control unit 71 may proceed in the order of step SP27 and step SP26, and may return to step SP1.

By the way, as described above, the intensity of the laser light emitted from the light sources 52R, 52G, 52B is the intensity associated with the light distribution pattern selected in step SP25 in the table TB. Therefore, the total luminous flux amount of each laser light emitted from the light sources 52R, 52G, 52B is the total luminous flux amount according to the light distribution pattern selected in step SP25, and the light DLR, DLG, DLB caused by the laser light is emitted from the lamp unit 20. Accordingly, the total luminous flux amount of the light emitted from the lamp unit 20 is adjusted to the total luminous flux amount according to the light distribution pattern selected in step SP25.

In the present embodiment, the intensity of the laser light associated with the right turn light distribution pattern PTR and the left turn light distribution pattern PTL in the table TB is the intensity increased according to the size of the regions ART1, ART2 expanded in the left-right direction in each light distribution pattern with reference to the intensity when the light of the low beam light distribution pattern PL is emitted. That is, when the expanded regions ART1, ART2 are large, the degree of increase in the intensity of the laser light emitted from the light sources 52R, 52G, 52B is large. On the other hand, when the expanded regions ART1, ART2 are small, the degree of increase in the intensity of the laser light emitted from the light sources 52R, 52G, 52B made small. Therefore, the lamp unit 20 increases the total luminous flux amount of the light emitted from the lamp unit 20 according to the light distribution pattern expanded in the left-right direction. Therefore, the headlight 1 of the present embodiment can prevent a region other than the expanded regions ART1, ART2 of the light distribution pattern expanded in the left-right direction from being unintentionally darkened as a whole. Accordingly, the headlight 1 of the present embodiment can prevent a driver from feeling uncomfortable even if the light distribution pattern of the emitted light changes according to a signal from the turn switch 76 of the vehicle.

In the present embodiment, the amount of increase in the total luminous flux amount of the light emitted from the lamp unit 20 is an amount corresponding to the size of the regions ART1, ART2 expanded in the left-right direction. That is, when the size of the regions ART1, ART2 expanded in the left-right direction is large, the amount of increase in the total luminous flux amount is large, and when the size of the regions ART1, ART2 expanded in the left-right direction is small, the amount of increase in the total luminous flux amount is small. Therefore, the headlight 1 of the present embodiment can prevent a region other than the expanded regions ART1, ART2 of the light distribution pattern expanded in the left-right direction from being unintentionally brightened as a whole. Accordingly, the headlight 1 of the present embodiment can prevent a driver from feeling uncomfortable even if the light distribution pattern of the emitted light changes according to a signal from the turn switch 76 of the vehicle. Note that, from the viewpoint of preventing the driver from feeling uncomfortable, it is preferable that the total luminous flux amount of the light in the expanded regions ART1, ART2 and the amount of increase in the total luminous flux amount of the light emitted from the lamp unit 20 are substantially the same.

In the present embodiment, the intensity distribution in the right turn light distribution pattern PTR and the left turn light distribution pattern PTL other than the expanded regions ART1, ART2 expanded in the left-right direction is the same as the intensity distribution in the low beam light distribution pattern PL. Therefore, since, in the headlight 1 of the present embodiment, the intensity distribution in a region other than the regions ART1, ART2 expanded in the left-right direction does not change according to the change in the light distribution pattern of the emitted light, it is possible to further prevent the driver from feeling uncomfortable.

Fifth Embodiment

Figure 19:
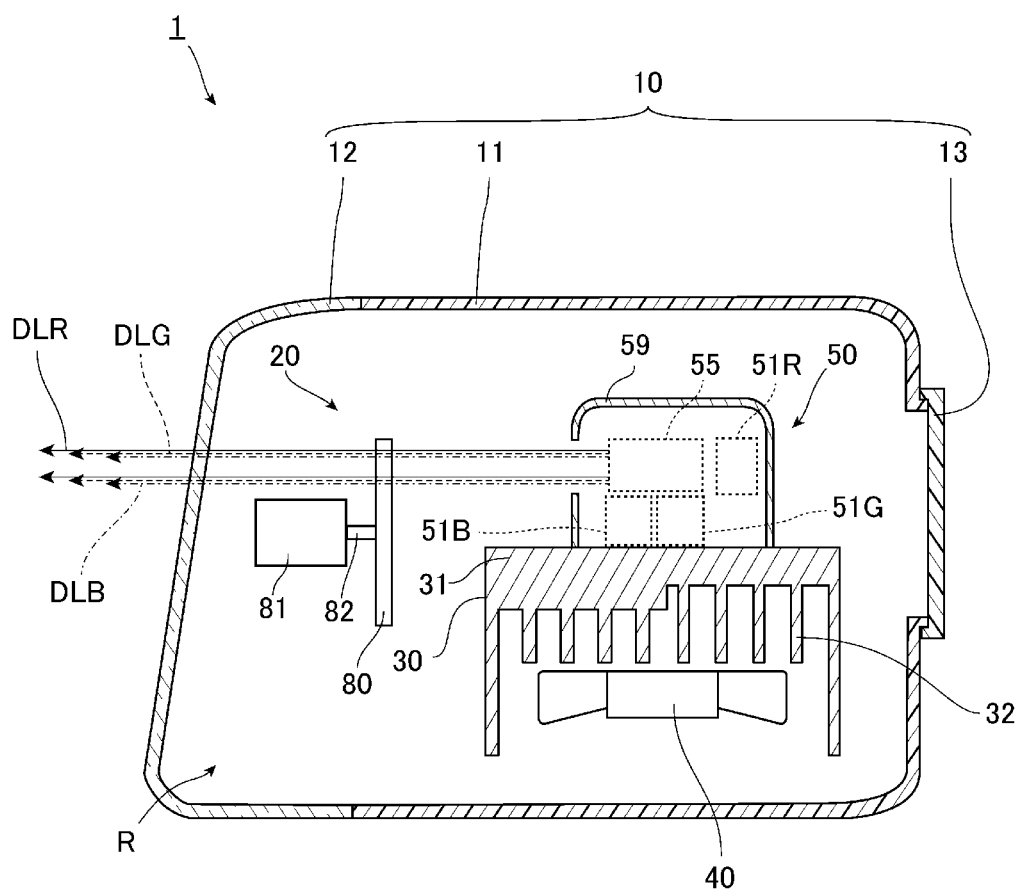
FIG. 19 is a diagram showing a headlight for vehicle in a fifth embodiment as the first aspect of the present invention in the similar manner to FIG. 1.

Next, a fifth embodiment as the first aspect of the present invention will be described in detail with reference to FIG. 19. FIG. 19 is a diagram showing a headlight for vehicle in the fifth embodiment as the first aspect of the present invention in the similar manner to FIG. 1. Note that the same or equivalent constituent elements as those of the first embodiment are denoted by the same reference numerals, and redundant explanation will be omitted except when particularly described.

As shown in FIG. 19, the lamp unit 20 of the present embodiment is different from the lamp unit 20 of the above embodiment in that an optical filter 80 and a motor 81 are further provided. The optical filter 80 is a filter that blocks a part of incident light and reduces the amount of light that transmits through the optical filter 80. In the present embodiment, the optical filter 80 is arranged on the optical path of the light DLR, DLG, DLB emitted from the phase modulation elements 54R, 54G, 54B, and more specifically, arranged on the downstream side from the synthesizing optical system 55 in this optical path. Therefore, the light DLR, DLG, DLB emitted from the synthesizing optical system 55 transmits through the optical filter 80, and then is emitted from the headlight 1 through the front cover 12.

Figure 20:
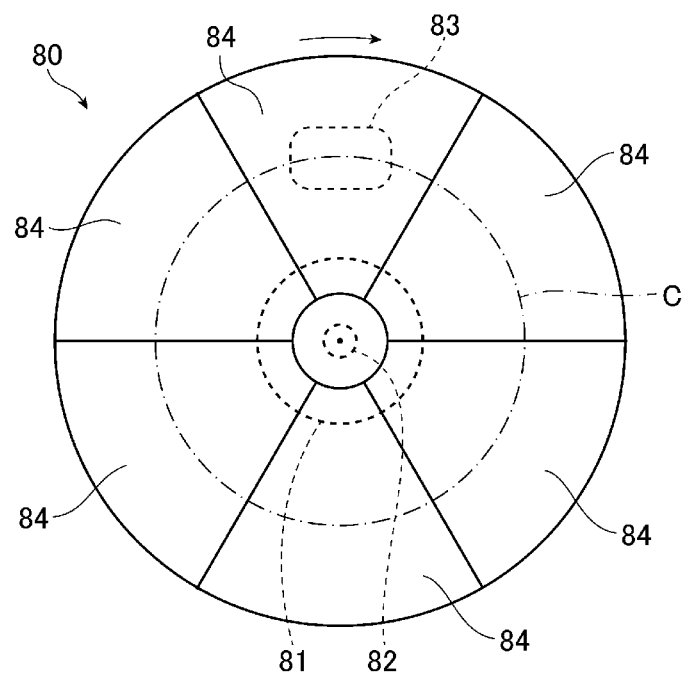
FIG. 20 is a front view schematically showing an optical filter shown in FIG. 19.

FIG. 20 is a front view schematically showing an optical filter shown in FIG. 19. Note that, in FIG. 20, a region 83 in which the light DLR, DLG, DLB is incident is shown by a broken line. In the present embodiment, the outer shape of the optical filter 80 in front view is substantially circular, and one end portion of the output shaft 82 of the motor 81 is fixed to the center of the optical filter 80. Therefore, the optical filter 80 rotates around the output shaft 82 of the motor 81 as a rotation axis. A control unit 71 is electrically connected to the motor 81, and the motor 81 is controlled by the control unit 71. As the motor 81, for example, a stepping motor, an alternating current (AC) servo motor, or the like can be used.

The optical filter 80 of the present embodiment has a plurality of dimming regions 84 in which the amount of transmitted light is different from each other, and the plurality of dimming regions 84 are arranged on the circumference of a circle C around the output shaft 82 of the motor 81 in the front view of the optical filter 80. Note that the order in which these dimming regions 84 are arranged in the circumferential direction of the circle C is not particularly limited. The circumference of the circle C crosses the region 83 in which the light DLR, DLG, DLB is incident. Therefore, when the optical filter 80 is rotated by a predetermined angle by the motor 81, the plurality of dimming regions 84 and the region 83 in which the light DLR, DLG, DLB is incident can overlap each other. Therefore, the dimming regions 84 in which the light DLR, DLG, DLB is incident can be switched by rotating the optical filter 80 by a predetermined angle by the motor 81.

Examples of such an optical filter 80 include a dimming filter in which an optical film such as a metal film is laminated on a glass substrate. By controlling the type and thickness of the optical film according to each dimming region 84, the amount of light transmitting through each dimming region 84 can be made different from each other.

Note that, the optical filter 80 having the plurality of dimming regions 84 is only required to be able to switch the dimming region 84 in which the light DLR, DLG, DLB is incident. In such an optical filter 80, for example, a plurality of dimming regions 84 may be linearly arranged and slidably movable in this arrangement direction. Even with such a configuration, the dimming region 84 in which the light DLR, DLG, DLB is incident can be switched.

In the table TB of the present embodiment, information is associated with each of the light distribution patterns formed by the light obtained by synthesizing the light DLR, DLG, DLB emitted from the phase modulation elements 54R, 54G, 54B. Examples of the information associated with each light distribution pattern include the phase modulation pattern in the phase modulation elements 54R, 54G, 54B when forming the light distribution pattern, and the dimming region 84 in the optical filter 80 through which the light DLR, DLG, DLB emitted from the phase modulation elements 54R, 54G, 54B transmits. That is, in the present embodiment, the dimming region 84 in the optical filter 80 is associated with each light distribution pattern instead of the intensity of the laser light of the light sources 52R, 52G, 52B. The lamp unit 20 of the present embodiment does not change the intensity of the laser light of the light sources 52R, 52G, 52B according to the light distribution pattern, but changes the dimming region 84 through which the light DLR, DLG, DLB emitted from the phase modulation elements 54R, 54G, 54B transmits. Specifically, the control unit 71 controls the motor 81 to rotate the optical filter 80 to a predetermined angle to change the dimming region 84 through which the light DLR, DLG, DLB transmits. The light DLR, DLG, DLB is dimmed according to the dimming region 84 through which the light DLR, DLG, DLB transmits, and the dimmed light DLR, DLG, DLB is emitted from the headlight 1.

As described above, in the present embodiment, the total luminous flux amount of the light that transmits through the optical filter 80 and is emitted from the lamp unit 20 is the total luminous flux amount corresponding to the dimming region 84 in the optical filter 80 associated with the light distribution pattern. That is, the lamp unit 20 can adjust the total luminous flux amount of the light emitted from the lamp unit 20 according to the light distribution pattern. Accordingly, even with the lamp unit 20 having such a configuration, the similar effect to that of the above embodiment can be obtained. Further, with such a configuration, the total luminous flux amount of the light emitted from the lamp unit 20 can be stably adjusted without adjusting the intensity of the laser light emitted from the light sources 52R, 52G, 52B.

The optical filter 80 is only required to be able to adjust the total luminous flux amount of the light emitted from the lamp unit 20. For example, the optical filter 80 having the plurality of dimming regions 84 may be arranged on each of the optical path of the laser light emitted from the light source 52R from the light source 52R to the phase modulation element 54R, the optical path of the laser light emitted from the light source 52G from the light source 52G to the phase modulation element 54G, and the optical path of the laser light emitted from the light source 52B from the light source 52B to the phase modulation element 54B. Even in the lamp unit 20 having such a configuration, the total luminous flux amount of each laser light emitted from the light sources 52R, 52G, 52B can be adjusted by the corresponding optical filter 80, and the total luminous flux amount of the light emitted from the lamp unit 20 can be adjusted.

Figure 21:
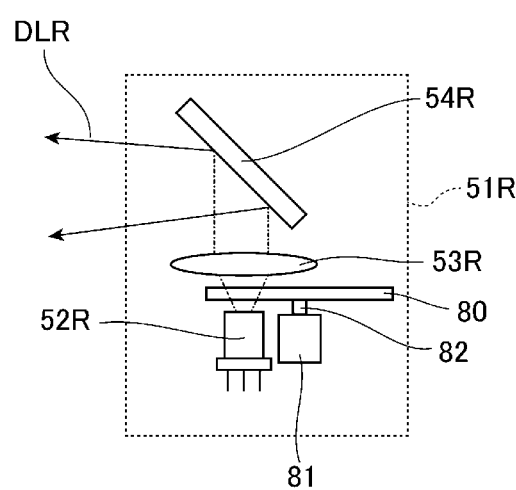
FIG. 21 is a diagram showing a part of an optical system unit in a modification of the fifth embodiment as the first aspect.

Further, the optical filter 80 may be a polarizing filter. FIG. 21 is a diagram showing a part of an optical system unit in a modification of the present embodiment as the first aspect. Specifically, FIG. 21 shows the first light emitting optical system 51R in the optical system unit 50. As shown in FIG. 21, the first light emitting optical system 51R in the present modification is different from the first light emitting optical system 51R of the above embodiment in that it includes the optical filter 80 as a polarizing filter and the motor 81. The optical filter 80 is arranged on the optical path of the laser light emitted from the light source 52R from the light source 52R to the phase modulation element 54R. Specifically, the optical filter 80 is arranged between the collimator lens 53R and the phase modulation element 54R in this optical path. Further, the optical filter 80 is fixed to the output shaft 82 of the motor 81 as similar to the optical filter 80 described above which is a dimming filter, and can rotate around the output shaft 82 of the motor 81 as a rotation axis. Note that, although the description by illustration is omitted, the second light emitting optical system 51G and the third light emitting optical system 51B of the present modification include the optical filter 80 as a polarizing filter and the motor 81 as similar to the first light emitting optical system 51R.

In the optical system unit 50, the optical filter 80, which is a polarizing filter, is rotated at a predetermined angle according to the light distribution pattern formed by the light obtained by synthesizing the light DLR, DLG, DLB emitted from the phase modulation elements 54R, 54G, 54B to change the polarization direction of the optical filter 80. The light emitted from the light sources 52R, 52G, 52B is laser light, and the laser light is substantially linearly polarized light. Therefore, the amount of dimming of the laser light emitted from the light sources 52R, 52G, 52B can be adjusted according to the change in the polarization direction of the optical filter 80. That is, the total luminous flux amount of the light transmitting through the optical filter 80 can be adjusted. As described above, the light emitted from the light sources 52R, 52G, 52B is incident on the phase modulation elements 54R, 54G, 54B after the total luminous flux amount of the light is adjusted by the corresponding optical filter 80. Therefore, the light DLR, DLG, DLB emitted from the phase modulation elements 54R, 54G, 54B is light whose total luminous flux amount is adjusted according to the light distribution pattern formed by the light obtained by synthesizing the light DLR, DLG, DLB, and the light DLR, DLG, DLB is emitted from the lamp unit 20. Accordingly, even in the lamp unit 20 having such a configuration, the total luminous flux amount of the light emitted from the lamp unit 20 can be adjusted. Note that as similar to the optical filter 80 as a dimming filter shown in FIG. 19, the optical filter 80 as a polarizing filter may be arranged on the optical path of the light DLR, DLG, DLB emitted from the phase modulation elements 54R, 54G, 54B, and may be arranged on the downstream side from the synthesizing optical system 55 in this optical path. Note that, when the optical filter 80 is arranged on the downstream side from the synthesizing optical system 55, the light sources 52R, 52G, 52B and the phase modulation elements 54R, 54G, 54B are adjusted so that the polarization directions of the light DLR, DLG, DLB are substantially the same. Further, the phase modulation elements 54R, 54G 54B have wavelength dependence. Therefore, as described above, it is preferable that the optical filter 80 as a polarizing filter is arranged on each of the optical path of the laser light emitted from the light source 52R from the light source 52R to the phase modulation element 54R, the optical path of the laser light emitted from the light source 52G from the light source 52G to the phase modulation element 54G, and the optical path of the laser light emitted from the light source 52B from the light source 52B to the phase modulation element 54B. With such a configuration, it is possible to reduce the phase variation in each of the light incident on the phase modulation elements 54R, 54G, 54B. Therefore, it is possible to suppress the emission of unnecessary light different from the light DLR, DLG, DLB for forming a predetermined light distribution pattern from the phase modulation elements 54R, 54G, 54B.

Further, although the description by illustration is omitted, the optical filter 80 may be a dimming sheet in which the degree of diffusion of transmitted light changes by applying a voltage or a current. Examples of the configuration of a dimming sheet to which a voltage is applied include a configuration including: a liquid crystal layer having liquid crystal molecules; a pair of transparent electrodes having translucency and arranged so as to sandwich the liquid crystal layer; and a pair of protective layers having translucency and arranged so as to sandwich the pair of transparent electrodes. In such a dimming sheet, the orientation of the liquid crystal molecules in the liquid crystal layer is changed by applying a voltage to the pair of transparent electrodes. By changing the orientation of the liquid crystal molecules, the degree of diffusion at the time of transmission of the light transmitted through the liquid crystal layer changes, and the amount of transmitted light can be changed. On the other hand, examples of the configuration of a dimming sheet to which a current is applied include a configuration including a thin film layer such as tungsten oxide and an electrolyte layer instead of the liquid crystal layer in the above-described dimming sheet to which a voltage is applied. In such a dimming sheet, the thin film layer undergoes an electrical oxidation reaction or reduction reaction when a current is applied to the pair of transparent electrodes, so that the degree of diffusion at the time of transmission of the light that transmits through the thin film layer changes and the amount of transmitted light can be changed. Accordingly, even if the optical filter 80 is a dimming sheet whose degree of diffusion of transmitted light changes when a voltage or current is applied, in the lamp unit 20, the total luminous flux amount of the light emitted from the lamp unit 20 can be adjusted according to the light distribution pattern formed by the light obtained by synthesizing the light DLR, DLG, DLB. Further, in the lamp unit 20, the total luminous flux amount of the light emitted from the lamp unit 20 can be adjusted according to the light distribution pattern formed by the light obtained by synthesizing the light DLR, DLG, DLB without using a motor.

Sixth Embodiment

Next, a sixth embodiment as the first aspect of the present invention will be described in detail with reference to FIG. 22. Note that the same or equivalent constituent elements as those of the first embodiment are denoted by the same reference numerals, and redundant explanation will be omitted except when particularly described.

Figure 22:
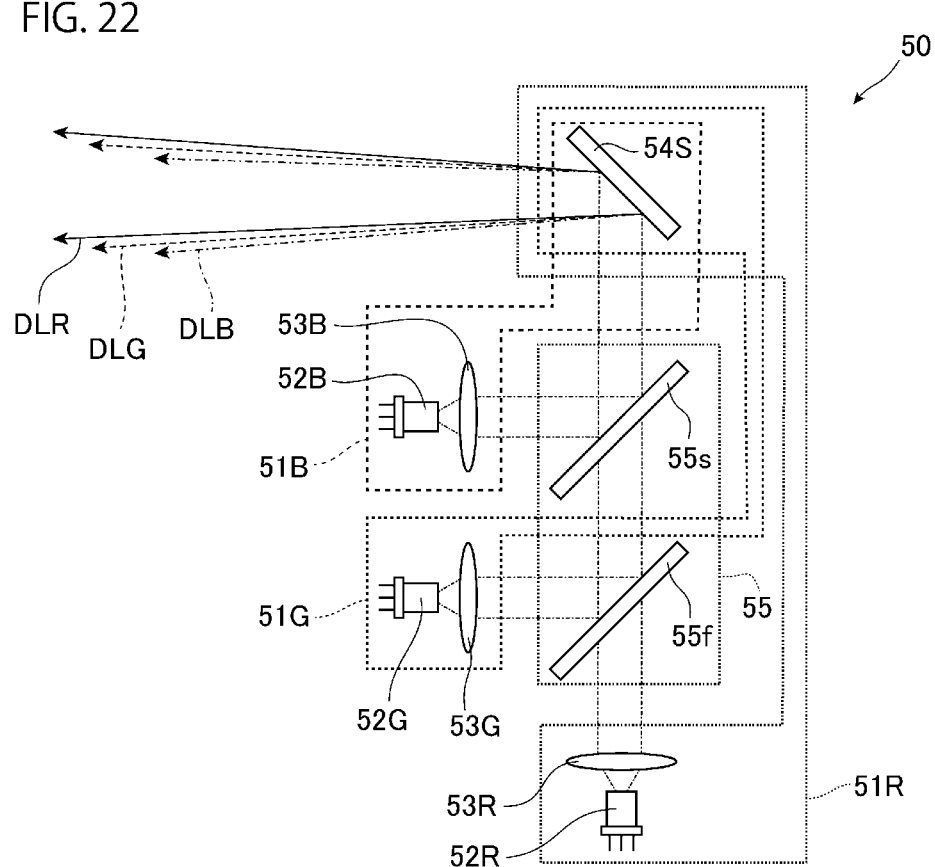
FIG. 22 is a diagram showing an optical system unit in a sixth embodiment as the first aspect of the present invention in the similar manner to FIG. 2.

FIG. 22 is a diagram showing an optical system unit in a sixth embodiment of the present invention in the similar manner to FIG. 2. Note that the heat sink 30, the cover 59, and the like are omitted in FIG. 22. As shown in FIG. 22, the optical system unit 50 of the present embodiment is different from the optical system unit 50 of the first embodiment mainly in that it includes one phase modulation element 54S in place of the three phase modulation elements 54R, 54G, 54B.

In the present embodiment, the configuration of the phase modulation element 54S is similar to that of the phase modulation elements 54R, 54G, 54B of the first embodiment. The first light emitting optical system 51R, the second light emitting optical system 51G, and the third light emitting optical system 51B share the phase modulation element 54S, and the light emitted from the synthesizing optical system 55 is incident on the phase modulation element 54S. Specifically, the laser light emitted from the light source 52R of the first light emitting optical system 51R is collimated by the collimator lens 53R, transmits through the first optical element 55*f* and the second optical element 55*s* of the synthesizing optical system 55, and is incident on the phase modulation element 54S. The laser light emitted from the light source 52G of the second light emitting optical system 51G is collimated by the collimator lens 53G, reflected by the first optical element 55*f* of the synthesizing optical system 55, transmits the second optical element 55*s*, and is incident on the phase modulation element 54S. The laser light emitted from the light source 52B of the third light emitting optical system 51B is collimated by the collimator lens 53B, reflected by the second optical element 55*s* of the synthesizing optical system 55, and is incident on the phase modulation element 54S. Note that the laser light emitted from these light sources 52R, 52G, 52B is only required to be incident on the phase modulation element 54S, and the configuration of the synthesizing optical system 55 is not limited. For example, these pieces of laser light may be incident on the phase modulation element 54S without passing through the synthesizing optical system 55. That is, the light sources 52R, 52G, 52B, the collimator lenses 53R, 53G, 53B, and the phase modulation element 54S may be arranged so that the laser light emitted from the light sources 52R, 52G, 52B is incident on the phase modulation element 54S without passing through the synthesizing optical system 55.

In the present embodiment, the electric power supplied to the light sources 52R, 52G, 52B is adjusted, and the laser light is emitted alternately for each of these light sources 52R, 52G, 52B. That is, when the light source 52R emits the laser light, the light source 52G and the light source 52B do not emit the laser light. When the light source 52G emits the laser light, the light source 52R and the light source 52B do not emit the laser light. When the light source 52B emits the laser light, the light source 52R and the light source 52G do not emit the laser light. Then, the emission of the laser light for each of the light sources 52R, 52G, 52B is sequentially switched. Therefore, pieces of laser light having different wavelengths emitted from these light sources 52R, 52G, 52B are sequentially incident on the phase modulation element 54S.

Next, the operation of the phase modulation element 54S of the present embodiment will be described. Specifically, a case where the headlight 1 emits light having a specific light distribution pattern in the table TB of the first embodiment will be described as an example.

In the present embodiment, the phase modulation element 54S changes the phase modulation pattern in synchronization with the switching of the emission of the laser light for each of the light sources 52R, 52G, 52B as described above. Specifically, when the laser light emitted from the light source 52R is incident, the phase modulation element 54S changes the phase modulation pattern to the phase modulation pattern that is corresponding to the light source 52R, and is the phase modulation pattern of the phase modulation element 54R associated with a specific light distribution pattern in the table TB of the first embodiment. Therefore, when the laser light emitted from the light source 52R is incident, the phase modulation element 54S emits the first light DLR emitted from the phase modulation element 54R when the headlight 1 emits light of a specific light distribution pattern in the first embodiment. Further, when the laser light emitted from the light source 52G is incident, the phase modulation element 54S changes the phase modulation pattern to the phase modulation pattern that is corresponding to the light source 52G, and is the phase modulation pattern of the phase modulation element 54G associated with a specific light distribution pattern in the table TB of the first embodiment. Therefore, when the laser light emitted from the light source 52G is incident, the phase modulation element 54S emits the second light DLG emitted from the phase modulation element 54G when the headlight 1 emits light of a specific light distribution pattern in the first embodiment. Further, when the laser light emitted from the light source 52B is incident, the phase modulation element 54S changes the phase modulation pattern to the phase modulation pattern that is corresponding to the light source 52B, and is the phase modulation pattern of the phase modulation element 54B associated with a specific light distribution pattern in the table TB of the first embodiment. Therefore, when the laser light emitted from the light source 52B is incident, the phase modulation element 54S emits the third light DLB emitted from the phase modulation element 54B when the headlight 1 emits light of a specific light distribution pattern in the first embodiment.

The phase modulation element 54S changes the phase modulation pattern in synchronization with the switching of the laser light emission for each of the light sources 52R, 52G, 52B as described above, thereby emitting the first light DLR, the second light DLG, and the third light DLB in sequence. That is, the first light DLR, the second light DLG, and the third light DLB are sequentially emitted from the first light emitting optical system 51R, the second light emitting optical system 51G, and the third light emitting optical system 51B that share the phase modulation element 54S. These pieces of light DLR, DLG, DLB are emitted from the opening 59H of the cover 59, and are sequentially emitted to the outside of the headlight 1 through the front cover 12. At this time, the first light DLR, the second light DLG, and the third light DLB are applied so that regions irradiated with the respective pieces of light overlap with each other at the focal position separated by a predetermined distance from the vehicle. The focal position is, for example, 25 m away from the vehicle. It is preferable that the first light DLR, the second light DLG, and the third light DLB are emitted so that the outer shapes of the regions irradiated with each piece of the light DLR, DLG, DLB at this focal position are substantially the same. Further, in the present embodiment, the emission time lengths of the laser light emitted from the light sources 52R, 52G, 52B are substantially the same, and thus the emission time lengths of the light DLR, DLG, DLB are also substantially the same. Further, the intensity of the laser light emitted from the light sources 52R, 52G, 52B is the intensity associated with the specific light distribution pattern in the table TB.

By the way, when pieces of light of different colors are repeatedly applied in a cycle shorter than the time resolution of human vision, a human may recognize that light obtained by synthesizing light of different colors is applied by the afterimage phenomenon. In the present embodiment, when the time from when the light source 52R emits the laser light to when the light source 52R emits the laser light again is shorter than the time resolution of human vision, the pieces of light DLR, DLG, DLB emitted from the phase modulation element 54S are repeatedly applied in a shorter cycle than the time resolution of human vision, and the red light DLR, the green light DLG, and the blue light DLB are synthesized by the afterimage phenomenon. As described above, the lengths of the emission times of the light DLR, DLG, DLB are substantially the same, and the intensity of the laser light emitted from the light sources 52R, 52G, 52B is intensity associated with the specific light distribution pattern in the table TB. Therefore, the color of the light synthesized by the afterimage phenomenon is the same white as the light obtained by synthesizing the light DLR, DLG, DLB in the first embodiment. Further, since the light distribution pattern of the light obtained by synthesizing the light DLR, DLG, DLB is a specific light distribution pattern in the table TB, the light distribution pattern of the light obtained by synthesizing the light DLR, DLG, DLB by the afterimage phenomenon is also a specific light distribution pattern. As described above, the light of this specific light distribution pattern is emitted from the headlight 1.

Note that the cycle of repeatedly emitting the laser light from the light sources 52R, 52G 52B is preferably ⅕ s or less from the viewpoint of suppressing feeling of the flicker of light obtained by synthesizing by the afterimage phenomenon. The time resolution of human vision is approximately ⅓₀ s. In the case of a vehicle lamp, it is possible to suppress feeling of the flicker of light when the cycle of light emission is about twice. If this cycle is ⅓₀ s or less, the time approximately exceeds the time resolution of human vision. Therefore, it is possible to further suppress feeling of flicker of light. Further, from the viewpoint of further suppressing the feeling of light flicker, this period is preferably ¹⁄₆₀s or less.

In the present embodiment, as described above, the intensity of the laser light emitted from the light sources 52R, 52G, 52B is the intensity associated with the specific light distribution pattern in the table TB. Therefore, as similar to the first embodiment, in the lamp unit 20 of the present embodiment, the intensity of the laser light emitted from the light sources 52R, 52G, 52B is adjusted, and the total luminous flux amount of the light emitted from the lamp unit 20 is adjusted according to the light distribution pattern formed by the light obtained by synthesizing the light DLR, DLG, DLB. Note that the lamp unit 20 of the present embodiment may adjust the total luminous flux amount of the light emitted from the lamp unit 20 by using the optical filter 80 as similar to the fifth embodiment. According to the headlight 1 of the present embodiment, since the first light emitting optical system 51R, the second light emitting optical system 51G, and the third light emitting optical system 51B share this phase modulation element 54S, the number of parts can be reduced.

Note that the headlight for vehicle as the first aspect of the present invention is not particularly limited as long as it includes a lamp unit including a phase modulation element that diffracts the laser light emitted from the light source with a phase modulation pattern that is changeable, and emits light of a light distribution pattern based on the phase modulation pattern, in which the lamp unit adjusts the total luminous flux amount of the light emitted from the lamp unit according to the light distribution pattern. In the headlight for vehicle having such a configuration, the phase modulation element diffracts the laser light emitted from the light source with the phase modulation pattern that is changeable, and emits light of the light distribution pattern based on the phase modulation pattern. Therefore, by changing the phase modulation pattern, the light distribution pattern of the light emitted from the lamp unit can be changed, and the light distribution pattern of the light emitted from the headlight for vehicle can be changed. In this headlight for vehicle, as described above, the total luminous flux amount of the light emitted from the lamp unit is adjusted according to the light distribution pattern of the light emitted from the phase modulation element. Therefore, in this headlight for vehicle, for example, the total luminous flux amount of the light emitted from the lamp unit can be adjusted according to the size of the region irradiated with the light emitted from the headlight for vehicle on a vertical surface at a predetermined distance from the vehicle. Accordingly, this headlight for vehicle can suppress an unintentional change as a whole in the brightness of the region irradiated with the light when the light distribution pattern of the emitted light is changed, and can prevent a driver from feeling uncomfortable.

Further, in the first to sixth embodiments and modification as the first aspect, the phase modulation elements 54R, 54G, 54B, 54S are reflection type phase modulation elements. However, the phase modulation element is only required to be able to diffract the incident light with a changeable phase modulation pattern and emit the light of the light distribution pattern based on the phase modulation pattern. For example, the phase modulation element may be a liquid crystal display (LCD), which is a liquid crystal panel, or a grating light valve (GLV) in which a plurality of reflectors are formed on a silicon substrate. The LCD is a transmissive phase modulation element. As similar to the LCOS, which is a reflective liquid crystal panel, this LCD controls the voltage applied between a pair of electrodes that sandwich the liquid crystal layer at each dot, so that the change amount of the phase of the light emitted from each dot is adjusted, and the light distribution pattern of the emitted light can be made into a desired light distribution pattern. Note that the pair of electrodes is a transparent electrode. The GLV is a reflective phase modulation element. By electrically controlling the deflection of the reflector, this GLV can diffract and emit the incident light and make the light distribution pattern of the emitted light have a desired light distribution pattern.

Furthermore, in the first to fifth embodiments and the modification as the first aspect, the first optical element 55*f* transmits the first light DLR and reflects the second light DLG to synthesize the first light DLR and the second light DLG, and the second optical element 55*s* transmits the first light DLR and the second light DLG synthesized by the first optical element 55*f* and reflects the third light DLB to synthesize the first light DLR, the second light DLG, and the third light DLB. However, for example, a configuration may be adopted in which the third light DLB and the second light DLG are synthesized in the first optical element 55*f*, and the third light DLB and the second light DLG synthesized by the first optical element 55*f* and the first light DLR are synthesized in the second optical element 55*s*. In this case, in the above embodiments, the positions of the first light emitting optical system 51R including the light source 52R, the collimator lens 53R, and the phase modulation element 54R is switched with the position of the third light emitting optical system 51B including the light source 52B, the collimator lens 53B, and the phase modulation element 54B. Furthermore, in the above embodiments and the modification, a bandpass filter that transmits light having a predetermined wavelength band and reflects light having other wavelength bands may be used for the first optical element 55*f* or the second optical element 55*s*. Further, in the first to fifth embodiments and the modification, the synthesizing optical system 55 is only required to synthesize pieces of light emitted from the respective light emitting optical systems, and the synthesizing optical system 55 is not limited to the configuration of the above embodiments or the above-described configuration.

Figure 23:
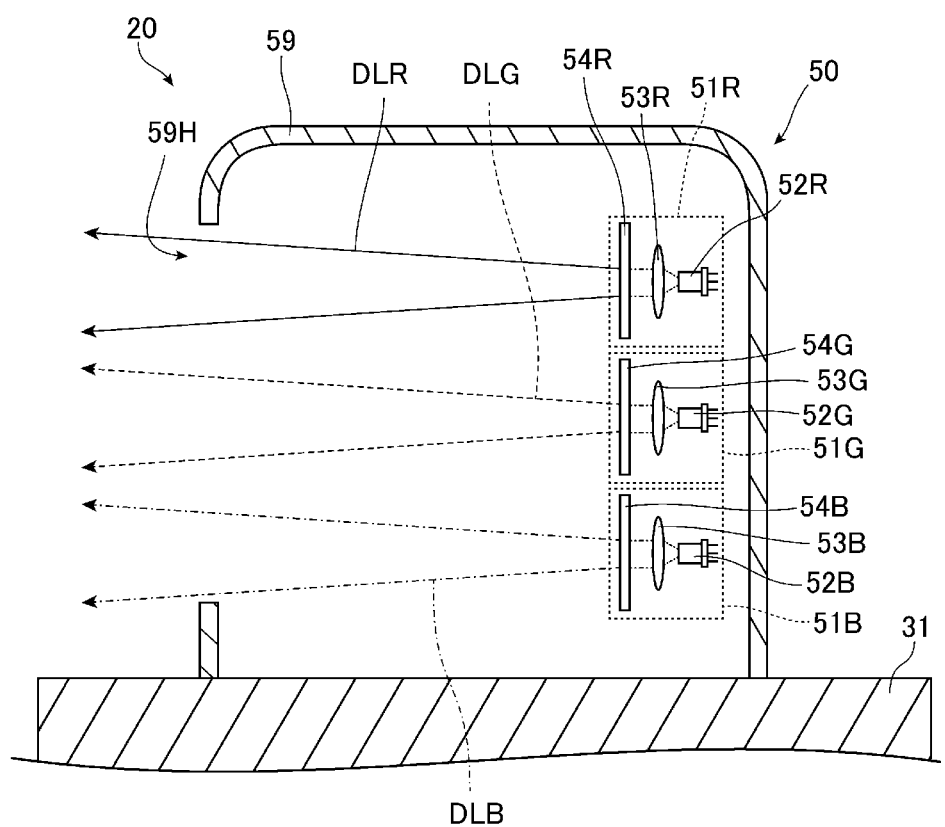
FIG. 23 is a diagram showing an optical system unit in a modification as the first aspect of the present invention in the similar manner to FIG. 2.

Further, in the first to fifth embodiments and modification as the first aspect, the optical system unit 50 is a synthesizing optical system 55 that synthesizes the first light DLR, the second light DLG, and the third light DLB. However, the optical system unit 50 does not have to include the synthesizing optical system 55. FIG. 23 is a diagram showing an optical system unit in a modification as the first aspect of the present invention in the similar manner to FIG. 2.

As shown in FIG. 23, the optical system unit 50 of the present modification is different from the optical system unit 50 in the first embodiment in points that the synthesizing optical system 55 is not provided, light is emitted from the cover 59 in a state where pieces of light emitted from the first light emitting optical system 51R, the second light emitting optical system 51G, and the third light emitting optical system 51B are not synthesized, and the phase modulation elements 54R, 54G, 54B are transmissive phase modulation elements. Note that the same or equivalent constituent elements as those of the first embodiment are denoted by the same reference numerals, and redundant explanation will be omitted except when particularly described. In the present modification, the light emission direction of the first light emitting optical system 51R, the second light emitting optical system 51G, and the third light emitting optical system 51B is set to the opening 59H side of the cover 59.

In the present modification as well, as similar to the first embodiment, the phase modulation elements 54R, 54G, 54B diffract the laser light emitted from the collimator lenses 53R, 53G, 53B so that the light distribution pattern formed by the light obtained by synthesizing the light DLR, DLG, DLB emitted respectively from the phase modulation elements 54R, 54G, 54B is one of the light distribution patterns in the table TB. Each of the first light DLR emitted from the phase modulation element 54R, the second light DLG emitted from the phase modulation element 54R, and the third light DLB emitted from the phase modulation element 54B is emitted from the opening 59H of the cover 59, and is applied to the outside of the headlight 1 through the front cover 12. At this time, the first light DLR, the second light DLG, and the third light DLB are applied so that regions irradiated with the respective pieces of light overlap with each other at the focal position separated by a predetermined distance from the vehicle and one of the light distribution patterns in the table TB is formed. The focal position is, for example, 25 m away from the vehicle. It is preferable that the first light DLR, the second light DLG, and the third light DLB are emitted so that the outer shapes of each light distribution pattern at this focal position are substantially the same. Further, also in the present modification, as similar to the above embodiments, in the lamp unit 20, the intensity of the laser light emitted from the light sources 52R, 52G, 52B is adjusted, and the total luminous flux amount of the light emitted from the lamp unit 20 is adjusted according to the light distribution pattern formed by the light obtained by synthesizing the light DLR, DLG, DLB. According to the headlight 1 of the present modification, since the synthesizing optical system of the first embodiment is not used, a simple configuration can be obtained.

Further, in the first to sixth embodiments and the modification as the first aspect, the phase modulation elements 54R, 54G, 54B, 54S having a plurality of modulation units have been described as an example. However, the number, size, outer shape, and the like of the modulation units are not particularly limited. For example, the phase modulation element may have one modulation unit, and the incident light may be diffracted by this one modulation unit.

Further, in the first to fifth embodiments and the modification as the first aspect, the optical system unit 50 including three light sources 52R, 52G, 52B and three phase modulation elements 54R, 54G, 54B respectively corresponding to the light sources 52R, 52G, 52B has been described as an example. However, the three phase modulation elements 54R, 54G, 54B may be integrally formed. Examples of a configuration of such a phase modulation element include a configuration in which the phase modulation element is divided into a region corresponding to the light source 52R, a region corresponding to the light source 52G, and a region corresponding to the light source 52B. In such a configuration, the laser light emitted from the light source 52R is incident on the region corresponding to the light source 52R, the laser light emitted from the light source 52G is incident on the region corresponding to the light source 52G, and the laser light emitted from the light source 52B is incident on the region corresponding to the light source 52B. The phase modulation pattern in the region corresponding to the light source 52R is the phase modulation pattern corresponding to the laser light emitted from the light source 52R, and the phase modulation pattern in the region corresponding to the light source 52G is the phase modulation pattern corresponding to the laser light emitted from the light source 52G, and the phase modulation pattern in the region corresponding to the light source 52B is the phase modulation pattern corresponding to the laser light emitted from the light source 52B. According to such a headlight 1, since the three phase modulation elements 54R, 54G, 54B are integrally formed, the number of parts can be reduced.

Further, in the sixth embodiment as the first aspect, the optical system unit 50 in which all the light emitting optical systems 51R, 51G, 51B share the phase modulation element 54S has been described as an example. However, it is sufficient that at least two light emitting optical systems share the phase modulation element 54S. In this case, the light emitted from the light emitting optical system sharing the phase modulation element is synthesized by an afterimage phenomenon, and the light synthesized by this afterimage phenomenon and the light emitted from another light emitting optical system are synthesized to form a predetermined light distribution pattern.

Further, the information stored in the storage unit 74 in the first to sixth embodiments and the modification as the first aspect is not particularly limited. For example, in the third embodiment as the first aspect, a table may be stored in the storage unit 74. In the table, for each of the high beam light distribution pattern PH, the right steering light distribution pattern in which the low beam light distribution pattern PL is expanded to the right, and the left steering light distribution pattern in which the low beam light distribution pattern PL is expanded to the left, the phase modulation pattern in the phase modulation elements 54R, 54G, 54B when forming the light distribution pattern, the intensity of the laser light of the light sources 52R, 52G, 52B when forming the light distribution pattern, and the steering angle of the vehicle are associated. Further, a table in which the table described above and the table TB in the third embodiment as the first aspect are combined may be stored in the storage unit 74. Further, in the table TB of the third embodiment as the first aspect, the speed of the vehicle may be further associated with each light distribution pattern, and the vehicle speed sensor of the vehicle may be electrically connected to the control unit 71. In such a case, the control unit 71 can control the phase modulation elements 54R, 54G, 54B on the basis of the information including the steering angle of the vehicle and the vehicle speed of the vehicle. Therefore, such a headlight 1 can change the light distribution pattern of the light emitted according to the change in the traveling direction of the vehicle and the vehicle speed to a light distribution pattern expanded in the left-right direction, and the visibility in the curved road can be further improved.

Further, the headlight 1 in the first and second embodiments as the first aspect changes the light distribution pattern of the emitted light according to the situation in front of the vehicle. In the headlight 1 in the third embodiment as the first aspect, the light distribution pattern of the emitted light changes to a light distribution pattern expanded in the left-right direction according to the change in the traveling direction of the vehicle. In the headlight 1 in the fourth embodiment as the first aspect, the light distribution pattern of the emitted light changes to a light distribution pattern expanded in the left-right direction according to the signal from the turn switch of the vehicle. However, the headlight for vehicle as the first aspect of the present invention may be a combination of these headlights 1. For example, the headlight for vehicle as the first aspect may change the light distribution pattern of the light emitted according to the situation in front of the vehicle, and the light distribution pattern of the emitted light may be changed according to the change of the traveling direction of the vehicle to a light distribution pattern expanded in the left-right direction. Further, for example, the headlight for vehicle as the first aspect may change the light distribution pattern of the light emitted according to the situation in front of the vehicle, and the light distribution pattern of the emitted light may be changed according to the signal from the turn switch of the vehicle to a light distribution pattern expanded in the left-right direction.

Further, in the first to sixth embodiments and the modification as the first aspect, the intensity of the laser light emitted from the light sources 52R, 52G, 52B is adjusted according to the change in the total luminous flux amount of the light emitted from the lamp unit 20. However, the lamp unit is only required to adjust the total luminous flux amount of the light emitted from the lamp unit according to the light distribution pattern of the light emitted from the lamp unit. For example, the lamp unit may adjust the total luminous flux amount of the light emitted from the lamp unit according to the change in the size of the light distribution pattern of the light emitted from the lamp unit. Note that the size here is defined as the size when the light distribution pattern is formed on the vertical surface at a predetermined distance from the vehicle.

Figure 24A:
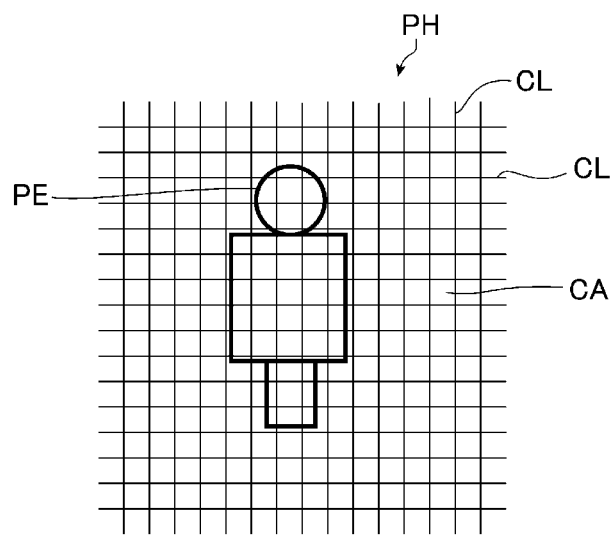
FIG. 24A and FIG. 24B are diagrams for explaining information related to intensity distribution of a light distribution pattern in another modification as the first aspect of the present invention.
Figure 24B:
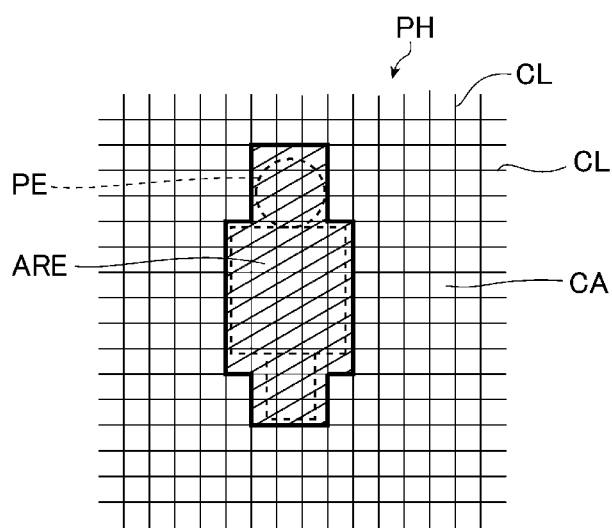

Further, in the first to sixth embodiments and the modification as the first aspect, the headlight 1 that emits the light of one of the light distribution patterns in the table TB has been described as an example. However, the headlight 1 may emit light of a light distribution pattern different from the light distribution pattern in the table TB. For example, the control unit 71 in the first embodiment as the first aspect may operate the phase modulation pattern in the phase modulation elements 54R, 54G, 54B for forming the light distribution pattern in which a region overlapping a part of the target object is darkened and the intensity of the laser light emitted from the light sources 52R, 52G, 52B when forming the light distribution pattern, on the basis of the information stored in the storage unit 74, the information on the existence of the target object and the existence position of the target object input from the detection device 72, and the like. In this case, for example, the storage unit stores another table related to the intensity distribution of the high beam light distribution pattern PH together with the table in which the phase modulation pattern in the phase modulation elements 54R, 54G, 54B when forming the high beam light distribution pattern PH and the intensity of the laser light emitted from the light sources 52R, 52G, 52B when forming the high beam light distribution pattern PH are associated with each other. FIG. 24A and FIG. 24B are diagrams for explaining information related to intensity distribution of a light distribution pattern in modification as described above. Specifically, FIG. 24A is an enlarged view of a part of the high beam light distribution pattern PH, and an enlarged view of the overlapping portion of the high beam light distribution pattern PH and the pedestrian PE. In FIG. 24A, the pedestrian PE is shown by a thick line and a plurality of compartment lines CL are shown. Note that the same or equivalent constituent elements as those of the first embodiment are denoted by the same reference numerals, and redundant explanation will be omitted except when particularly described.

As shown in FIG. 24A, the high beam light distribution pattern PH of the present modification is formed by an aggregate of compartment regions CA partitioned at substantially equal intervals in the vertical and horizontal directions by the compartment lines CL. The address and light intensity are preset for each compartment region. The address is represented, for example, by the row number and column number where the compartment region CA is located. The width of the compartment region CA in the vertical direction is represented by the width corresponding to the vertical angle with respect to the headlight 1, and the width of the compartment region CA in the left-right direction is represented by the width corresponding to the horizontal angle with respect to the headlight 1. Each of these widths is set to a width corresponding to, for example, 0.1 degrees.

FIG. 25A and FIG. 25B are diagrams showing tables in the present modification. Specifically, FIG. 25A is a diagram showing a table TB1 regarding the phase modulation pattern and the intensity of the laser light. FIG. 25B is a diagram showing another table TB2 regarding the intensity distribution of the high beam light distribution pattern PH. In the table TB1 of the present modification, the phase modulation pattern in the phase modulation elements 54R, 54G, 54B when forming the high beam light distribution pattern PH and the intensity of the laser light emitted from the light sources 52R, 52G, 52B when forming the high beam light distribution pattern PH are associated with the high beam light distribution pattern PH. In another table TB2 of the present modification, the address of the compartment region CA and the total luminous flux amount as the intensity of light in the compartment region CA are associated with each other.

The control unit 71 of the present modification extracts the compartment region CA overlapping at least a part of the target object on the basis of the information on the existence of the target object and the existence position of the target object input from the detection device 72. FIG. 24B is a diagram showing a compartment region to be extracted. As shown in FIG. 24B, for example, all compartment regions CA overlapping the pedestrian PE may be extracted. In FIG. 24B, the pedestrian PE is indicated by a broken line, the extracted compartment region CA is referred to as an extraction region ARE, and the extraction region ARE is diagonally hatched.

The control unit 71 operates a phase modulation pattern in the phase modulation elements 54R, 54G, 54B in which the light distribution pattern formed by the light obtained by synthesizing the light DLR, DLG, DLB emitted from the phase modulation elements 54R, 54G, 54B is the light distribution pattern in which the extraction region ARE is darkened. Note that the brightness of the extracted extraction region ARE in the light distribution pattern to be formed is, for example, a predetermined brightness. The control unit 71 controls the phase modulation elements 54R, 54G, 54B on the basis of the operation result. That is, it is understood that each of the phase modulation elements 54R, 54G, 54B sets a phase modulation pattern in which the light distribution pattern formed by the light obtained by synthesizing the light DLR, DLG, DLB is the light distribution pattern in which the extraction region ARE is darkened. Since the extraction region ARE overlaps with at least a part of the target object, the light distribution pattern of the light emitted from the lamp unit 20 is a light distribution pattern in which the region overlapping with at least a part of the target object is darkened.

Further, the control unit 71 operates the summed total luminous flux amount by adding the total luminous flux amounts of each of the extracted compartment regions CA on the basis of the other table TB2 described above. The control unit 71 reduces the intensity of the laser light emitted from the light sources 52R, 52G, 52B on the basis of the operation result. Specifically, when the summed total luminous flux amount is large, the control unit 71 increases the degree of decrease in the intensity of the laser light emitted from the light sources 52R, 52G, 52B, and when the summed total luminous flux amount is small, the control unit 71 reduces the degree of decrease in the intensity of the laser light emitted from the light sources 52R, 52G, 52B. That is, in the lamp unit 20 in the present modification, the total luminous flux amount of the light emitted from the lamp unit 20 is reduced according to the light distribution pattern in which the extraction region ARE is darkened. Therefore, this headlight 1 can reduce the total luminous flux amount of the light emitted from the lamp unit 20 by the amount of reducing the total luminous flux amount of the light emitted to the target object, and can prevent the compartment regions CA other than the extraction region ARE of the light distribution pattern in which the extraction region ARE is darkened from being unintentionally brightened as a whole. Accordingly, this headlight 1 can prevent a driver from feeling uncomfortable even if the light distribution pattern of the emitted light changes according to the situation in front of the vehicle.

Further, in the first to sixth embodiments and the modification as the first aspect, the lamp unit 20 does not include an imaging lens system including an imaging lens. However, the lamp unit 20 may include an imaging lens system, and the light emitted from the optical system unit 50 may be emitted through the imaging lens system. With such a configuration, it is possible to easily make the light distribution pattern of the emitted light a larger light distribution pattern. The term "larger" here means larger when the light distribution pattern formed on the vertical surface at a predetermined distance from the vehicle is compared.

Further, in the first to fifth embodiments and the modification as the first aspect, the optical system unit 50 including three light sources 52R, 52G, 52B and three phase modulation elements 54R, 54G, 54B respectively corresponding to the light sources 52R, 52G, 52B has been described as an example. Further, in the sixth embodiment as the first aspect, the optical system unit 50 including three light emitting optical systems 51R, 51G, 51B sharing the phase modulation element 54S has been described as an example. However, the optical system unit is only required to include at least one light source and a phase modulation element corresponding to this light source. For example, the optical system unit may include a light source that emits white laser light and a phase modulation element that diffracts and emits white laser light emitted from this light source.

Seventh Embodiment

Next, a seventh embodiment as a second aspect of the present invention will be described. Note that the same or equivalent constituent elements as those of the first embodiment described above are denoted by the same reference numerals, and redundant explanation will be omitted except when particularly described. Although the configuration of the headlight 1 in the present embodiment is the same as the configuration of the headlight 1 in the first embodiment, the light distribution pattern of the light emitted by the headlight 1 of the present embodiment is different from the light distribution pattern of the light emitted by the headlight 1 of the first embodiment.

In the present embodiment, as shown in FIG. 26, a table TB is stored in the storage unit 74. In the table, for each light distribution pattern, the phase modulation pattern in the phase modulation elements 54R, 54G, 54B when forming the light distribution pattern is associated.

Figure 27A:
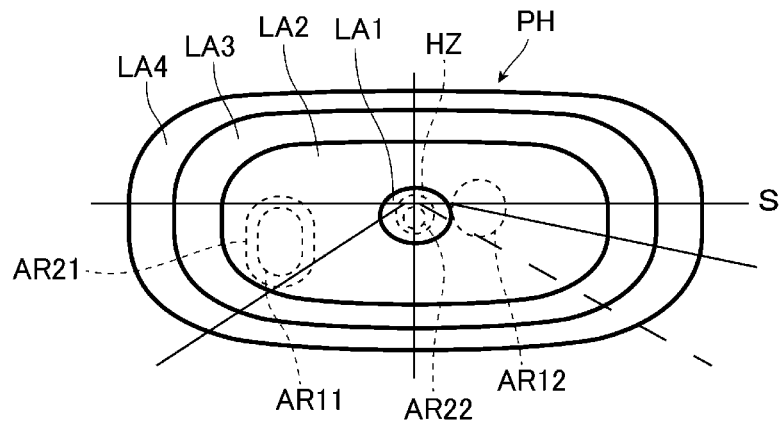
FIG. 27A, FIG. 27B, and FIG. 27C are diagrams showing examples of a light distribution pattern in the seventh embodiment as the second aspect of the present invention.
Figure 27B:
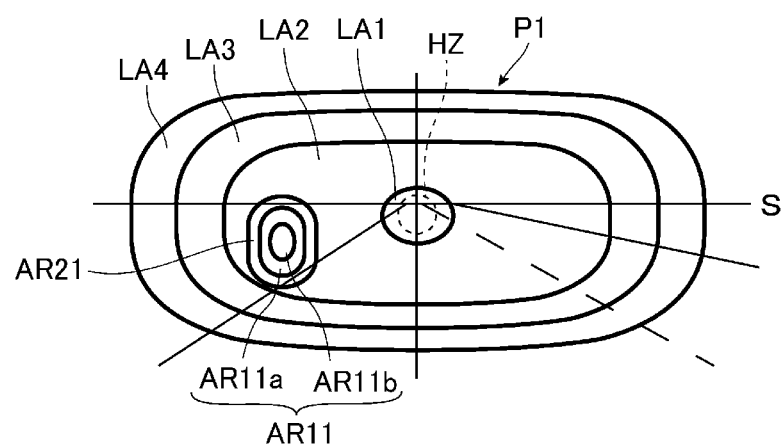
Figure 27C:
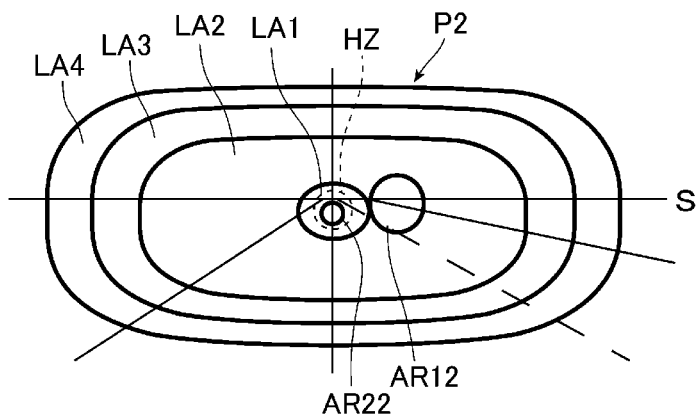

FIG. 27A, FIG. 27B, and FIG. 27C are diagrams showing examples of a light distribution pattern in the present embodiment. Specifically, FIG. 27A is a diagram showing a high beam light distribution pattern. FIG. 27B is a diagram showing a light distribution pattern in which a specific region in the high beam light distribution pattern is darkened and a predetermined region is brightened. FIG. 27C is a diagram showing a light distribution pattern in which another specific region in the high beam light distribution pattern is darkened and another predetermined region is brightened. In FIGS. 27A, 27B, and 27C, S indicates a horizontal line, the light distribution pattern is indicated by a thick line, and this light distribution pattern is a light distribution pattern formed on a vertical plane 25 m away from the vehicle.

In the high beam light distribution pattern PH shown in FIG. 27A, a region LA1 is the region having the highest intensity, and regions LA2, LA3, and LA4 have lower intensities in this order. A hot zone HZ is located in the region LA1. That is, the phase modulation pattern in each of the phase modulation elements 54R, 54G, 54B is a phase modulation pattern in which the synthesized light forms a light distribution pattern including the intensity distribution of the high beam.

The light distribution pattern P1 shown in FIG. 27B is a light distribution pattern in which a specific region AR11 in the high beam light distribution pattern PH is darkened and a predetermined region AR21 different from the specific region AR11 is brightened. That is, the light intensity of the specific region AR11 in the light distribution pattern P1 is lower than the light intensity of the specific region AR11 in the high beam light distribution pattern PH. Further, the light intensity of the predetermined region AR21 in the light distribution pattern P1 is higher than the light intensity of the predetermined region AR21 in the high beam light distribution pattern PH. Therefore, the total luminous flux amount of the specific region AR11 in the light distribution pattern P1 is smaller than the total luminous flux amount of the specific region AR11 in the high beam light distribution pattern PH, and the total luminous flux amount of the light in the specific region AR21 in the light distribution pattern P1 is larger than the total luminous flux amount of the light in the specific region AR21 in the high beam light distribution pattern PH. Further, the intensity distribution in other regions than the specific region AR11 and the predetermined region AR21 in the light distribution pattern P1 is the same as the intensity distribution in other regions than the specific region AR11 and the predetermined region AR21 in the high beam light distribution pattern PH. Here, if the intensity of light at a plurality of reference points is the same, it can be estimated that the intensity distribution is also the same, and for example, if the brightness or illuminance at a plurality of reference points is the same, it can be estimated that the intensity distribution is also the same. The plurality of reference points preferably include the point having the maximum intensity. In FIG. 27A, the specific region AR11 and the predetermined region AR21 in the high beam light distribution pattern PH are indicated by broken lines. In the present embodiment, the specific region AR11 of the light distribution pattern P1 is located in the region LA2, and a central region AR11a in this specific region AR11 is darker than an edge side region AR11b. Further, the light intensity of the central region AR11a and the edge side region AR11b of the specific region AR11 in the light distribution pattern P1 is lower than the intensity of the region LA3. The predetermined region AR21 is located in the region LA2, surrounds the specific region AR11, and is in contact with the entire circumference of the edge of the specific region AR11.

The light distribution pattern P2 shown in FIG. 27C is a light distribution pattern in which another specific region AR12 different from the specific region AR11 in the high beam light distribution pattern PH is darkened, and a predetermined region AR22 different from the specific region AR12 is brightened. That is, the light intensity of the specific region AR12 in the light distribution pattern P2 is lower than the light intensity of the specific region AR12 in the high beam light distribution pattern PH. Further, the light intensity of the predetermined region AR22 in the light distribution pattern P1 is higher than the light intensity of the predetermined region AR22 in the high beam light distribution pattern PH. Therefore, the total luminous flux amount of the specific region AR12 in the light distribution pattern P2 is smaller than the total luminous flux amount of the specific region AR12 in the high beam light distribution pattern PH, and the total luminous flux amount of the light in the specific region AR22 in the light distribution pattern P1 is larger than the total luminous flux amount of the light in the specific region AR21 in the high beam light distribution pattern PH. Further, the intensity distribution in other regions than the specific region AR12 and the predetermined region AR22 in the light distribution pattern P2 is the same as the intensity distribution in other regions than the specific region AR12 and the predetermined region AR22 in the high beam light distribution pattern PH. In FIG. 27A, the specific region AR12 and the predetermined region AR22 in the high beam light distribution pattern PH are indicated by broken lines. In the present embodiment, the specific region AR12 of the light distribution pattern P2 is located in the region LA2, and the light intensity of the specific region AR12 is lower than the intensity of the region LA2. Further, the predetermined region AR21 is located in the hot zone HZ in the light distribution pattern P2. As described above, the intensity distribution in other regions than the specific region AR12 and the predetermined region AR22 in the light distribution pattern P2 is the same as the intensity distribution in other regions than the specific region AR12 and the predetermined region AR22 in the high beam light distribution pattern PH. Therefore, the position of the hot zone HZ in the high beam light distribution pattern PH and the position of the hot zone HZ in the light distribution pattern P2 are the same, and the predetermined region AR21 is located in the region corresponding to the hot zone HZ in the high beam light distribution pattern PH.

As described above, the light distribution pattern of the light emitted from the headlight 1 in the present embodiment is the high beam light distribution pattern PH or the light distribution patterns P1, P2 in which the specific regions AR11, AR12 in the high beam light distribution pattern PH are darkened, and the predetermined regions AR21, AR22 different from the specific regions AR11, AR12 are brightened.

Note that the positions, shapes, numbers, and sizes of the specific regions AR11, AR12 in the light distribution patterns P1, P2 and the predetermined regions AR21, AR22 are not particularly limited. Further, the number of light distribution patterns P1, P2 in which the specific regions AR11, AR12 in the high beam light distribution pattern PH are darkened and the predetermined regions AR21, AR22 are brightened is not limited. Further, the light intensity of the specific regions AR11, AR12 in the light distribution patterns P1, P2 is not particularly limited, and the light intensity of the specific regions AR11, AR12 may be zero, that is, light may not be emitted to the specific regions AR11, AR12. Further, the degree of darkness in the specific regions AR11, AR12 may be substantially constant throughout the specific regions AR11, AR12, and the degree of darkness in the specific regions AR11, AR12 may change according to the position in the specific regions AR11, AR12. Further, the light intensity of the predetermined regions AR21, AR22 in the light distribution patterns P1, P2 is not particularly limited. Further, the degree of brightness in the predetermined regions AR21, AR22 may be substantially constant throughout the predetermined regions AR21, AR22, and the degree of brightness in the predetermined regions AR21, AR22 may change according to the position in the predetermined regions AR21, AR22. Further, the intensity distribution in other regions than the specific regions AR11, AR12 and the predetermined regions AR21, AR22 in the light distribution patterns P1, P2 may be different from the intensity distribution in other regions than the specific regions AR11, AR12 and the predetermined regions AR21, AR22 in the high beam light distribution pattern PH. Further, the outer shape of the light distribution patterns P1, P2 may be different from the outer shape of the high beam light distribution pattern PH.

Next, the operation of the headlight 1 of the present embodiment will be described. Specifically, operation of changing the light distribution pattern of the light emitted according to the situation in front of the vehicle from the high beam light distribution pattern PH to another light distribution pattern will be described. FIG. 28 is a diagram showing a control flowchart of the control unit 71.

First, in step SP31, when the light switch 73 is turned on and a signal instructing the emission of light from the light switch 73 is input to the control unit 71, the control flow of the control unit 71 proceeds to step SP32. On the other hand, in step SP31, when this signal is not input to the control unit 71, the control flow of the control unit 71 proceeds to step SP36.

In step SP32, when the detection device 72 does not detect a predetermined target object located in front of the vehicle and the detection device 72 does not input the information on the existence of the target object and the existence position of the target object to the control unit 71, the control flow of the control unit 71 proceeds to step SP33. On the other hand, in step SP32, when this information is input to the control unit 71, the control flow of the control unit 71 proceeds to step SP34.

In step SP33, the control unit 71 controls the phase modulation elements 54R, 54G, 54B on the basis of the information associated with the high beam light distribution pattern PH in the table TB stored in the storage unit 74. Specifically, the control unit 71 outputs a signal based on this information to the drive circuits 60R, 60G, 60B, and the drive circuits 60R, 60G, 60B adjust the voltage applied to the phase modulation elements 54R, 54G, 54B on the basis of the signal input from the control unit 71. This voltage is a voltage that forms a phase modulation pattern in which the light distribution pattern formed by the phase modulation elements 54R, 54G, 54B with the light obtained by synthesizing the light DLR, DLG, DLB is the high beam light distribution pattern PH. Therefore, each of the phase modulation elements 54R, 54G, 54B set a phase modulation pattern in which the light distribution pattern formed by the light obtained by synthesizing the light DLR, DLG, DLB is the high beam light distribution pattern PH. That is, in step SP33, it is understood that each of the phase modulation elements 54R, 54G, 54B sets a phase modulation pattern in which the light distribution pattern formed by the light obtained by synthesizing the light DLR, DLG, DLB is the high beam light distribution pattern PH on the basis of the information associated with the high beam light distribution pattern PH in the table TB.

The control unit 71 controls the light sources 52R, 52G, 52B to emit the laser light from the light sources 52R, 52G, 52B. Specifically, the control unit 71 outputs a signal to the power supply circuits 61R, 61G, 61B, and the power supply circuits 61R, 61G, 61B supply the electric power from the power supply to the light sources 52R, 52G, 52B on the basis of the signal input from the control unit 71. This electric power is a predetermined electric power at which the intensity of the laser light emitted from the light sources 52R, 52G, 52B becomes a predetermined intensity. The light sources 52R, 52G, 52B emit laser light of predetermined intensity when a predetermined electric power is supplied from the power source. The laser light emitted from the light sources 52R, 52G, 52B as described above is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized white light is emitted from the headlight 1. Since the light distribution pattern of the light obtained by synthesizing the light DLR, DLG, DLB is the high beam light distribution pattern PH, the light of the high beam light distribution pattern PH is emitted from the headlight 1.

In step SP33, the control unit 71 simultaneously controls the phase modulation elements 54R, 54G, 54B and the light sources 52R, 52G, 52B, but these controls may be sequentially performed. When these controls are sequentially performed, the order is not particularly limited.

In step SP32, when the detection device 72 inputs the information on the existence of the target object and the existence position of the target object to the control unit 71, the control flow of the control unit 71 proceeds to step SP34 as described above. In step SP34, the control unit 71 selects one light distribution pattern from the light distribution patterns in the table TB on the basis of this information input from the detection device 72. Specifically, the control unit 71 selects one light distribution pattern in which at least a part of the target object detected by the detection device 72 and a darkened specific region in the light distribution pattern overlap from the light distribution patterns in the table TB.

Next, in step SP35, the control unit 71 controls the phase modulation elements 54R, 54G, 54B on the basis of the information associated with the light distribution pattern selected in step SP34 in the table TB. In this case, as similar to step SP33 described above, the phase modulation elements 54R, 54G, 54B set a phase modulation pattern in which the light distribution pattern formed by the light obtained by synthesizing the light DLR, DLG, DLB is the light distribution pattern selected in step SP34. Here, as described above, the light distribution pattern selected in step SP34 is selected on the basis of the information from the detection device 72, and is the light distribution pattern in which a specific region to be darkened overlaps at least a part of the target object. The light distribution pattern in the present embodiment is a light distribution pattern in which a specific region is darkened and a predetermined region different from the specific region is brightened as described above. Accordingly, it is understood that each of the phase modulation elements 54R, 54G, 54B sets a phase modulation pattern in which the light distribution pattern formed by the light obtained by synthesizing the light DLR, DLG, DLB is the light distribution pattern in which a specific region overlapping at least a part of the target object is darkened and a predetermined region different from the specific region is brightened on the basis of the information from the detection device 72.

As similar to step SP33 described above, the control unit 71 controls the light sources 52R, 52G, 52B to emit laser light having a predetermined intensity from the light sources 52R, 52G, 52B. In the present embodiment, the intensity of the laser light is the same as the intensity of the laser light emitted from the light sources 52R, 52G, 52B in step SP33. That is, the electric power supplied from the power source to the light sources 52R, 52G, 52B by the power supply circuits 61R, 61G, 61B is the same as the electric power supplied to the light sources 52R, 52G, 52B in step SP3. The laser light emitted from the light sources 52R, 52G, 52B is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized white light is emitted from the headlight 1. Since the light distribution pattern of the light obtained by synthesizing the light DLR, DLG, DLB is the light distribution pattern selected in step SP34, the light of the light distribution pattern selected in step SP34 is emitted from the headlight 1.

Figure 29A:
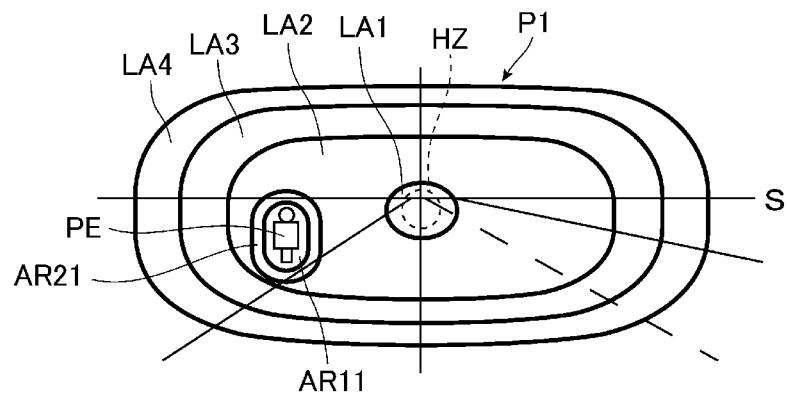
FIG. 29A, FIG. 29B, and FIG. 29C are diagrams showing examples of a state of emitting light of a light distribution pattern in which a target object detected by a detection device and a specific region to be darkened overlaps and a predetermined region different from the specific region is brightened, from a headlight.
Figure 29B:
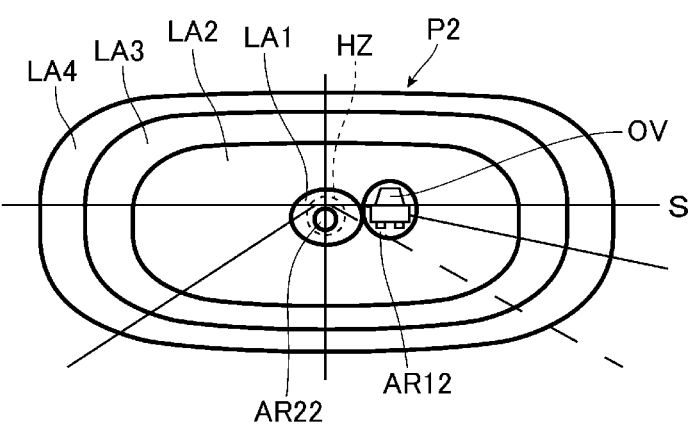
Figure 29C:
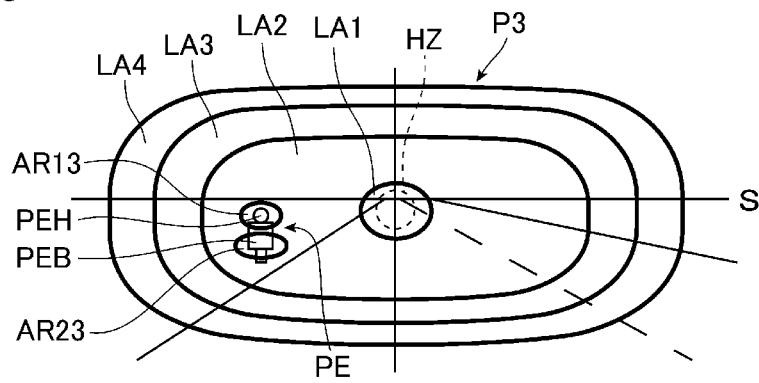

FIG. 29A, FIG. 29B, and FIG. 29C are diagrams showing examples of a state of emitting light of a light distribution pattern in which a target object detected by a detection device and a specific region to be darkened overlaps and a predetermined region different from the specific region is brightened, from a headlight. Specifically, FIG. 29A is a diagram showing an example of a state in which the light of the light distribution pattern when a pedestrian PE is detected as a target object by the detection device 72 is emitted from the headlight 1. FIG. 29B is a diagram showing an example of a state in which the light of the light distribution pattern when an oncoming vehicle OV is detected as a target object by the detection device 72 is emitted from the headlight 1. The light distribution pattern shown in FIG. 29A is the light distribution pattern P1 shown in FIG. 27B, and, as described above, is a light distribution pattern in which a specific region AR11 in the high beam light distribution pattern PH is darkened and a predetermined region AR21 is brightened. In FIG. 29A, the description of the central region AR11a and the edge side region AR11b in the specific region AR11 is omitted. This specific region AR11 overlaps the entire pedestrian PE. Therefore, the total luminous flux amount of the light emitted to the pedestrian PE is reduced as compared to the case where the high beam is emitted from the headlight 1. Further, since the predetermined region AR21 surrounds the specific region AR11 and is in contact with the entire circumference of the edge of the specific region AR11 as described above, the predetermined region AR21 surrounds the pedestrian PE. The light distribution pattern shown in FIG. 29B is the light distribution pattern P2 shown in FIG. 27C, and, as described above, is a light distribution pattern in which a specific region AR12 in the high beam light distribution pattern PH is darkened and a predetermined region AR22 is brightened. This specific region AR12 overlaps the entire oncoming vehicle OV. Therefore, the total luminous flux amount of the light emitted to the oncoming vehicle OV is reduced as compared to the case where the high beam is emitted from the headlight 1. Further, the predetermined region AR21 is located in the hot zone HZ in the light distribution pattern P2 as described above.

Here, in the present embodiment, as described above, the intensity of the laser light emitted from the light sources 52R, 52G, 52B is set to predetermined intensity. Further, the intensity distribution in other regions than the specific region AR11 and the predetermined region AR21 in the light distribution pattern P1 is the same as the intensity distribution in other regions than the specific region AR11 and the predetermined region AR21 in the high beam light distribution pattern PH. Therefore, the total luminous flux amount of light reduced in the specific region AR11 and the total luminous flux amount of light increased in the predetermined region AR21 are substantially the same. As described above, the intensity distribution in other regions than the specific region AR12 and the predetermined region AR22 in the light distribution pattern P2 is the same as the intensity distribution in other regions than the specific region AR12 and the predetermined region AR22 in the high beam light distribution pattern PH. Therefore, the total luminous flux amount of light reduced in the specific region AR12 and the total luminous flux amount of light increased in the predetermined region AR22 are substantially the same.

As described above, FIG. 29A shows a state in which the light of the light distribution pattern P1 in which the entire pedestrian PE overlaps the specific region AR11 is emitted from the headlight 1, and FIG. 29B shows a state in which the light of the light distribution pattern P2 in which the entire oncoming vehicle OV overlaps the specific region AR12 is emitted from the headlight 1. However, the light emitted from the headlight 1 as the second aspect is only required to be light of a light distribution pattern in which at least a part of the target object detected by the detection device 72 overlaps a specific region to be darkened, and a predetermined region different from the specific region is brightened. For example, a specific region to be darkened in the light distribution pattern of the light emitted from the headlight 1 may overlap the entire head of the pedestrian PE, which is the target object, and may overlap a part of the torso of the pedestrian PE. Further, the specific region to be darkened in the light distribution pattern of the light emitted from the headlight 1 may overlap the entire windshield of the oncoming vehicle OV, which is the target object, and may overlap a part of a lower portion from the windshield of the oncoming vehicle OV. That is, in step SP34, the control unit 71 may select a light distribution pattern having such a specific region.

As described above, in step SP31, when the control flow of the control unit 71 proceeds to step SP36 to the control unit 71 without inputting of the signal instructing the light emission from the light switch 73, the control unit 71 controls the light sources 52R, 52G, 52B to not to emit the laser light from the light sources 52R, 52G, 52B. In this case, the power supply circuits 61R, 61G, 61B stop the supply of electric power from the power supply to the light sources 52R, 52G, 52B on the basis of the signal input from the control unit 71. Therefore, the light sources 52R, 52G, 52B do not emit the laser light, and the headlight 1 does not emit the light.

As described above, when the detection device 72 does not detect a predetermined target object located in front of the vehicle, the headlight 1 of the present embodiment emits the light of the high beam light distribution pattern PH. On the other hand, when the detection device 72 detects a predetermined target object located in front of the vehicle, the headlight 1 emits light of the light distribution pattern in which at least a part of the target object overlaps a specific region to be darkened and a predetermined region different from the specific region is brightened.

Here, as described above, in the headlight for vehicle disclosed in Patent Literature 1, Therefore, in this headlight for vehicle, an unintentional change in the brightness of the region irradiated with the light tends to occur when the light distribution pattern of the emitted light is changed. For this reason, the driver may feel uncomfortable, and there is a demand for easier driving.

Therefore, the headlight 1 of the present embodiment as the second aspect includes the lamp unit 20 having the light sources 52R, 52G, 52B that emit laser light and the phase modulation elements 54R, 54G, 54B. The phase modulation element 54R diffracts the laser light emitted from the light source 52R with the phase modulation pattern that is changeable, and emits light of the light distribution pattern based on the phase modulation pattern. The phase modulation element 54G diffracts the laser light emitted from the light source 52G with the phase modulation pattern that is changeable, and emits light of the light distribution pattern based on the phase modulation pattern. The phase modulation element 54B diffracts the laser light emitted from the light source 52B with the phase modulation pattern that is changeable, and emits light of the light distribution pattern based on the phase modulation pattern. In the lamp unit 20, a light distribution pattern is formed by the light obtained by synthesizing the first light DLR emitted from the phase modulation element 54R, the second light DLG emitted from the phase modulation element 54G, and the third light DLB emitted from the phase modulation element 54B. The light of this light distribution pattern is emitted from the lamp unit 20.

Therefore, in the headlight 1 of the present embodiment, by changing each phase modulation pattern in the phase modulation elements 54R, 54G, 54B, the light distribution pattern of the light emitted from the lamp unit 20 can be changed, and the light distribution pattern of the light emitted from the headlight 1 can be changed.

Further, in the headlight 1 of the present embodiment as the second aspect, each of the phase modulation elements 54R, 54G, 54B sets a phase modulation pattern in which the light distribution pattern formed by the light obtained by synthesizing the light DLR, DLG, DLB emitted from the phase modulation elements 54R, 54G, 54B is the light distribution patterns P1, P2 in which specific regions AR11, AR12 overlapping at least a part of the target object is darkened and predetermined regions AR21, AR22 different from the specific regions AR11, AR12 are brightened on the basis of the information from the detection device 72. Therefore, in the headlight 1 of the present embodiment, the light distribution pattern of the emitted light changes according to the situation in front of the vehicle. For example, as shown in FIG. 29A, when the target object detected by the detection device 72 is the pedestrian PE, the total luminous flux amount of the light emitted to the pedestrian PE can be reduced, and it is possible to prevent the pedestrian PE from feeling dazzling due to the light emitted from the headlight 1. Further, as shown in FIG. 29B, when the target object detected by the detection device 72 is the oncoming vehicle OV, the total luminous flux amount of the light emitted to the oncoming vehicle OV can be reduced, and it is possible to prevent the driver of the oncoming vehicle OV from feeling dazzling due to the light emitted from the headlight 1.

Further, in the headlight 1 of the present embodiment as the second aspect, as described above, a phase modulation pattern is set in which the light distribution pattern formed by the light obtained by synthesizing the light DLR, DLG, DLB emitted from the phase modulation elements 54R, 54G, 54B is the light distribution patterns P1, P2 in which specific regions AR11, AR12 overlapping at least a part of the target object is darkened and predetermined regions AR21, AR22 different from the specific regions AR11, AR12 are brightened. Therefore, the headlight 1 of the present embodiment can prevent the regions other than the specific regions AR11, AR12 that are darkened in the light distribution patterns P1, P2 from being unintentionally brightened as a whole. Further, in this headlight 1, by setting predetermined regions AR21, AR22 to be brightened to a specific position, the predetermined regions AR21, AR22 can be made inconspicuous to suppress the driver from feeling uncomfortable, or the predetermined regions AR21, AR22 can be made conspicuous to increase the alerting ability. Therefore, the headlight 1 of the present embodiment can make drive easy.

For example, as shown in FIG. 29A, when the predetermined region AR21 to be brightened is brought into contact with the entire circumference of the edge of the specific region AR11 to be darkened, the predetermined region AR21 surrounds the pedestrian PE, which is the target object detected by the detection device 72. Accordingly, the headlight 1 of the present embodiment can emphasize the existence of the pedestrian PE while reducing the total luminous flux amount of the light emitted to the pedestrian PE. Therefore, the headlight 1 of the present embodiment can increase the alerting ability to the pedestrian PE, as compared to a case where a predetermined region AR21 to be brightened is separated from the specific region AR11. The predetermined region AR21 may surround the specific region AR11 without contacting with the edge of the specific region AR11. From the viewpoint of emphasizing the presence of the target object detected by the detection device 72, it is preferable that the predetermined region to be brightened is in contact with at least a part of the edge of the specific region to be darkened. However, as shown in FIG. 29A, it is more preferable that the predetermined region AR21 is in contact with the entire circumference of the edge of the specific region AR11 to be darkened.

Further, for example, as shown in FIG. 29B, when the predetermined region AR22 to be brightened is located within the hot zone HZ in the light distribution pattern P2, since the hot zone is brighter than other regions than the hot zone, it is possible to suppress the predetermined region AR22 from being remarkably bright in the light distribution pattern P2. Accordingly, the headlight 1 of the present embodiment can suppress the driver from feeling uncomfortable. From the viewpoint of the driver feeling uncomfortable, it is preferable that the predetermined region AR22 to be brightened overlaps at least a part of the hot zone in the light distribution pattern. However, as shown in FIG. 29B, it is more preferable that the predetermined region AR22 is located in the hot zone HZ in the light distribution pattern P2.

Further, in the present embodiment as the second aspect, in the light distribution pattern P1 in which the specific region AR11 in the high beam light distribution pattern PH is darkened, the central region AR11*a* of the specific region AR11 is darker than the edge side region AR11*b*. Therefore, while reducing the total luminous flux amount of the light emitted to the pedestrian PE, which is the target object, it is possible to prevent the pedestrian PE from becoming difficult to view.

Further, in the present embodiment as the second aspect, the total luminous flux amount of light reduced in the specific region AR11 to be darkened and the total luminous flux amount of light increased in the predetermined region AR21 to be brightened are substantially the same. Further, the total luminous flux amount of light reduced in the specific region AR12 to be darkened and the total luminous flux amount of light increased in the predetermined region AR22 to be brightened are substantially the same. Therefore, the specific regions AR11, AR12 can be darkened and the predetermined regions AR21, AR22 can be brightened without changing the intensity of the laser light emitted from the light sources 52R, 52G, 52B. Therefore, the headlight 1 of the present embodiment can be operated by simple control as compared to the case where the intensity of the laser light emitted from the light sources 52R, 52G, 52B is changed.

When the target object detected by the detection device 72 is a human, for example, the specific region to be darkened and the predetermined region to be brightened may be a region as shown in FIG. 29C. FIG. 29C is a diagram showing another example of a state in which the light of the light distribution pattern when a pedestrian PE is detected as a target object by the detection device is emitted from the headlight 1. In the light distribution pattern P3 shown in FIG. 29C, a specific region AR13 to be darkened is a region overlapping the entire head PEH of the pedestrian PE, and a predetermined region AR23 to be brightened is a region overlapping a part of the torso PEB of the pedestrian PE. That is, in step SP34, the control unit 71 selects such a light distribution pattern P3. In this case, it is possible to suppress the pedestrian PE located in front of the vehicle from feeling dazzling due to the light emitted from the headlight 1, and it is possible to emphasize the torso PEB of the pedestrian PE. Accordingly, such a headlight can increase the alerting ability to the pedestrian PE located in front of the vehicle, as compared to a case where a predetermined region to be brightened is not a region overlapping at least a part of the torso PEB of the pedestrian PE. The specific region AR13 to be darkened may be a region overlapping at least a part of the head PEH of the pedestrian PE. However, from the viewpoint of suppressing the pedestrian PE from feeling dazzling due to the light emitted from the headlight 1, it is preferable that the specific region AR13 to be darkened is a region overlapping the entire head PEH of the pedestrian PE. Further, from the viewpoint of increasing the alerting ability to the pedestrian PE, it is more preferable that the predetermined region AR23 is in contact with at least a part of the edge of the specific region AR13.

In the seventh embodiment as the second aspect, when the detection device 72 does not detect the target object, the headlight 1 emits the light of the high beam light distribution pattern PH, and when the detection device 72 detects the target object, the headlight 1 emits light of the light distribution patterns P1, P2, P3 in which the specific regions AR11, AR12, AR13 overlapping at least a part of the target object in the high beam light distribution pattern PH are darkened, and the predetermined regions AR21, AR22, AR23 different from the specific regions are brightened. However, when the detection device 72 detects the target object, the headlight for vehicle as the second aspect is only required to emit light of a light distribution pattern in which a specific region overlapping at least a part of the target object is darkened and a predetermined region different from the specific region is brightened. For example, when the detection device 72 does not detect the target object, the headlight 1 as the second aspect may emit light having a low beam light distribution pattern, and when the detection device 72 detects the target object, the headlight 1 as the second aspect may emit light of a light distribution pattern in which a specific region overlapping at least a part of the target object is darkened and a predetermined region different from the specific region is brightened in the low beam light distribution pattern.

Figure 30:
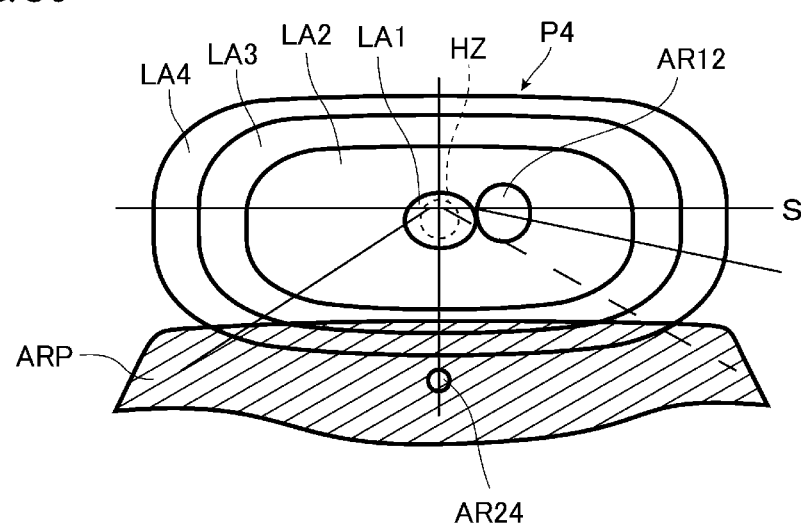
FIG. 30 is a diagram showing a light distribution pattern in a modification as the second aspect of the present invention.

Further, in the headlight for vehicle as the second aspect, the predetermined region to be brightened may be a region not overlapping the light distribution pattern before the predetermined position is brightened. For example, the predetermined region to be brightened may overlap at least a part of the region where the driver's view of the vehicle is obstructed by the vehicle. FIG. 30 is a diagram showing a light distribution pattern in such a modification.

As shown in FIG. 30, a light distribution pattern P4 is different from the light distribution pattern P2 shown in FIG. 27C in that the position of a predetermined region to be brightened is different. In the light distribution pattern P4, a predetermined region AR24 to be brightened is located in the region ARP where the driver's view of the vehicle is obstructed by the vehicle. In FIG. 30, the region ARP is hatched diagonally. This region ARP is a region in which the driver's view is obstructed by, for example, the hood of a vehicle, and a part thereof is shown in FIG. 30. By setting the position of the predetermined region AR24 to be brightened as described above, the driver does not visually recognize the predetermined region AR24 to be brightened, and the driver can be prevented from feeling uncomfortable.

In the headlight for vehicle as the second aspect, when the target object detected by the detection device 72 includes a sign, the predetermined region to be brightened may overlap at least a part of the sign detected by the detection device 72. Thereby, the presence of the sign detected by the detection device 72 can be emphasized.

In the seventh embodiment as the second aspect, the phase modulation elements 54R, 54G, 54B, 54S are LCOS which is a reflection type phase modulation element. However, the phase modulation element is only required to be able to diffract the incident light with a changeable phase modulation pattern and emit the light of the light distribution pattern based on the phase modulation pattern. For example, the phase modulation element may be a transmissive phase modulation element, or may be a GLV in which a plurality of reflectors are formed on a silicon substrate.

Further, the headlight for vehicle as the second aspect may have the same configuration as the headlight 1 as the first aspect shown in FIG. 22. That is, the optical system unit 50 may include one phase modulation element 54S instead of the three phase modulation elements 54R, 54G, 54B. In this case, pieces of laser light having different wavelengths emitted from these light sources 52R, 52G, 52B are sequentially incident on the phase modulation element 54S. Further, the phase modulation element 54S changes the phase modulation pattern in synchronization with the switching of the laser light emission for each of the light sources 52R, 52G, 52B as described above, thereby emitting the first light DLR, the second light DLG, and the third light DLB in sequence. Then, in this headlight 1, a predetermined light distribution pattern is formed by synthesizing these pieces of light DLR, DLG, DLB due to the afterimage phenomenon. When the afterimage phenomenon is used as described above, it is sufficient that at least two light emitting optical systems share the phase modulation element 54S. In this case, the light emitted from the light emitting optical system sharing the phase modulation element is synthesized by an afterimage phenomenon, and the light synthesized by this afterimage phenomenon and the light emitted from another light emitting optical system are synthesized to form a predetermined light distribution pattern.

Further, the headlight for vehicle as the second aspect may have the same configuration as the headlight 1 as the first aspect shown in FIG. 23. That is, the optical system unit 50 may not include the synthesizing optical system 55, and may have a configuration in which light is emitted from the cover 59 in a state where the pieces of light emitted from the first light emitting optical system 51R, the second light emitting optical system 51G, and the third light emitting optical system 51B are not synthesized. In this case, the first light DLR, the second light DLG, and the third light DLB are applied so that regions irradiated with the respective pieces of light overlap with each other at the focal position separated by a predetermined distance from the vehicle.

Furthermore, in the seventh embodiment as the second aspect, the first optical element 55f transmits the first light DLR and reflects the second light DLG to synthesize the first light DLR and the second light DLG, and the second optical element 55s transmits the first light DLR and the second light DLG synthesized by the first optical element 55f and reflects the third light DLB to synthesize the first light DLR, the second light DLG, and the third light DLB. However, for example, a configuration may be adopted in which the third light DLB and the second light DLG are synthesized in the first optical element 55f, and the third light DLB and the second light DLG synthesized by the first optical element 55f and the first light DLR are synthesized in the second optical element 55s. In this case, in the seventh embodiment, the positions of the first light emitting optical system 51R including the light source 52R, the collimator lens 53R, and the phase modulation element 54R is switched with the position of the third light emitting optical system 51B including the light source 52B, the collimator lens 53B, and the phase modulation element 54B. Furthermore, in the seventh embodiment, a bandpass filter that transmits light having a predetermined wavelength band and reflects light having other wavelength bands may be used for the first optical element 55f or the second optical element 55s. Further, in the seventh embodiment as the second aspect, the synthesizing optical system 55 only needs to synthesize pieces of light emitted from the respective light emitting optical systems, and the synthesizing optical system 55 is not limited to the configuration of the above seventh embodiment or the above-described configuration.

Further, in the seventh embodiment and the modification as the second aspect, the phase modulation elements 54R, 54G, 54B, 54S having a plurality of modulation units have been described as an example. However, the number, size, outer shape, and the like of the modulation units are not particularly limited. For example, the phase modulation element may have one modulation unit, and the incident light may be diffracted by this one modulation unit.

Further, in the seventh embodiment as the second aspect, the optical system unit 50 including three light sources 52R, 52G, 52B and three phase modulation elements 54R, 54G, 54B respectively corresponding to the light sources 52R, 52G, 52B has been described as an example. However, the three phase modulation elements 54R, 54G, 54B may be integrally formed. Examples of a configuration of such a phase modulation element include a configuration in which the phase modulation element is divided into a region corresponding to the light source 52R, a region corresponding to the light source 52G, and a region corresponding to the light source 52B. In such a configuration, the laser light emitted from the light source 52R is incident on the region corresponding to the light source 52R, the laser light emitted from the light source 52G is incident on the region corresponding to the light source 52G, and the laser light emitted from the light source 52B is incident on the region corresponding to the light source 52B. The phase modulation pattern in the region corresponding to the light source 52R is the phase modulation pattern corresponding to the laser light emitted from the light source 52R, and the phase modulation pattern in the region corresponding to the light source 52G is the phase modulation pattern corresponding to the laser light emitted from the light source 52G, and the phase modulation pattern in the region corresponding to the light source 52B is the phase modulation pattern corresponding to the laser light emitted from the light source 52B.

According to such a headlight 1, since the three phase modulation elements 54R, 54G, 54B are integrally formed, the number of parts can be reduced.

Further, in the seventh embodiment as the second aspect, the intensity of the laser light emitted from the light sources 52R, 52G, 52B is constant. However, the intensity of the laser light emitted from the light sources 52R, 52G, 52B may be adjusted according to the light distribution pattern of the light emitted from the headlight 1. In such a case, for example, a table is stored in the storage unit 74. In the table, for each light distribution pattern, the phase modulation pattern in the phase modulation elements 54R, 54G, 54B when forming the light distribution pattern and the intensity of the laser light emitted from the light sources 52R, 52G, 52B when forming the light distribution pattern are associated. Then, in steps SP3 and SP5 described above, the control unit 71 controls the light sources 52R, 52G, 52B on the basis of the information associated with this table. Specifically, the control unit 71 outputs a signal based on this information to the power supply circuits 61R, 61G, 61B, and the power supply circuits 61R, 61G, 61B adjust the power supplied from the power supply to the light sources 52R, 52G, 52B on the basis of the signal input from the control unit 71. With such a configuration, the total luminous flux amount of light in a predetermined region to be brightened can be adjusted. For this reason, as compared to the case where the intensity of the laser light emitted from the light sources 52R, 52G, 52B is not adjusted, the predetermined region to be brightened can be made inconspicuous to suppress the driver from feeling uncomfortable, or the predetermined region can be made conspicuous to increase the alerting ability.

Figure 31A:
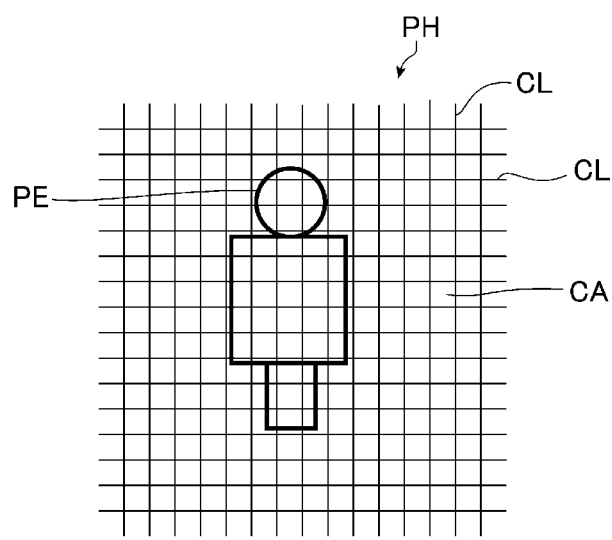
FIG. 31A and FIG. 31B are diagrams for explaining information related to intensity distribution of a light distribution pattern in another modification as the second aspect of the present invention.
Figure 31B:
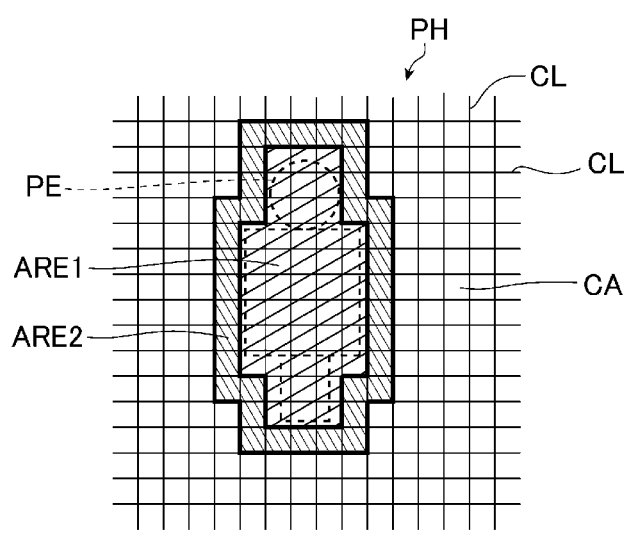

Further, in the seventh embodiment as the second aspect, the headlight 1 that emits the light of one of the light distribution patterns in the table TB has been described as an example. However, the headlight 1 may emit light of a light distribution pattern different from the light distribution pattern in the table TB. For example, the control unit 71 in the first embodiment may operate the phase modulation pattern in the phase modulation elements 54R, 54G, 54B for forming the light distribution pattern of the light emitted from the headlight 1. Specifically, the control unit 71 may operate the phase modulation pattern in the phase modulation elements 54R, 54G, 54B for forming the light distribution pattern in which a region overlapping a part of the target object is darkened and a region different from that region is brightened, on the basis of the information stored in the storage unit 74, the information on the existence of the target object and the existence position of the target object input from the detection device 72, and the like. In this case, the storage unit 74 stores, for example, information on the phase modulation pattern in the phase modulation elements 54R, 54G, 54B when forming the high beam light distribution pattern PH, and a table related to the intensity distribution of the high beam light distribution pattern PH. FIG. 31A and FIG. 31B are diagrams for explaining information related to intensity distribution of a light distribution pattern in modification as described above. Specifically, FIG. 31A is an enlarged view of a part of the high beam light distribution pattern PH, and an enlarged view of the overlapping portion of the high beam light distribution pattern PH and the pedestrian PE. In FIG. 31A, the pedestrian PE is shown by a thick line and a plurality of compartment lines CL are shown. Note that the same or equivalent constituent elements as those of the first embodiment are denoted by the same reference numerals, and redundant explanation will be omitted except when particularly described.

As shown in FIG. 31A, the high beam light distribution pattern PH of the present modification is formed by an aggregate of compartment regions CA partitioned at substantially equal intervals in the vertical and horizontal directions by the compartment lines CL. The address and light intensity are preset for each compartment region. The address is represented, for example, by the row number and column number where the compartment region CA is located. The width of the compartment region CA in the vertical direction is represented by the width corresponding to the vertical angle with respect to the headlight 1, and the width of the compartment region CA in the left-right direction is represented by the width corresponding to the horizontal angle with respect to the headlight 1. Each of these widths is set to a width corresponding to, for example, 0.1 degrees.

In the table TB2 related to the intensity distribution of the high beam light distribution pattern in the present modification, the address of the compartment region CA and the total luminous flux amount as the light intensity in the compartment region CA are associated with each other as similar to the table TB2 shown in FIG. 25B.

The control unit 71 of the present modification extracts the compartment region CA overlapping at least a part of the target object on the basis of the information on the existence of the target object and the existence position of the target object input from the detection device 72. FIG. 31B is a diagram showing a compartment region to be extracted. As shown in FIG. 31B, for example, all compartment regions CA overlapping the pedestrian PE may be extracted. In FIG. 31B, the pedestrian PE is indicated by a broken line, the extracted compartment region CA is referred to as a first extraction region ARE1, and the first extraction region ARE1 is diagonally hatched. The control unit 71 of the modification extracts the compartment region CA different from the extracted first extraction region ARE1. As shown in FIG. 31B, for example, all compartment regions CA in contact with the outer peripheral edge of the first extraction region ARE1 may be extracted. In FIG. 31B, the extracted compartment region CA is referred to as a second extraction region ARE2, and the second extraction region ARE2 is diagonally hatched differently from the first extraction region ARE1.

The control unit 71 operates a phase modulation pattern in the phase modulation elements 54R, 54G, 54B in which the light distribution pattern formed by the light obtained by synthesizing the light DLR, DLG, DLB emitted from the phase modulation elements 54R, 54G, 54B is the light distribution pattern in which the first extraction region ARE1 is darkened and the second extraction region ARE2 is brightened. The total luminous flux amount of the light in each of the compartment regions CA of the extracted first extraction region ARE1 in the formed light distribution pattern is, for example, the same predetermined value. Specifically, the control unit 71 operates the amount of decrease in the total luminous flux amount of light in the entire first extraction region ARE1 on the basis of the above-described another table TB2 and the predetermined value. Next, the control unit 71 operates the amount of increase in the total luminous flux amount of light in each of the compartment regions CA of the second extraction region ARE2 so that the amount of decrease in the total luminous flux amount and the amount of increase in the total luminous flux amount in the entire second extraction region ARE2 are the same. The amount of increase in the total luminous flux amount of light in each of the compartment regions CA of the second extraction region ARE2 is, for example, the same. As described above, the control unit 71 operates the total luminous flux amount of the light in each of the compartment regions CA of the first extraction region ARE1 and the second extraction region ARE2, and controls the phase modulation elements 54R, 54G, 54B on the basis of the operation result. That is, it is understood that each of the phase modulation elements 54R, 54G, 54B sets a phase modulation pattern in which the light distribution pattern formed by the light obtained by synthesizing the light DLR, DLG, DLB is the light distribution pattern in which the first extraction region ARE1 is darkened and the second extraction region ARE2 is brightened. The control unit 71 controls the light sources 52R, 52G, 52B to emit the laser light of predetermined intensity from the light sources 52R, 52G, 52B. As described above, the first extraction region ARE1 overlaps at least a part of the target object, and the second extraction region ARE2 is different from the first extraction region ARE1. Therefore, the light distribution pattern of the light emitted from the lamp unit 20 is a light distribution pattern in which the region overlapping with at least a part of the target object is darkened and a region different from the darkened region is brightened. In this headlight 1, as described above, the total luminous flux amount of light is increased in the second extraction region ARE2 by the amount that the total luminous flux amount of light is reduced in the first extraction region ARE1. Therefore, this headlight 1 can prevent the compartment regions CA other than the first extraction region ARE1 from being unintentionally brightened as a whole. Further, in this headlight 1, by setting the second extraction region ARE2 to a specific position, the second extraction region ARE2 can be made inconspicuous to suppress the driver from feeling uncomfortable, or the second extraction region ARE2 can be made conspicuous to increase the alerting ability.

Further, in the seventh embodiment as the second aspect, the lamp unit 20 does not include an imaging lens system including an imaging lens. However, the lamp unit may include an imaging lens system, and the light emitted from the optical system unit 50 may be emitted through the imaging lens system. With such a configuration, it is possible to easily make the light distribution pattern of the emitted light a larger light distribution pattern. The term "larger" here means larger when the light distribution pattern formed on the vertical surface at a predetermined distance from the vehicle is compared.

Further, in the seventh embodiment as the second aspect, the optical system unit 50 including three light sources 52R, 52G, 52B and three phase modulation elements 54R, 54G, 54B respectively corresponding to the light sources 52R, 52G, 52B has been described as an example. However, the optical system unit is only required to include at least one light source and a phase modulation element corresponding to this light source. For example, the optical system unit may include a light source that emits white laser light and a phase modulation element that diffracts and emits white laser light emitted from this light source.

Eighth Embodiment

Next, an eighth embodiment as a third aspect of the present invention will be described. Note that the same or equivalent constituent elements as those of the first embodiment described above are denoted by the same reference numerals, and redundant explanation will be omitted except when particularly described. Although the configuration of the headlight 1 in the present embodiment is the same as the configuration of the headlight 1 in the first embodiment, the light distribution pattern of the light emitted by the headlight 1 of the present embodiment is different from the light distribution pattern of the light emitted by the headlight 1 of the first embodiment.

In the present embodiment, each phase modulation pattern in the phase modulation elements 54R, 54G, 54B is a phase modulation pattern in which a desired light distribution pattern is formed by light obtained by synthesizing by the synthesizing optical system 55 the first light DLR emitted from the phase modulation element 54R, the second light DLG emitted from the phase modulation element 54G, and the third light DLB emitted from the phase modulation element 54B. The intensity distribution and the color distribution are also included in the desired light distribution patterns. Therefore, in the present embodiment, when a specific light distribution pattern is formed by the light obtained by synthesizing the light DLR, DLG, DLB emitted from the phase modulation elements 54R, 54G, 54B, each piece of the light DLR, DLG, DLB overlaps with this specific light distribution pattern and has intensity distribution based on the intensity distribution and the color distribution of this specific light distribution pattern. The phase modulation elements 54R, 54G 54B have wavelength dependence. Therefore, in the present embodiment, even when the color of the light distribution pattern formed by the light obtained by synthesizing the light DLR, DLG, DLB is white, the respective phase modulation patterns of the phase modulation elements 54R, 54G, 54B are different from each other. Note that, as a result of forming a light distribution pattern by the light obtained by synthesizing the light DLR, DLG, DLB emitted from the phase modulation elements 54R, 54G, 54B, the phase modulation patterns in these phase modulation elements 54R, 54G, 54B may be the same phase modulation pattern.

In the present embodiment, as shown in FIG. 32, a table TB is stored in the storage unit 74. In the table, for each light distribution pattern, the phase modulation pattern in the phase modulation elements 54R, 54G, 54B when forming the light distribution pattern, the intensity of the laser light emitted from the light sources 52R, 52G, 52B when forming the light distribution pattern, and the target object detected by the detection device 72 are associated.

Figure 33A:
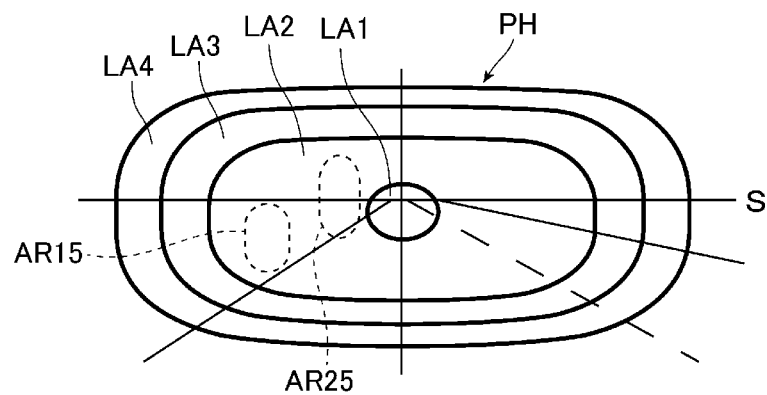
FIG. 33A, FIG. 33B, and FIG. 33C are diagrams showing examples of a light distribution pattern in the eighth embodiment as the third aspect of the present invention.
Figure 33B:
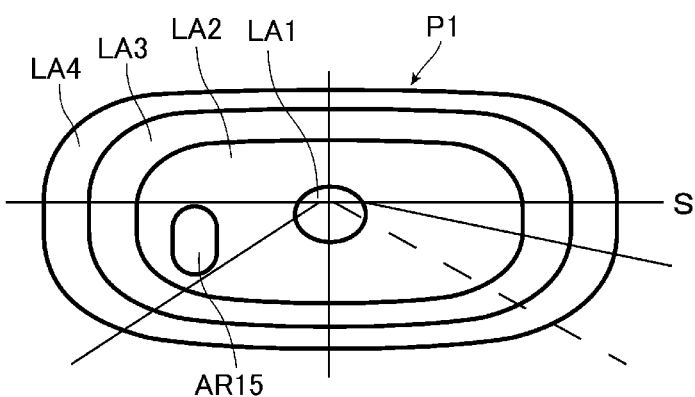
Figure 33C:
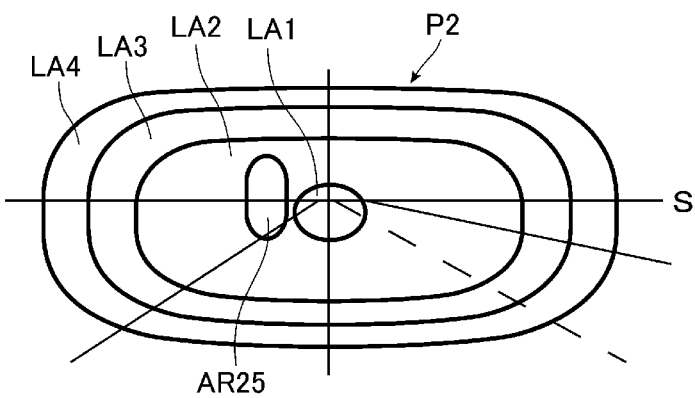

FIG. 33A, FIG. 33B, and FIG. 33C are diagrams showing examples of a light distribution pattern in the present embodiment. Specifically, FIG. 33A is a diagram showing a high beam light distribution pattern. FIG. 33B is a diagram showing a light distribution pattern in which the color of a specific region in the high beam light distribution pattern is different from the color of the other regions than the specific region. FIG. 33C is a diagram showing a light distribution pattern in which the color of another specific region in the high beam light distribution pattern is different from the color of the other regions than the other specific region. In FIGS. 33A, 33B, and 33C, S indicates a horizontal line, the light distribution pattern is indicated by a thick line, and this light distribution pattern is a light distribution pattern formed on a vertical plane 25 m away from the vehicle.

The color of the high beam light distribution pattern PH shown in FIG. 33A is white. In this high beam light distribution pattern PH, a region LA1 is the region having the highest intensity, and regions LA2, LA3, and LA4 have lower intensities in this order. That is, the phase modulation pattern in each of the phase modulation elements 54R, 54G, 54B is a phase modulation pattern in which the synthesized light forms a light distribution pattern including the intensity distribution of the high beam.

The light distribution pattern P1 shown in FIG. 33B is a light distribution pattern in which the color of a specific region AR15 in the high beam light distribution pattern PH is different from white which is the color of the specific region AR15. In the present embodiment, the color of the specific region AR15 in the light distribution pattern P1 is blue. Further, the intensity of the red light in the specific region AR15 in the light distribution pattern P1 is lower than the intensity of the red light in the specific region AR15 in the high beam light distribution pattern PH, the intensity of the green light in the specific region AR15 in the light distribution pattern P1 is lower than the intensity of the green light of the specific region AR15 in the high beam light distribution pattern PH, and the intensity of the blue light of the specific region AR15 in the light distribution pattern P1 is substantially the same as the intensity of the blue light in the specific region AR15 in the high beam light distribution pattern PH. Therefore, the light intensity of the specific region AR15 in the light distribution pattern P1 is lower than the light intensity of the specific region AR15 in the high beam light distribution pattern PH, and the total luminous flux amount of the light in the specific region AR15 in the light distribution pattern P1 is smaller than the total luminous flux amount of the light in the specific region AR15 in the high beam light distribution pattern PH. Further, the color and intensity distribution in the light distribution pattern P1 other than the specific region AR15 is the same as the color and intensity distribution in the high beam light distribution pattern PH other than the specific region AR15. Here, if the color and intensity of light at a plurality of reference points are the same, it can be estimated that the color and intensity distribution are also the same. Note that, in FIG. 33A, the specific region AR15 in the high beam light distribution pattern PH is indicated by a broken line. In the present embodiment, the specific region AR15 of the light distribution pattern P1 is located within the region LA2.

The light distribution pattern P2 shown in FIG. 33C is a light distribution pattern in which the color of another specific region AR25 different from the specific region AR15 in the high beam light distribution pattern PH is different from white which is the color of the specific region AR25. In the present embodiment, the color of the specific region AR25 in the light distribution pattern P2 is a color in which yellow is stronger than the color other than the specific region AR25. Further, the intensity of the red light in the specific region AR25 in the light distribution pattern P2 is higher than the intensity of the red light in the specific region AR15 in the high beam light distribution pattern PH, the intensity of the green light in the specific region AR25 in the light distribution pattern P2 is higher than the intensity of the green light of the specific region AR25 in the high beam light distribution pattern PH, and the intensity of the blue light of the specific region AR15 in the light distribution pattern P1 is substantially the same as the intensity of the blue light in the specific region AR15 in the high beam light distribution pattern PH. Therefore, the light intensity of the specific region AR25 in the light distribution pattern P2 is higher than the light intensity of the specific region AR25 in the high beam light distribution pattern PH, and the total luminous flux amount of the light in the specific region AR25 in the light distribution pattern P2 is larger than the total luminous flux amount of the light in the specific region AR25 in the high beam light distribution pattern PH. Further, the intensity distribution in the light distribution pattern P2 other than the specific region AR25 is the same as the intensity distribution in the high beam light distribution pattern PH other than the specific region AR25. Note that, in FIG. 33A, the specific region AR25 in the high beam light distribution pattern PH is indicated by a broken line. In the present embodiment, the specific region AR25 of the light distribution pattern P2 is located within the region LA2.

As described above, the light distribution pattern of the light emitted from the headlight 1 in the present embodiment is the high beam light distribution pattern PH or the light distribution patterns P1, P2 in which the color of the specific regions AR15, AR25 in the high beam light distribution pattern PH is different from the color of other regions than the specific regions AR15, AR25.

Note that the colors, positions, shapes, numbers, and sizes of the specific regions AR15, AR25 in the light distribution patterns P1, P2 are not particularly limited. Further, the number of light distribution patterns P1, P2 in which the color of the specific regions AR15, AR25 in the high beam light distribution pattern PH is different from the color of other regions than the specific regions AR15, AR25 is not limited. Further, the light intensity of the specific regions AR15, AR25 in the light distribution patterns P1, P2 is not particularly limited. For example, the intensity of red light and the intensity of green light in the specific region AR15 to be blue may be zero, and the intensity of blue light may be higher than the blue light of the specific region AR15 in the high beam light distribution pattern PH. Further, the intensity of red light in the specific region AR25, which is a color in which yellow is strong, may be the same as the intensity of red light in the specific region AR25 in the high beam light distribution pattern PH, and the intensity of green light in the specific region AR25 may be the same as the intensity of the green light in the specific region AR25 in the high beam light distribution pattern PH. In this case, the intensity of the blue light in the specific region AR25 is lower than the intensity of the blue light in the specific region AR25 in the high beam light distribution pattern PH. Further, the intensity of light in the specific regions AR15, AR25 may be substantially constant throughout the specific regions AR15, AR25, and the intensity of light in the specific regions AR15, AR25 may change according to the position in the specific regions AR15, AR25. Further, the intensity distribution in the light distribution patterns P1, P2 other than the specific regions AR15, AR25 may be different from the intensity distribution in the high beam light distribution pattern PH other than the specific regions AR15, AR25. Further, the outer shape of the light distribution patterns P1, P2 may be different from the outer shape of the high beam light distribution pattern PH.

Next, the operation of the headlight 1 of the present embodiment will be described. Specifically, operation of changing the light distribution pattern of the light emitted according to the situation in front of the vehicle from the high beam light distribution pattern PH to another light distribution pattern will be described. The control flowchart of the control unit 71 of the present embodiment is the same as the control flowchart of the control unit 71 of the first embodiment in the first aspect shown in FIG. 8. Therefore, description will be made with reference to FIG. 8.

First, in step SP1, when the light switch 73 is turned on and a signal instructing the emission of light from the light switch 73 is input to the control unit 71, the control flow of the control unit 71 proceeds to step SP2. On the other hand, in step SP1, when this signal is not input to the control unit 71, the control flow of the control unit 71 proceeds to step SP8.

In step SP2, when the detection device 72 does not detect a predetermined target object located in front of the vehicle and the detection device 72 does not input the information on the existence of the target object and the existence position of the target object to the control unit 71, the control flow of the control unit 71 proceeds to step SP3. On the other hand, in step SP2, when this information is input to the control unit 71, the control flow of the control unit 71 proceeds to step SP5.

In step SP3, the control unit 71 controls the phase modulation elements 54R, 54G, 54B on the basis of the information associated with the high beam light distribution pattern PH in the table TB stored in the storage unit 74. Specifically, the control unit 71 outputs a signal based on this information to the drive circuits 60R, 60G, 60B, and the drive circuits 60R, 60G, 60B adjust the voltage applied to the phase modulation elements 54R, 54G, 54B on the basis of the signal input from the control unit 71. This voltage is a voltage that forms a phase modulation pattern in which the light distribution pattern formed by the phase modulation elements 54R, 54G, 54B with the light obtained by synthesizing the light DLR, DLG, DLB is the high beam light distribution pattern PH. Therefore, each of the phase modulation elements 54R, 54G, 54B set a phase modulation pattern in which the light distribution pattern formed by the light obtained by synthesizing the light DLR, DLG, DLB is the high beam light distribution pattern PH. That is, in step SP3, it is understood that each of the phase modulation elements 54R, 54G, 54B sets a phase modulation pattern in which the light distribution pattern formed by the light obtained by synthesizing the light DLR, DLG, DLB is the high beam light distribution pattern PH on the basis of the information associated with the high beam light distribution pattern PH in the table TB.

Next, in step SP4, the control unit 71 controls the light sources 52R, 52G, 52B on the basis of the information associated with the high beam light distribution pattern PH in the table TB. Specifically, the control unit 71 outputs a signal based on this information to the power supply circuits 61R, 61G, 61B, and the power supply circuits 61R, 61G, 61B adjust the power supplied from the power supply to the light sources 52R, 52G, 52B on the basis of the signal input from the control unit 71. This power is defined as the power at which the intensity of the laser light emitted from the light sources 52R, 52G, 52B is the intensity associated with the high beam light distribution pattern PH in the table TB. Therefore, in step SP4, the light sources 52R, 52G, 52B emit the laser light of the intensity associated with the high beam light distribution pattern PH in the table TB. The laser light emitted from the light sources 52R, 52G, 52B whose intensity is adjusted as described above is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized light is emitted from the headlight 1. Since the light distribution pattern of the light obtained by synthesizing the light DLR, DLG, DLB is the high beam light distribution pattern PH, the light of the high beam light distribution pattern PH is emitted from the headlight 1.

By the way, as described above, the intensity of the laser light emitted from the light sources 52R, 52G, 52B is the intensity associated with the high beam light distribution pattern PH. Therefore, the total luminous flux amount of each laser light emitted from the light sources 52R, 52G, 52B is the total luminous flux amount according to the high beam light distribution pattern PH. The first light DLR caused by the laser light emitted from the light source 52R is emitted from the first light emitting optical system 51R, the second light DLG caused by the laser light emitted from the light source 52G is emitted from the second light emitting optical system 51G, and the third light DLB caused by the laser light emitted from the light source 52B is emitted from the third light emitting optical system 51B. Accordingly, each total luminous flux amount of the light DLR, DLG, DLB emitted from the light emitting optical systems 51R, 51G, 51B is adjusted to the total luminous flux amount according to the high beam light distribution pattern PH.

Note that, in step SP2, when the detection device 72 does not input the information on the existence of the target object and the existence position of the target object to the control unit 71, the control unit 71 may perform control in step SP3 and step SP4 at the same time. Further, the control flow of the control unit 71 may proceed in the order of step SP4 and step SP3, and may return to step SP1.

In step SP2, when the detection device 72 inputs the information on the existence of the target object and the existence position of the target object to the control unit 71, the control flow of the control unit 71 proceeds to step SP5 as described above. In step SP5, the control unit 71 selects one light distribution pattern from the light distribution patterns in the table TB on the basis of this information input from the detection device 72. Specifically, the control unit 71 selects, from the light distribution patterns in the table TB, one light distribution pattern in which at least a part of the target object detected by the detection device 72 and a specific region in the light distribution pattern overlap and the color of the specific region is a color corresponding to the detected target object.

Next, in step SP6, the control unit 71 controls the phase modulation elements 54R, 54G, 54B on the basis of the information associated with the light distribution pattern selected in step SP5 in the table TB. In this case, as similar to step SP3 described above, the phase modulation elements 54R, 54G, 54B set a phase modulation pattern in which the light distribution pattern formed by the light obtained by synthesizing the light DLR, DLG, DLB is the light distribution pattern selected in step SP5. Here, as described above, the light distribution pattern selected in step SP5 is selected on the basis of the information from the detection device 72, and is the light distribution pattern in which a specific region overlaps at least a part of the target object and the color of the specific region is a color corresponding to the target object. Accordingly, it is understood that, on the basis of the information from the detection device 72, each of the phase modulation elements 54R, 54G, 54B sets a phase modulation pattern in which a light distribution pattern in which the color of a specific region overlapping at least a part of the target object in the high beam light distribution pattern PH is different from white which is a color of other regions than the specific region is formed by the light obtained by synthesizing the light DLR, DLG, DLB. This color of the specific region is a color corresponding to the target object.

Next, in step SP7, the control unit 71 controls the light sources 52R, 52G, 52B on the basis of the information associated with the light distribution pattern selected in step SP5 in the table TB. In this case, as similar to step SP4 described above, the light sources 52R, 52G, 52B emit laser light of the intensity associated with the light distribution pattern selected in step SP5 in the table TB. The laser light emitted from the light sources 52R, 52G, 52B whose intensity is adjusted as described above is incident on the corresponding phase modulation elements 54R, 54G, 54B, and the light DLR, DLG, DLB is emitted from the phase modulation elements 54R, 54G, 54B. These pieces of light DLR, DLG, DLB are synthesized by the synthesizing optical system 55, and the synthesized light is emitted from the headlight 1. Since the light distribution pattern of the light obtained by synthesizing the light DLR, DLG, DLB is the light distribution pattern selected in step SP5, the light of the light distribution pattern selected in step SP5 is emitted from the headlight 1.

By the way, as described above, the intensity of the laser light emitted from the light sources 52R, 52G, 52B is the intensity associated with the light distribution pattern selected in step SP5 in the table TB. Therefore, the total luminous flux amount of each laser light emitted from the light sources 52R, 52G, 52B is the total luminous flux amount according to the light distribution pattern selected in step SP5. The first light DLR caused by the laser light emitted from the light source 52R is emitted from the first light emitting optical system 51R, the second light DLG caused by the laser light emitted from the light source 52G is emitted from the second light emitting optical system 51G, and the third light DLB caused by the laser light emitted from the light source 52B is emitted from the third light emitting optical system 51B. Accordingly, each total luminous flux amount of the light DLR, DLG, DLB emitted from the light emitting optical systems 51R, 51G, 51B is adjusted to the total luminous flux amount according to the light distribution pattern selected in step SP5.

In the present embodiment, each intensity of the laser light emitted from the light sources 52R, 52G, 52B associated with the light distribution pattern in the table TB is intensity that changes according to the color of a specific region in each light distribution pattern on the basis of the intensity when the light of the high beam light distribution pattern PH is emitted. When the color of a specific region in the light distribution pattern is blue, for example, the intensity of the laser light emitted from the light source 52R and the intensity of the laser light emitted from the light source 52G are reduced, and the intensity of the laser light emitted from the light source 52B is not changed. When the color of a specific region in the light distribution pattern is a color in which yellow is stronger than the color of other regions than the specific region, for example, the intensity of the laser light emitted from the light source 52R and the intensity of the laser light emitted from the light source 52G are increased, and the intensity of the laser light emitted from the light source 52B is not changed. It is preferable that each intensity of the laser light emitted from the light sources 52R, 52G, 52B is intensity corresponding to the intensity of the red light, the green light, and the blue light in a specific region in the light distribution pattern. That is, it is preferable that the intensity of the laser light corresponding to the light whose intensity in the specific region is increased is increased, and the intensity of the laser light corresponding to the light whose intensity in the specific region is decreased is decreased. Further, the amount of change in the intensity of the laser light emitted from the light sources 52R, 52G, 52B may change according to the size of the specific region in the associated light distribution pattern. Note that the size here is defined as the size when the light distribution pattern is formed on the vertical surface at a predetermined distance from the vehicle. Further, the intensity of the laser light emitted from the light sources 52R, 52G, 52B may be changed to predetermined intensity.

Figure 34A:
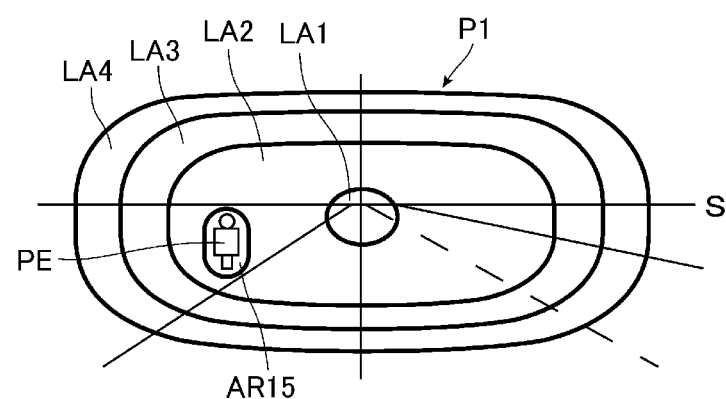
FIG. 34A and FIG. 34B are diagrams showing examples of a state of emitting light of a light distribution pattern in which a target object detected by a detection device and a specific region overlap from a headlight.
Figure 34B:
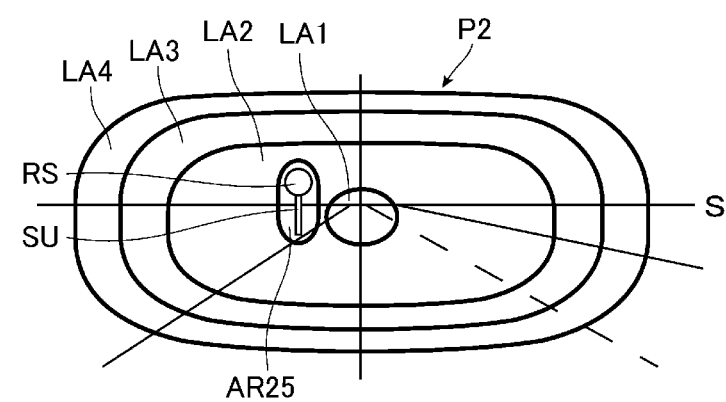

FIG. 34A and FIG. 34B are diagrams showing examples of a state of emitting light of a light distribution pattern in which a target object detected by a detection device and a specific region overlap from a headlight. Specifically, FIG.

34A is a diagram showing an example of a state in which the light of the light distribution pattern when a pedestrian PE is detected as a target object by the detection device 72 is emitted from the headlight 1. FIG. 34B is a diagram showing an example of a state in which the light of the light distribution pattern when a road sign RS is detected as a target object by the detection device 72 is emitted from the headlight 1. The light distribution pattern shown in FIG. 34A is the light distribution pattern P1 shown in FIG. 33B, and, as described above, is a light distribution pattern in which the color of the specific region AR15 in the high beam light distribution pattern PH is blue. Further, the total luminous flux amount of the specific region AR15 in the light distribution pattern P1 is smaller than the total luminous flux amount of the specific region AR15 in the high beam light distribution pattern PH. Such a specific region AR15 overlaps the entire pedestrian PE. Therefore, the color of the light emitted to the pedestrian PE is blue, and the total luminous flux amount of the light emitted to the pedestrian PE is reduced as compared to the case where the high beam is emitted from the headlight 1.

The light distribution pattern shown in FIG. 34B is the light distribution pattern P2 shown in FIG. 33C, and, as described above, is a light distribution pattern in which yellow in the color of the specific region AR25 in the high beam light distribution pattern PH is stronger than the color of other regions than the specific region AR25. Further, the total luminous flux amount of the specific region AR25 in the light distribution pattern P2 is larger than the total luminous flux amount of the specific region AR25 in the high beam light distribution pattern PH. Such a specific region AR25 overlaps the entire road sign RS and support SU that supports the road sign RS. For this reason, the color of the light emitted to the road sign RS is a color in which yellow is strong, and the total luminous flux amount of the light emitted to the road sign RS is increased as compared to the case where the high beam is emitted from the headlight 1. Further, the color of the specific region AR25 overlapping the road sign RS is different from the color of the specific region AR15 overlapping the pedestrian PE, and the colors of the specific regions AR15, AR25 are the predetermined colors corresponding to the type of the target object.

As described above, FIG. 34A shows a state in which the light of the light distribution pattern P1 in which the entire pedestrian PE overlaps the specific region AR15 is emitted from the headlight 1, and FIG. 34B shows a state in which the light of the light distribution pattern P2 in which the entire road sign RS and the support SU overlap the specific region AR25 is emitted from the headlight 1. However, the light emitted from the headlight 1 is only required to be light of a light distribution pattern in which the color of the specific region overlapping at least a part of the target object detected by the detection device 72 is different from the color of other regions than the specific region. For example, the light emitted from the headlight 1 may be light of a light distribution pattern in which a part of the pedestrian PE, which is a target object, overlaps a specific region whose color is changed. That is, in step SP5, the control unit 71 may select such a light distribution pattern.

Further, in step SP2 described above, when the detection device 72 inputs the information on the existence of the target object and the existence position of the target object to the control unit 71, the control unit 71 may perform control in step SP6 and step SP7 at the same time. Further, the control flow of the control unit 71 may proceed in the order of step SP5, step SP7, and step SP6, and may return to step SP1.

As described above, in step SP1, when the control flow of the control unit 71 proceeds to step SP8 to the control unit 71 without inputting of the signal instructing the light emission from the light switch 73, the control unit 71 controls the light sources 52R, 52G, 52B to not to emit the laser light from the light sources 52R, 52G, 52B. In this case, the power supply circuits 61R, 61G, 61B stop the supply of electric power from the power supply to the light sources 52R, 52G, 52B on the basis of the signal input from the control unit 71. Therefore, the light sources 52R, 52G, 52B do not emit the laser light, and the headlight 1 does not emit the light.

As described above, when the detection device 72 does not detect a predetermined target object located in front of the vehicle, the headlight 1 of the present embodiment emits the light of the high beam light distribution pattern PH. On the other hand, when the detection device 72 detects a predetermined target object located in front of the vehicle, the headlight 1 emits light of the light distribution patterns P1, P2 in which the color of a specific region overlapping at least a part of the target object is different from the color of other regions than the specific region.

As the headlight for vehicle disclosed in Patent Literature 2, there is a case where a driver is difficult to visually recognize other vehicles and pedestrians due to suppression of light irradiation to other vehicles and pedestrians, so that there is a demand for making driving easier.

Therefore, the headlight 1 of the present embodiment as the third aspect includes the first light emitting optical system 51R having the light source 52R and the phase modulation element 54R, the second light emitting optical system 51G having the light source 52G and the phase modulation element 54G, and the third light emitting optical system 51B having the light source 52B and the phase modulation element 54B. The light sources 52R, 52G, 52B respectively emit pieces of laser light having different wavelengths from each other. The phase modulation element 54R diffracts the laser light emitted from the light source 52R with the phase modulation pattern that is changeable, and emits light of the light distribution pattern based on the phase modulation pattern. The phase modulation element 54G diffracts the laser light emitted from the light source 52G with the phase modulation pattern that is changeable, and emits light of the light distribution pattern based on the phase modulation pattern. The phase modulation element 54B diffracts the laser light emitted from the light source 52B with the phase modulation pattern that is changeable, and emits light of the light distribution pattern based on the phase modulation pattern. In the headlight 1 of the present embodiment, the high beam light distribution pattern PH is formed by the light obtained by synthesizing the first light DLR emitted from the first light emitting optical system 51R, the second light DLG emitted from the second light emitting optical system 51G, and the third light DLB emitted from the third light emitting optical system 51B. Further, on the basis of the information from the detection device 72 that detects the predetermined target object located in front of the vehicle, the phase modulation elements 54R, 54G, 54B set a phase modulation pattern in which the light distribution patterns P1, P2 are formed in which the color of the specific regions AR15, AR25 overlapping at least a part of the target object in the high beam light distribution pattern PH is different from the color of other regions than the specific regions AR15, AR25, by the light obtained by synthesizing the light DLR, DLG DLB emitted from the light emitting optical systems 51R, 51G, 51B.

In such a headlight 1 of the present embodiment, the light distribution pattern of the emitted light changes according to the situation in front of the vehicle, and the color of the light emitted to at least a part of the target object is different from the color emitted to other regions. For example, as shown in FIG. 34A, when the target object detected by the detection device 72 is the pedestrian PE, the color of the light emitted to the pedestrian PE is different from the color of the light emitted to other regions. Here, the light feeling sense of the human eye tends to decrease as the wavelength of light increases or decreases from the wavelength of yellow-green light. That is, the human eye tends to perceive yellow-green light most brightly, and tends to perceive blue or red light darker than yellow-green light. In the headlight 1 of the present embodiment, the color of the specific region AR15 overlapping the pedestrian PE in the light distribution pattern P1 is blue, so that the pedestrian PE is irradiated with blue light. Therefore, the headlight 1 of the present embodiment can suppress the pedestrian PE from feeling dazzling due to the light emitted from the headlight 1. Further, in the headlight 1 of the present embodiment, the color of the light emitted to the target object such as the pedestrian PE is different from the color of the light emitted to other regions, but the target object is irradiated with light. Therefore, the headlight 1 of the present embodiment can suppress the difficulty in visually recognizing the target object as compared with the case where the target object is not irradiated with light.

For example, as shown in FIG. 34B, when the target object detected by the detection device 72 is the road sign RS, the color of the light emitted to the road sign RS is different from the color of the light emitted to other regions. In the headlight 1 of the present embodiment, the color of the specific region AR25 overlapping the road sign RS in the light distribution pattern P2 is a color in which yellow is stronger than the color of other regions than the specific region AR25, so that the road sign RS is irradiated with light of a color in which yellow, which is a highly sensitive color for the light feeling sense of the human eye, is strong. Therefore, the headlight 1 of the present embodiment can improve the visibility of the road sign RS. Therefore, the headlight 1 of the present embodiment can make drive easy.

Further, in the headlight 1 of the present embodiment as the third aspect, each of the light emitting optical systems 51R, 51G, 51B adjusts the total luminous flux amount of the emitted light DLR, DLG, DLB on the basis of the information from the detection device 72. This headlight 1 of the present embodiment can adjust the total luminous flux amount of the light DLR, DLG, DLB emitted from each of the light emitting optical systems 51R, 51G, 51B according to the color of the specific regions AR15, AR25 overlapping at least a part of the target object in the light distribution patterns P1, P2 of the emitted light. Therefore, the headlight 1 of the present embodiment can suppress unintentional change of the color and brightness of other regions than the specific regions AR15, AR25 in the light distribution patterns P1, P2 in which the color of the specific regions AR1, AR2 changes. Accordingly, the headlight 1 of the present embodiment can prevent a driver from feeling uncomfortable even if the light distribution pattern of the emitted light changes according to the situation in front of the vehicle.

Further, in the headlight 1 of the present embodiment as the third aspect, the total luminous flux amount of the specific region AR15 in the light distribution pattern P1 is smaller than the total luminous flux amount of the specific region AR15 in the high beam light distribution pattern PH. Therefore, in the headlight 1 of the present embodiment, for example, when the target object detected by the detection device 72 is the pedestrian PE, the total luminous flux amount of the light emitted to the pedestrian PE can be reduced, and it is possible to further prevent the pedestrian PE from feeling dazzling due to the light emitted from the headlight 1.

Further, in the headlight 1 of the present embodiment as the third aspect, the total luminous flux amount of the specific region AR25 in the light distribution pattern P2 is larger than the total luminous flux amount of the specific region AR25 in the high beam light distribution pattern PH. Therefore, in the headlight 1 of the present embodiment, for example, when the target object detected by the detection device 72 is the road sign RS, the total luminous flux amount of the light emitted to the road sign RS can be increased, and the visibility of the road sign RS can be improved.

Further, in the headlight 1 of the present embodiment as the third aspect, the detection device 72 detects a plurality of types of target objects such as the pedestrian PE and the road sign RS, and colors of the specific regions AR15, AR25 are predetermined colors corresponding to the types of the target objects. Therefore, the driver can assume the type of the target object according to the color of a specific region even in a situation where the target object cannot be clearly viewed, for example, a situation where the target object is far away. Accordingly, the headlight 1 of the present embodiment can make drive easier than in a case where the color of the specific regions AR15, AR25 is not a predetermined color corresponding to the type of the target object.

Ninth Embodiment

Next, a ninth embodiment as the third aspect of the present invention will be described in detail with reference to FIG. 35. Note that the same or equivalent constituent elements as those of the first embodiment are denoted by the same reference numerals, and redundant explanation will be omitted except when particularly described.

Figure 35:
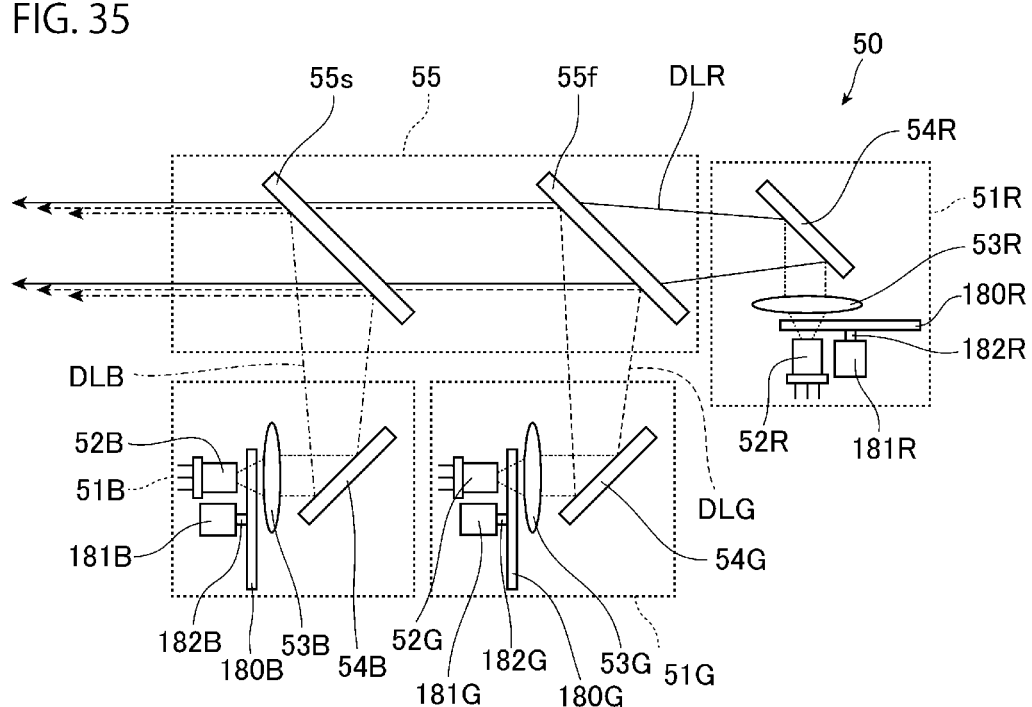
FIG. 35 is a diagram showing an optical system unit in a ninth embodiment as the third aspect of the present invention in the similar manner to FIG. 2.

FIG. 35 is a diagram showing an optical system unit in a ninth embodiment as the third aspect of the present invention in the similar manner to FIG. 2. Note that the heat sink 30, the cover 59, and the like are omitted in FIG. 35. As shown in FIG. 35, the optical system unit 50 of the present embodiment is different from the optical system unit 50 of the first embodiment in that the first light emitting optical system 51R, the second light emitting optical system 51G, and the third light emitting optical system 51B respectively includes optical filters 180R, 180G, 180B, and motors 181R, 181G, 181B.

The optical filter 180R, 180G, 180B are filters that block a part of incident light and reduce the amount of light that transmits through the optical filters 180R, 180G, 180B. In the present embodiment, the optical filter 180R is arranged on the optical path of the laser light emitted from the light source 52R from the light source 52R to the phase modulation element 54R. Specifically, the optical filter 80 is arranged between the collimator lens 53R and the phase modulation element 54R in this optical path. Therefore, the laser light emitted from the light source 52R transmits through the optical filter 180R and the collimator lens 53R and is incident on the phase modulation element 54R. In the present embodiment, the outer shape of the optical filter 180R in front view is substantially circular, and one end portion of the output shaft 182R of the motor 181R is fixed to the center of the optical filter 180R. Therefore, the optical filter 180R rotates around the output shaft 182R of the motor 181R as a rotation axis. A control unit 71 is electrically connected to the motor 181R, and the motor 181R is controlled by the control unit 71.

As similar to the optical filter 180R, the optical filters 180G, 180B are arranged on the optical path of the laser light emitted from the light sources 52G, 52B extending from the light sources 52G, 52B to the phase modulation elements 54G, 54B. Specifically, the optical filters 180G, 180B are arranged between the collimator lenses 53G, 53B and the phase modulation elements 54G, 54B in this optical path, respectively. Therefore, the laser light emitted from the light sources 52G, 52B transmits through the optical filters 180G, 180B and the collimator lenses 53G, 53B and is incident on the phase modulation elements 54G, 54B. As similar to the optical filter 180R, the outer shape of the optical filters 180G, 180B in front view is substantially circular. The optical filters 180G, 180B are rotated around the output shafts 182G, 182B by the motors 181G, 181B controlled by the control unit 71. As the motors 181R, 181G, 181B for rotating the optical filters 180R, 180G, 180B, for example, a stepping motor, an AC servo motor, or the like can be used.

Next, the configurations of the optical filter 180R, the optical filter 180G, and the optical filter 180B will be described in detail. In the present embodiment, the optical filter 180R, the optical filter 180G, and the optical filter 180B have similar configurations. Therefore, the optical filter 180R will be described below, and the description of the optical filter 180G and the optical filter 180B will be omitted as appropriate.

Figure 36:
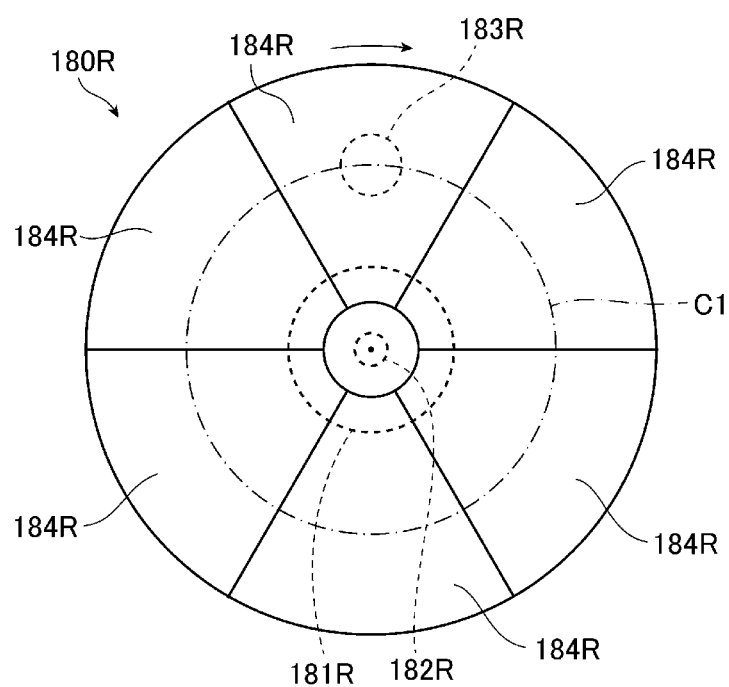
FIG. 36 is a front view schematically showing an optical filter in a first light emitting optical system shown in FIG. 35.

FIG. 36 is a front view schematically showing an optical filter in a first light emitting optical system shown in FIG. 35. In FIG. 36, a region 183R on which the laser light emitted from the light source 52G is incident is shown by a broken line. The optical filter 180R of the present embodiment has a plurality of dimming regions 184R in which the amount of transmitted light is different from each other, and the plurality of dimming regions 184R are arranged on the circumference of a circle Cl around the output shaft 182R of the motor 181R in the front view of the optical filter 180R. Note that the order in which these dimming regions 184R are arranged in the circumferential direction of the circle Cl is not particularly limited. The circumference of the circle Cl crosses the region 183R on which the laser light emitted from the light source 52G is incident. Therefore, when the optical filter 180R is rotated by a predetermined angle by the motor 181R, the plurality of dimming regions 184R and the region 183R can overlap each other. Therefore, the dimming region 184R in which the laser light emitted from the light source 52G is incident can be switched by rotating the optical filter 180R by a predetermined angle by the motor 181R.

Examples of such optical filters 180R, 180G, 180B include a dimming filter in which an optical film such as a metal film is laminated on a glass substrate. By controlling the type and thickness of the optical film according to each dimming region, the amount of light transmitting through each dimming region can be made different from each other.

Note that, the optical filters 180R, 180G, 180B having the plurality of dimming regions is only required to be able to switch the dimming region in which the light emitted from the light sources 52R, 52G, 52B is incident. In such optical filters 180R, 180G, 180B, for example, a plurality of dimming regions may be linearly arranged and slidably movable in this arrangement direction. Even with such a configuration, it is possible to switch the dimming region in which the light emitted from the light sources 52R, 52G, 52B is incident.

In the table TB of the present embodiment, information is associated with each of the light distribution patterns formed by the light obtained by synthesizing the light DLR, DLG, DLB emitted from the light emitting optical systems 51R, 51G, 51B. Examples of the information associated with each light distribution pattern include the phase modulation pattern in the phase modulation elements 54R, 54G, 54B when forming the light distribution pattern, the dimming region in the optical filters 180R, 180G, 180B through which the light emitted from the light sources 52R, 52G, 52B transmits, and the target object detected by the detection device 72. That is, in the present embodiment, the dimming region in the optical filters 180R, 180G, 180B is associated with each light distribution pattern instead of the intensity of the laser light of the light sources 52R, 52G, 52B. In the present embodiment, each of the light emitting optical systems 51R, 51G, 51B does not change the intensity of the laser light of the light sources 52R, 52G, 52B according to the light distribution pattern, but changes the dimming region in the optical filters 180R, 180G, 180B through which the light emitted from the light sources 52R, 52G, 52B transmits. Specifically, the control unit 71 controls the motors 181R, 181G, 181B to rotate the optical filters 180R, 180G, 180B to predetermined angles, respectively, so that the dimming region through which the laser light emitted from the light sources 52R, 52G, 52B transmits is changed. The laser light emitted from the light sources 52R, 52G, 52B is dimmed according to the transmitting dimming region, and the dimmed light is incident on the phase modulation elements 54R, 54G, 54B. The light DLR, DLG, DLB caused by the dimmed light is emitted from the phase modulation elements 54R, 54G, 54B, and the light DLR, DLG, DLB is emitted from the light emitting optical systems 51R, 51G, 51B.

As described above, in the present embodiment, the total luminous flux amount of the light DLR, DLG, DLB emitted from the light emitting optical system 51R, 51G, 51B is the total luminous flux amount according to the dimming region in the optical filters 180R, 180G, 180B. That is, it can be understood that each of the light emitting optical systems 51R, 51G, 51B can adjust the total luminous flux amount of the emitted light DLR, DLG, DLB according to the light distribution pattern, and these light emitting optical systems 51R, 51G, 51B can be adjusted on the basis of the information from the detection device 72. Accordingly, even with the optical system unit 50 having such a configuration, the similar effect to that of the eighth embodiment as the third aspect can be obtained. Further, with such a configuration, the total luminous flux amount of the light DLR, DLG, DLB emitted from the light emitting optical systems 51R, 51G, 51B can be stably adjusted without adjusting the intensity of the laser light emitted from the light sources 52R, 52G, 52B.

The optical filters 180R, 180G, 180B are only required to be able to adjust the total luminous flux amount of the light DLR, DLG, DLB emitted from the light emitting optical systems 51R, 51G, 51B. For example, the optical filter 180R may be arranged on the optical path of the light DLR emitted from the phase modulation element 54R in the first light emitting optical system 51R. The optical filter 180G may be arranged on the optical path of the light DLG emitted from the phase modulation element 54G in the second light emitting optical system 51G. The optical filter 180B may be arranged on the optical path of the light DLB emitted from the phase modulation element 54B in the third light emitting optical system 51B.

Further, the optical filters 180R, 180G, 180B may be polarizing filters. In this case, the light emitting optical systems 51R, 51G, 51B rotate the optical filters 180R, 180G, 180B, which are polarizing filters, to a predetermined angle according to the light distribution pattern to change polarizing direction of the optical filters 180R, 180G, 180B. The light emitted from the light sources 52R, 52G, 52B is laser light, and the laser light is substantially linearly polarized light. Therefore, the amount of dimming of the laser light emitted from the light sources 52R, 52G, 52B can be adjusted according to the change in the polarization direction of the optical filters 180R, 180G, 180B. That is, the total luminous flux amount of the light transmitting through the optical filters 180R, 180G, 180B can be adjusted. Accordingly, even in the optical system unit 50 having such a configuration, the light emitting optical systems 51R, 51G, 51B can adjust the total luminous flux amount of the emitted light DLR, DLG, DLB. The optical filters 180R, 180G, 180B, which are polarizing filters, may be arranged on the optical paths of the light DLR, DLG, DLB emitted from the phase modulation elements 54R, 54G, 54B in the light emitting optical systems 51R, 51G, 51B, respectively. Further, the phase modulation elements 54R, 54G 54B have wavelength dependence. Therefore, it is preferable that the optical filter 180R, which is a polarizing filter, is arranged on the optical path of the laser light emitted from the light source 52R from the light source 52R to the phase modulation element 54R. It is preferable that the optical filters 180G, 180B, which are polarizing filters, are arranged on the optical path of the laser light emitted from the light sources 52G, 52B extending from the light sources 52G, 52B to the phase modulation elements 54G, 54B. With such a configuration, it is possible to reduce the phase variation in each of the light incident on the phase modulation elements 54R, 54G, 54B. Therefore, it is possible to suppress the emission of unnecessary light different from the light DLR, DLG, DLB for forming a predetermined light distribution pattern from the phase modulation elements 54R, 54G, 54B.

Further, although the description by illustration is omitted, the optical filters 180R, 180G, 180B may be a dimming sheet in which the degree of diffusion of transmitted light changes by applying a voltage or a current. Examples of the configuration of a dimming sheet to which a voltage is applied include a configuration including: a liquid crystal layer having liquid crystal molecules; a pair of transparent electrodes having translucency and arranged so as to sandwich the liquid crystal layer; and a pair of protective layers having translucency and arranged so as to sandwich the pair of transparent electrodes. In such a dimming sheet, the orientation of the liquid crystal molecules in the liquid crystal layer is changed by applying a voltage to the pair of transparent electrodes. By changing the orientation of the liquid crystal molecules, the degree of diffusion at the time of transmission of the light transmitted through the liquid crystal layer changes, and the amount of transmitted light can be changed. On the other hand, examples of the configuration of a dimming sheet to which a current is applied include a configuration including a thin film layer such as tungsten oxide and an electrolyte layer instead of the liquid crystal layer in the above-described dimming sheet to which a voltage is applied. In such a dimming sheet, the thin film layer undergoes an electrical oxidation reaction or reduction reaction when a current is applied to the pair of transparent electrodes, so that the degree of diffusion at the time of transmission of the light that transmits through the thin film layer changes and the amount of transmitted light can be changed. Accordingly, even if the optical filters 180R, 180G, 180B are dimming sheets whose degree of diffusion of transmitted light changes when a voltage or current is applied, the light emitting optical systems 51R, 51G, 51B can adjust the total luminous flux amount of the light DLR, DLG, DLB emitted according to the light distribution pattern. Further, the light emitting optical systems 51R, 51G, 51B can adjust the total luminous flux amount of the emitted light DLR, DLG, DLB according to the light distribution pattern without using the motors 181R, 181G, 181B.

In the eighth and ninth embodiments as the third aspect, when the detection device 72 does not detect the target object, the headlight 1 emits the light of the high beam light distribution pattern PH, and when the detection device 72 detects the target object, the headlight 1 emits light of the light distribution patterns P1, P2 in which the color of the specific regions AR15, AR25 overlapping at least a part of the target object in the high beam light distribution pattern PH is different from the color of other regions than the specific regions AR15, AR25. However, when the detection device 72 detects a target object, the headlight 1 as the third aspect is only required to emit light of the light distribution pattern in which the color of a specific region overlapping at least a part of the target object is different from the color of other regions than the specific region. For example, when the detection device 72 does not detect the target object, the headlight 1 as the third aspect may emit light having a low beam light distribution pattern, and when the detection device 72 detects the target object, the headlight 1 as the third aspect may emit light of a light distribution pattern in which the color of a specific region overlapping at least a part of the target object in the low beam light distribution pattern is different from the color of the specific region.

Further, the headlight for vehicle as the third aspect may have the same configuration as the headlight 1 as the first aspect shown in FIG. 22. That is, the optical system unit 50 may include one phase modulation element 54S instead of the three phase modulation elements 54R, 54G, 54B. In this case, pieces of laser light having different wavelengths emitted from these light sources 52R, 52G, 52B are sequentially incident on the phase modulation element 54S. Further, the phase modulation element 54S changes the phase modulation pattern in synchronization with the switching of the laser light emission for each of the light sources 52R, 52G, 52B as described above, thereby emitting the first light DLR, the second light DLG, and the third light DLB in sequence. Then, in this headlight 1, a predetermined light distribution pattern is formed by synthesizing these pieces of light DLR, DLG, DLB due to the afterimage phenomenon. When the afterimage phenomenon is used as described above, it is sufficient that at least two light emitting optical systems share the phase modulation element 54S. In this case, the light emitted from the light emitting optical system sharing the phase modulation element is synthesized by an afterimage phenomenon, and the light synthesized by this afterimage phenomenon and the light emitted from another light emitting optical system are synthesized to form a predetermined light distribution pattern.

Further, the headlight for vehicle as the third aspect may have the same configuration as the headlight 1 as the first aspect shown in FIG. 23. That is, the optical system unit 50 may not include the synthesizing optical system 55, and may have a configuration in which light is emitted from the cover 59 in a state where the pieces of light emitted from the first light emitting optical system 51R, the second light emitting optical system 51G, and the third light emitting optical system 51B are not synthesized. In this case, the first light DLR, the second light DLG, and the third light DLB are applied so that regions irradiated with the respective pieces of light overlap with each other at the focal position separated by a predetermined distance from the vehicle.

In the eighth and ninth embodiments and the modification as the third aspect, the phase modulation elements 54R, 54G, 54B, 54S are LCOS which is a reflection type phase modulation element. However, the phase modulation element is only required to be able to diffract the incident light with a changeable phase modulation pattern and emit the light of the light distribution pattern based on the phase modulation pattern. For example, the phase modulation element may be a transmissive phase modulation element, or may be a GLV in which a plurality of reflectors are formed on a silicon substrate.

Furthermore, in the eighth and ninth embodiments as the third aspect, the first optical element 55$f$ transmits the first light DLR and reflects the second light DLG to synthesize the first light DLR and the second light DLG, and the second optical element 55$s$ transmits the first light DLR and the second light DLG synthesized by the first optical element 55$f$ and reflects the third light DLB to synthesize the first light DLR, the second light DLG, and the third light DLB. However, for example, a configuration may be adopted in which the third light DLB and the second light DLG are synthesized in the first optical element 55$f$, and the third light DLB and the second light DLG synthesized by the first optical element 55$f$ and the first light DLR are synthesized in the second optical element 55$s$. In this case, in the eighth embodiment as the third aspect, the positions of the first light emitting optical system 51R including the light source 52R, the collimator lens 53R, and the phase modulation element 54R is switched with the position of the third light emitting optical system 51B including the light source 52B, the collimator lens 53B, and the phase modulation element 54B. Furthermore, in the eighth and ninth embodiments as the third aspect, a bandpass filter that transmits light having a predetermined wavelength band and reflects light having other wavelength bands may be used for the first optical element 55$f$ or the second optical element 55$s$. Further, in the eighth and ninth embodiments, the synthesizing optical system 55 only needs to synthesize pieces of light emitted from the respective light emitting optical systems, and the synthesizing optical system 55 is not limited to the configuration of the eighth embodiments or the above-described configuration.

Further, in the eighth and ninth embodiments as the third aspect, the phase modulation elements 54R, 54G, 54B, 54S having a plurality of modulation units have been described as an example. However, the number, size, outer shape, and the like of the modulation units are not particularly limited. For example, the phase modulation element may have one modulation unit, and the incident light may be diffracted by this one modulation unit.

Further, in the eighth and ninth embodiments as the third aspect, the optical system unit 50 including three light sources 52R, 52G, 52B that emit light of different wavelengths from each other, and three phase modulation elements 54R, 54G, 54B respectively corresponding to the light sources 52R, 52G, 52B has been described as an example. However, the three phase modulation elements 54R, 54G, 54B may be integrally formed. Examples of a configuration of such a phase modulation element include a configuration in which the phase modulation element is divided into a region corresponding to the light source 52R, a region corresponding to the light source 52G, and a region corresponding to the light source 52B. In such a configuration, the laser light emitted from the light source 52R is incident on the region corresponding to the light source 52R, the laser light emitted from the light source 52G is incident on the region corresponding to the light source 52G, and the laser light emitted from the light source 52B is incident on the region corresponding to the light source 52B. The phase modulation pattern in the region corresponding to the light source 52R is the phase modulation pattern corresponding to the laser light emitted from the light source 52R, and the phase modulation pattern in the region corresponding to the light source 52G is the phase modulation pattern corresponding to the laser light emitted from the light source 52G, and the phase modulation pattern in the region corresponding to the light source 52B is the phase modulation pattern corresponding to the laser light emitted from the light source 52B. According to such a headlight 1, since the three phase modulation elements 54R, 54G, 54B are integrally formed, the number of parts can be reduced.

Further, in the eighth and ninth embodiments as the third aspect, each of the light emitting optical systems 51R, 51G, 51B adjusts the total luminous flux amount of the emitted light DLR, DLG, DLB on the basis of the information from the detection device 72. However, the total luminous flux amount of the light DLR, DLG, DLB emitted from the light emitting optical systems 51R, 51G, 51B may be constant. That is, the light emitting optical systems 51R, 51G, 51B may not adjust the intensity of the laser light emitted from the light sources 52R, 52G, 52B, and may not include the optical filters 180R, 180G, 180B according to the ninth embodiment. Accordingly, with such a configuration, the headlight 1 can operate with simple control as compared to the case where the total luminous flux amount of the emitted light DLR, DLG, DLB emitted from the light emitting optical systems 51R, 51G, 51B is adjusted.

Further, in the eighth and ninth embodiments as the third aspect, the headlight 1 that emits the light of one of the light distribution patterns in the table TB has been described as an example. However, the headlight 1 as the third aspect may emit light of a light distribution pattern different from the light distribution pattern in the table TB. For example, as similar to the modification as the first aspect described with reference to FIGS. 24A, 24B, and 23, the control unit 71 in the eighth embodiment as the third aspect may operate the phase modulation pattern in the phase modulation elements 54R, 54G, 54B for forming the light distribution pattern of the light emitted from the headlight 1. Specifically, the control unit 71 in the modification as the third aspect may operate the phase modulation pattern in the phase modulation elements 54R, 54G, 54B for forming the light distribution pattern in which the color of a region overlapping a part of the target object is different from the color of other regions than that region, on the basis of the information stored in the storage unit 74, the information on the existence of the target object and the existence position of the target object input from the detection device 72, and the like. In this case, the storage unit 74 stores, for example, information on the phase modulation pattern in the phase modulation elements 54R, 54G, 54B when forming the high beam light distribution pattern PH, information on a predetermined color corresponding to the type of the target objected detected by the detection device 72, and a table related to the intensity distribution of the high beam light distribution pattern PH. Here, the phase modulation pattern operated in the modification as the third aspect is, for example, operated in a similar method to that of the phase modulation pattern operated in the modification as the first aspect described with reference to FIGS. 24A, 24B, 25A, and 25B. Therefore, this modification as the third aspect will be described with reference to FIGS. 24A, 24B, 25A, and 25B.

As shown in FIG. 24A, as similar to the modification as the first aspect, the high beam light distribution pattern PH of the modification as the third aspect is formed by an aggregate of compartment regions CA partitioned at substantially equal intervals in the vertical and horizontal directions by the compartment lines CL. The address and light intensity are preset for each compartment region. The address is represented, for example, by the row number and column number where the compartment region CA is located. The width of the compartment region CA in the vertical direction is represented by the width corresponding to the vertical angle with respect to the headlight 1, and the width of the compartment region CA in the left-right direction is represented by the width corresponding to the horizontal angle with respect to the headlight 1. Each of these widths is set to a width corresponding to, for example, 0.1 degrees.

As shown in FIG. 25A, in the table TB1 of the modification as the third aspect, as similar to the modification as the first aspect, the phase modulation pattern in the phase modulation elements 54R, 54G, 54B when forming the high beam light distribution pattern PH and the intensity of the laser light emitted from the light sources 52R, 52G, 52B when forming the high beam light distribution pattern PH are associated with the high beam light distribution pattern PH. In another table TB2 of the present modification, the address of the compartment region CA and the total luminous flux amount as the intensity of light in the compartment region CA are associated with each other.

The control unit 71 of the present modification extracts the compartment region CA overlapping at least a part of the target object on the basis of the information on the existence of the target object and the existence position of the target object input from the detection device 72. As shown in FIG. 24B, as similar to the modification as the first aspect, for example, all compartment regions CA overlapping the pedestrian PE may be extracted.

In the modification as the third aspect, the control unit 71 operates a phase modulation pattern in the phase modulation elements 54R, 54G, 54B in which the light distribution pattern formed by the light obtained by synthesizing the light DLR, DLG, DLB emitted from the phase modulation elements 54R, 54G, 54B is the light distribution pattern in which the color of the extraction region ARE is different from the color of other regions than the extraction region ARE. The color of the extracted extraction region ARE in the formed light distribution pattern is a predetermined color corresponding to the target object detected by the detection device 72. The control unit 71 controls the phase modulation elements 54R, 54G, 54B on the basis of the operation result. That is, it is understood that each of the phase modulation elements 54R, 54G, 54B sets a phase modulation pattern in which the light distribution pattern formed by the light obtained by synthesizing the light DLR, DLG, DLB is the light distribution pattern in which the color of the extraction region ARE is different from the color of other regions than the extraction region ARE. Since the extraction region ARE overlaps with at least a part of the target object, the light distribution pattern of the light emitted from the lamp unit 20 is a light distribution pattern in which the color of the region overlapping with at least a part of the target object is different from the color of other regions than that region.

Further, in the modification as the third aspect, the control unit 71 operates the summed total luminous flux amount by adding the total luminous flux amounts of the extraction region ARE on the basis of the table TB2 shown in FIG. 25B. The control unit 71 adjusts the intensity of the laser light emitted from the light sources 52R, 52G, 52B on the basis of the operation result and the color of the extraction region ARE. For example, this adjustment is an increase or decrease based on the intensity of light emitted from the high beam light distribution pattern PH of the table TB1. Specifically, the control unit 71 determines the light sources 52R, 52G, 52B that change the intensity of the emitted laser light on the basis of the color of the extraction region ARE. Further, when the summed total luminous flux amount is large, the control unit 71 increases the amount of change in the intensity in the laser light that changes the intensity. On the other hand, when the summed total luminous flux amount is small, the control unit 71 reduces the amount of change in the intensity in the laser light that changes the intensity. That is, in the modification as the third aspect, each of the light emitting optical systems 51R, 51G, 51B adjusts the total luminous flux amount of the emitted light according to a light distribution pattern in which the color of the extraction region ARE is different from the color of other regions than the extraction region ARE. Accordingly, it can be understood that these light emitting optical systems 51R, 51G, 51B can be adjusted on the basis of the information from the detection device 72. Therefore, the headlight 1 can suppress unintentional change of the color and brightness of regions other than the specific region in the light distribution pattern in which the color of the specific region has been changed. Accordingly, this headlight 1 can prevent a driver from feeling uncomfortable even if the light distribution pattern of the emitted light changes according to the situation in front of the vehicle.

Further, in the eighth and ninth embodiments and the modification as the third aspect, the lamp unit 20 does not include an imaging lens system including an imaging lens. However, the lamp unit 20 may include an imaging lens system, and the light emitted from the optical system unit 50 may be emitted through the imaging lens system. With such a configuration, it is possible to easily make the light distribution pattern of the emitted light a larger light distribution pattern. The term "larger" here means larger when the light distribution pattern formed on the vertical surface at a predetermined distance from the vehicle is compared.

Figure 37A:
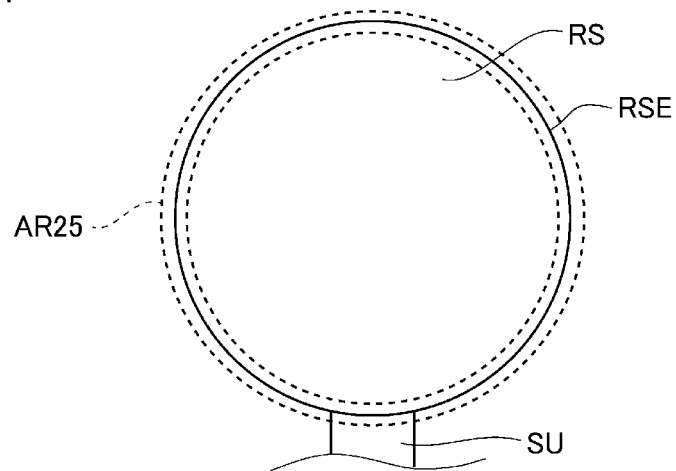
FIG. 37A and FIG. 37B are diagrams showing examples of a state in which light of a light distribution pattern is emitted from a headlight in a modification as the third aspect of the present invention.
Figure 37B:
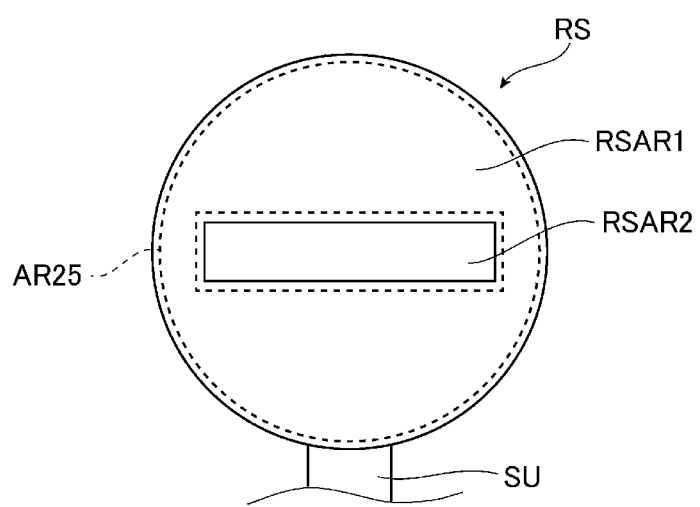

Further, in the eighth and ninth embodiments as the third aspect, an example has been described in which, when the road sign RS as a target object is detected by the detection device 72, the light of the light distribution pattern in which the entire road sign RS and support SU overlaps the specific region AR2 of which color is changed is emitted from the headlight 1. However, the light emitted from the headlight 1 as the third aspect may be light of a light distribution pattern in which a part of the road sign RS, which is a target object, overlaps the specific region AR2 whose color is changed. FIG. 37A and FIG. 37B are diagrams showing examples of a state in which the light of the light distribution pattern in such a modification is emitted from the headlight, and are diagrams showing an enlarged vicinity of the road sign. In FIGS. 37A and 37B, the specific region AR25 whose color is changed is indicated by a broken line.

As shown in FIG. 37A, for example, the specific region AR25 may have a ring shape along an outer edge RSE of the road sign RS. With such a configuration, the existence of the road sign RS, which is a target object, can be emphasized. In such a case, the target object detected by the detection device 72 is not limited to the road sign RS. For example, the target object may be a pedestrian, in which case the specific region has a ring shape along the outer edge of the pedestrian. By doing so, the existence of the pedestrian, which is the target object, can be emphasized as similar to the road sign RS. From the viewpoint of emphasizing the existence of the target object detected by the detection device 72, it is preferable that the color of the specific region AR25 is a color in which yellow, which is a highly sensitive color for the light feeling sense of the human eye, is strong. Further, in this modification, the specific region AR2 overlaps the entire circumference of the outer edge RSE of the road sign RS, but may not overlap the entire circumference of the outer edge RSE.

Further, when the detection device 72 is configured to recognize the color distribution of the road sign when the type of the road sign is identified, a specific region may overlap a region with a predetermined color in the detected road sign, and the color of the specific region may be similar to this predetermined color. For example, as shown in FIG. 37B, when the road sign RS detected by the detection device 72 is a sign indicating vehicle entry prohibition, the specific region AR25 may overlap a red region RSAR1 in this road sign RS, and the color of this specific region AR25 may be similar to the color of a region RSAR1 in the road sign RS, for example, the same red. That is, the specific region AR25 may overlap the region with the predetermined color in the road sign RS, and the color of the specific region AR25 may be similar to the predetermined color in the road sign RS. With such a configuration, the visibility of the road sign, which is the target object, can be improved. From the viewpoint of improving the visibility of the road sign RS, it is preferable that the specific region AR25 overlaps only the red region RSAR1 which is the predetermined color in the road sign RS, and does not overlap a white region RSAR2 which is a color different from the predetermined color. Further, it is more preferable that this specific region AR25 overlaps the entire red region RSAR1 which is a predetermined color in the road sign RS.

Further, in the eighth and ninth embodiments as the third aspect, the first light emitting optical system 51R that emits the red first light DLR, the second light emitting optical system 51G that emits the green second light DLG, and the third light emitting optical system 51B that emits the blue third light DLB are provided. However, in the headlight for vehicle as the third aspect of the present invention, the number of the light emitting optical systems and the light emitted from the light source are not limited to those in the eighth and ninth embodiments as the third aspect as long as at least two light emitting optical systems each include a light source that emits laser light having different wavelengths and a phase modulation element that diffracts the laser light emitted from the light source, and a predetermined light distribution pattern is formed by the light obtained by synthesizing the light emitted from the light emitting optical systems. For example, when there are two light emitting optical systems, one light emitting optical system may emit green light and the other light emitting optical system may emit red light, and a predetermined light distribution pattern may be formed by the synthesized light. Alternatively, one light emitting optical system may emit blue light and the other light emitting optical system may emit yellow light, and a predetermined light distribution pattern may be formed by the synthesized light.

Further, the number of light emitting optical systems may be three or more. In this case, for example, a fourth light emitting optical system that emits yellow light may be provided. For example, in addition to the above-described red, green, and blue light emitting optical systems, a fourth light emitting optical system that emits yellow light may be provided, and a predetermined light distribution pattern may be formed by the light obtained by synthesizing the light emitted from the four light emitting optical systems. Further, when the intensity of part of the light emitted from the red, green, and blue light emitting optical systems is low, the fourth light emitting optical system may emit light of the same color as the low intensity color.

According to the first aspect of the present invention, a headlight for vehicle capable of suppressing uncomfortable feeling is provided, and according to the second and third aspects of the present invention, a headlight for vehicle that enables easy drive is provided, and the headlight for vehicle can be used in the field of a lamp for a vehicle such as an automobile.

REFERENCE SIGNS LIST

1 . . . headlight (headlight for vehicle)
10 . . . housing
20 . . . lamp unit
50 . . . optical system unit
51R . . . first light emitting optical system
51G . . . second light emitting optical system
51B . . . third light emitting optical system
52R, 52G, 52B . . . light source
53R, 53G, 53B . . . collimator lens
54R, 54G, 54B, 54S . . . phase modulation element
55 . . . synthesizing optical system
55$f$ . . . first optical element
55$s$ . . . second optical element
70 . . . lamp control system
71 . . . control unit
72 . . . detection device
74 . . . storage unit
75 . . . steering sensor
76 . . . turn switch
80, 180R, 180G, 180B . . . optical filter
AR1, AR2, AR11, AR12, AR13, AR15, AR25 . . . specific region
AR21, AR22, AR23, AR24 . . . predetermined region

The invention claimed is:
1. A headlight for vehicle comprising
a lamp unit including: a light source that emits laser light; and a phase modulation element that diffracts the laser light emitted from the light source with a phase modulation pattern that is changeable, and emits light of a light distribution pattern based on the phase modulation pattern,
wherein the lamp unit adjusts a total luminous flux amount of the light emitted from the lamp unit according to the light distribution pattern;
wherein on the basis of information from a detection device that detects a predetermined target object located in front of a vehicle, the phase modulation element sets the phase modulation pattern in which light of a light distribution pattern in which a specific region overlapping at least a part of the target object is darkened is emitted;
wherein the lamp unit reduces the total luminous flux amount of the light emitted from the lamp unit according to the light distribution pattern in which the specific region is darkened; and
wherein the lamp unit reduces the total luminous flux amount of the light emitted from the lamp unit when a size of the specific region exceeds a predetermined size.

2. The headlight for vehicle according to claim 1,
wherein the lamp unit adjusts intensity of the laser light emitted from the light source according to the light distribution pattern to adjust the total luminous flux amount of the light emitted from the lamp unit.

3. A headlight for vehicle comprising
a lamp unit including: a light source that emits laser light and a phase modulation element that diffracts the laser light emitted from the light source with a phase modulation pattern that is changeable, and emits light of a light distribution pattern based on the phase modulation pattern,
wherein the lamp unit adjusts a total luminous flux amount of the light emitted from the lamp unit according to the light distribution pattern; and
wherein, on the basis of information from a detection device that detects a predetermined target object located in front of a vehicle, the phase modulation element sets the phase modulation pattern in which light of a light distribution pattern in which a specific region overlapping at least a part of the target object is darkened is emitted;
wherein the lamp unit reduces the total luminous flux amount of the light emitted from the lamp unit when the total luminous flux amount of the light in the specific region before being darkened exceeds a predetermined amount.

4. The headlight for vehicle according to claim 3,
wherein, in the specific region, a central side is made darker than an edge side.

5. A headlight for vehicle comprising
a lamp unit including: a light source that emits laser light and a phase modulation element that diffracts the laser light emitted from the light source with a phase modulation pattern that is changeable, and emits light of a light distribution pattern based on the phase modulation pattern,
wherein the lamp unit adjusts a total luminous flux amount of the light emitted from the lamp unit according to the light distribution pattern; and
wherein the lamp unit further includes a polarizing filter arranged on an optical path of the laser light emitted from the light source or on an optical path of the light emitted from the phase modulation element, and rotates the polarizing filter according to the light distribution pattern to adjust the total luminous flux amount of the light emitted from the lamp unit.

6. A headlight for vehicle comprising
a lamp unit including: a light source that emits laser light and a phase modulation element that diffracts the laser light emitted from the light source with a phase modulation pattern that is changeable, and emits light of a light distribution pattern based on the phase modulation pattern,
wherein the lamp unit adjusts a total luminous flux amount of the light emitted from the lamp unit according to the light distribution pattern;
wherein the lamp unit further includes a dimming filter arranged on an optical path of the laser light emitted from the light source or on an optical path of the light emitted from the phase modulation element,
wherein the dimming filter has a plurality of dimming regions in which an amount of light transmitting through the dimming filter is different from each other, and
wherein the lamp unit moves the dimming filter according to the light distribution pattern to change the dimming regions in which light is incident to adjust the total luminous flux amount of the light emitted from the lamp unit.

7. A headlight for vehicle comprising:
a light source that emits laser light; and
a phase modulation element that diffracts the laser light emitted from the light source with a phase modulation pattern that is changeable, and emits light of a light distribution pattern based on the phase modulation pattern,
wherein, on the basis of information from a detection device that detects a predetermined target object located in front of a vehicle, the phase modulation element sets the phase modulation pattern in which light of a light distribution pattern in which a specific region overlapping at least a part of the target object in a high beam light distribution pattern is darkened, and a predetermined region in the high beam distribution pattern that is different from the specific region is brighter than before the specific region is darkened.

8. The headlight for vehicle according to claim 7,
wherein the predetermined region overlaps at least a part of a hot zone in the light distribution pattern.

9. The headlight for vehicle according to claim 7,
wherein the predetermined region is in contact with at least a part of an edge of the specific region.

10. The headlight for vehicle according to claim 7,
wherein the target object is a human,
the specific region is a region overlapping at least a part of a head of the human, and
the predetermined region is a region overlapping at least a part of a torso of the human.

11. The headlight for vehicle according to claim 7,
wherein, in the specific region, a central side is made darker than an edge side.

12. A headlight for vehicle comprising
a plurality of light emitting optical systems each having a light source and a phase modulation element,
wherein the light source in each of the light emitting optical systems emits laser light having different wavelengths,
the phase modulation element in each of the light emitting optical systems diffracts the laser light emitted from the light source in each of the light emitting optical systems with a phase modulation pattern that is changeable, and emits light of a light distribution pattern based on the phase modulation pattern,
a predetermined light distribution pattern is formed by light obtained by synthesizing the light emitted from each of the light emitting optical systems, and
on the basis of information from a detection device that detects a predetermined target object located in front of a vehicle, the phase modulation element in each of the light emitting optical systems sets the phase modulation pattern in which the light distribution pattern is formed in which a color of a specific region overlapping at least a part of the target object in the predetermined light distribution pattern is different from a color of other regions than the specific region by the light obtained by synthesizing the light emitted from each of the light emitting optical systems.

13. The headlight for vehicle according to claim 12,
wherein each of the light emitting optical systems adjusts a total luminous flux amount of the emitted light on the basis of information from the detection device.

14. The headlight for vehicle according to claim 12, wherein a total luminous flux amount of the light in the specific region, of which color is different from the color of other regions than the specific region, is smaller than a total luminous flux amount of the light in the specific region in the predetermined light distribution pattern.

15. The headlight for vehicle according to claim 12, wherein a total luminous flux amount of the light in the specific region, of which color is different from the color of other regions than the specific region, is larger than a total luminous flux amount of the light in the specific region in the predetermined light distribution pattern.

16. The headlight for vehicle according to claim 12, wherein, at least two of the light emitting optical systems share the phase modulation element, and
in the light emitting optical systems sharing the phase modulation element, the laser light is emitted alternately for each light source of each of the light emitting optical systems, and the phase modulation element changes the phase modulation pattern in synchronization with switching of emission of the laser light for each light source of each of the light emitting optical systems.

* * * * *